US012462971B2

(12) United States Patent
Takeuchi et al.

(10) Patent No.: US 12,462,971 B2
(45) Date of Patent: Nov. 4, 2025

(54) COIL COMPONENT AND MANUFACTURING METHOD THEREFOR

(71) Applicant: TDK Corporation, Tokyo (JP)

(72) Inventors: Takuya Takeuchi, Tokyo (JP); Yuuichi Kawaguchi, Tokyo (JP); Masanori Suzuki, Tokyo (JP); Naoaki Fujii, Tokyo (JP)

(73) Assignee: TDK CORPORATION, Tokyo (JP)

( * ) Notice: Subject to any disclaimer, the term of this patent is extended or adjusted under 35 U.S.C. 154(b) by 863 days.

(21) Appl. No.: 17/762,216

(22) PCT Filed: Sep. 24, 2020

(86) PCT No.: PCT/JP2020/035927
§ 371 (c)(1),
(2) Date: Mar. 21, 2022

(87) PCT Pub. No.: WO2021/060332
PCT Pub. Date: Apr. 1, 2021

(65) Prior Publication Data

US 2022/0375681 A1 Nov. 24, 2022

(30) Foreign Application Priority Data

Sep. 25, 2019 (JP) ................................ 2019-173668

(51) Int. Cl.
*H01F 27/30* (2006.01)
*H01F 27/02* (2006.01)
(Continued)

(52) U.S. Cl.
CPC ......... *H01F 27/327* (2013.01); *H01F 27/022* (2013.01); *H01F 27/29* (2013.01); *H01F 41/04* (2013.01)

(58) Field of Classification Search
CPC ...................................................... H01F 27/327
(Continued)

(56) References Cited

U.S. PATENT DOCUMENTS

2012/0306607 A1 12/2012 Jeong et al.
2013/0106554 A1* 5/2013 Girard ................. H01F 17/0013 336/200
(Continued)

FOREIGN PATENT DOCUMENTS

JP 2012-253332 A 12/2012
JP 2015-088753 A 5/2015
(Continued)

OTHER PUBLICATIONS

English translation of KR20180014593 (Year: 2018).*
(Continued)

*Primary Examiner* — Ronald Hinson
(74) *Attorney, Agent, or Firm* — Rimon P.C.

(57) ABSTRACT

A coil component has a magnetic element body made of resin containing magnetic particles, a coil part embedded in the magnetic element body, conductor posts which are embedded in the magnetic element body and whose one ends are connected to the coil part and the other ends are exposed from the magnetic element body, an insulating layer interposed between the conductor posts and the magnetic element body, and other insulating layers interposed between the coil part and the magnetic element body. Since the insulating layer is interposed between the conductor posts and the magnetic element body, it is possible to ensure insulation performance between the conductor posts and the magnetic element body and to prevent the occurrence of peeling therebetween.

20 Claims, 45 Drawing Sheets

(51) Int. Cl.
*H01F 27/29* (2006.01)
*H01F 27/32* (2006.01)
*H01F 41/04* (2006.01)

(58) Field of Classification Search
USPC .......................................................... 336/199
See application file for complete search history.

(56) References Cited

U.S. PATENT DOCUMENTS

| | | | |
|---|---|---|---|
| 2015/0116950 | A1 | 4/2015 | Yoo et al. |
| 2016/0379750 | A1 | 12/2016 | Hamada et al. |
| 2017/0098997 | A1 | 4/2017 | Hamada et al. |
| 2017/0287622 | A1 | 10/2017 | Ishizaki |
| 2020/0051728 | A1* | 2/2020 | Matsumoto ......... H01F 17/0013 |
| 2020/0105457 | A1* | 4/2020 | Yasuda ................... H01F 27/29 |

FOREIGN PATENT DOCUMENTS

| | | | |
|---|---|---|---|
| JP | 2017-011185 | A | 1/2017 |
| JP | 2017-069523 | A | 4/2017 |
| JP | 2017-183529 | A | 10/2017 |
| JP | 2018-160610 | A | 10/2018 |

OTHER PUBLICATIONS

International Search Report issued in corresponding International Patent Application No. PCT/JP2020/035927, dated Dec. 15, 2020, with English translation.

* cited by examiner

COIL COMPONENT AND MANUFACTURING METHOD THEREFOR

CROSS REFERENCE TO RELATED APPLICATIONS

This application is the U.S. National Phase under 35 US.C. § 371 of International Application No. PCT/JP2020/035927, filed on Sep. 24, 2020, which claims the benefit of Japanese Application No. 2019-173668, filed on Sep. 25, 2019, the entire contents of each are hereby incorporated by reference.

TECHNICAL FIELD

The present invention relates to a coil component and a manufacturing method therefor and, more particularly, to a coil component having a structure in which a coil pattern is embedded in a magnetic element body and a manufacturing method therefor.

BACKGROUND ART

It is often the case that a chip-type coil component is structured such that, in order to enhance inductance, a coil pattern is embedded in a magnetic element body. For example, Patent Documents 1 to 3 disclose a coil component having a structure in which a spiral-shaped coil pattern is embedded in a magnetic element body.

However, materials constituting the magnetic element body are insufficient in insulation performance as compared to resin materials. Therefore, employed is a chip-type coil component having a structure in which the coil pattern is not directly covered with the magnetic element body, but is covered with an insulating layer made of a resin material and then additionally covered at its surface with the magnetic element body.

CITATION LIST

Patent Document

[Patent Document 1] JP 2017-183529A
[Patent Document 2] JP 2017-11185A
[Patent Document 3] JP 2018-160610A

SUMMARY OF THE INVENTION

Problem to be Solved by the Invention

On the other hand, a conductor post provided for connecting a coil pattern and an external terminal directly contacts the magnetic element body without being covered with an insulating layer for reasons associated with a manufacturing process, so that insulation performance between the conductor post and the magnetic element body may become insufficient in some cases. Further, a metal material (mainly, Cu) constituting the conductor post and the magnetic element body differ in thermal expansion coefficient, which makes it likely to cause the risk of peel-off at the interface therebetween. In particular, when magnetic filler having a comparatively large particle size is present on the surface of the conductor post, a gap is likely to occur between the conductor post and the magnetic element body, which can cause a problem of peeling.

It is therefore an object of the present invention to solve, in a coil component having a structure in which a coil pattern and a conductor post are embedded in a magnetic element body, problems caused due to contact between the conductor post and the magnetic element body. Another object of the present invention is to provide a manufacturing method for such a coil component.

Means for Solving the Problem

A coil component according to the present invention has a magnetic element body made of resin containing magnetic particles, a coil part embedded in the magnetic element body, a conductor post which is embedded in the magnetic element body and whose one end is connected to the coil part and the other end is exposed from the magnetic element body, a first insulating layer interposed between the conductor post and the magnetic element body, and a second insulating layer interposed between the coil part and the magnetic element body.

According to the present invention, the first insulating layer is interposed between the conductor post and the magnetic element body, it is possible to ensure insulation performance between the conductor post and the magnetic element body and to prevent the occurrence of peeling therebetween.

In the present invention, the first and second insulating layers may be made of the same resin material. This prevents complication of a manufacturing process and increases product reliability.

In the present invention, the first insulating layer may have a film thickness larger than that of the second insulating layer. This further improves insulation performance between the conductor post and the magnetic element body.

In the present invention, the coil part and the conductor post may be connected to each other through a via conductor penetrating the first insulating layer, and the via conductor may have a diameter larger at a part contacting the coil part than that at a part contacting conductor post. This makes it possible to dissipate heat inside the coil part more efficiently.

In the present invention, the conductor post may include a first conductor post connected to one end of the coil part and a second conductor post connected to the other end of the coil part, the magnetic element body may have a first surface positioned on one side in the coil axis direction and a second surface positioned on the other side in the coil axis direction, and the first and second conductor posts may be exposed from the first and second surfaces of the magnetic element body, respectively. According to the present invention, when the coil component is embedded in a multilayer substrate, connection can be established from both upper and lower sides.

In this case, the first insulating layer may be interposed between the second conductor post and the magnetic element body without being interposed between the first conductor post and the magnetic element body. This simplifies a manufacturing process for the first conductor post. The conductor post may further include a third conductor post connected to the one end of the coil part, and the third conductor post may be exposed from the second surface of the magnetic element body. This makes it possible to expose the conductor post connected to one end of the coil part from both the surfaces of the magnetic element body.

A manufacturing method for a coil component according to the present invention includes the steps of: forming, on a support substrate, a first layer including a conductor post, a first sacrificial pattern, and a first insulating layer isolating the conductor post and the first sacrificial pattern from each other; forming a second layer including a coil pattern whose one end is connected to one end of the conductor post, a second sacrificial pattern connected to the first sacrificial pattern, and a second insulating layer isolating the coil pattern and the second sacrificial pattern from each other; forming a space in the inner diameter area and outer area of the coil pattern by removing the first and second sacrificial patterns; forming a magnetic element body made of resin containing magnetic particles in the space; and exposing the other end of the conductor post.

According to the present invention, the first insulating layer is interposed between the conductor post positioned in the first layer and the magnetic element body, it is possible to ensure insulation performance between the conductor post and the magnetic element body and to prevent the occurrence of peeling therebetween.

The manufacturing method for a coil component according to the present invention may further include, after the formation of the magnetic element body, a step of forming another conductor post connected to the other end of the coil pattern at the side opposite to that at which the conductor post is situated as viewed from the magnetic element body. This makes it possible to expose the two conductor posts from the respective surfaces of the magnetic element body in the coil axis direction.

The manufacturing method for a coil component according to the present invention may further include, a step of forming, before the formation of the space, another conductor post connected to the other end of the coil pattern, at the side opposite to that at which the conductor post is situated as viewed from the magnetic element body, and a step of covering the another conductor post with a resist film, and the step of forming the space may be performed in a state where the another conductor post is covered with the resist film. This method also makes it possible to expose the two conductor posts from the respective surfaces of the magnetic element body in the coil axis direction.

Advantageous Effects of the Invention

As described above, according to the present invention, it is possible to solve, in a coil component having a structure in which a coil pattern and a conductor post are embedded in a magnetic element body and in a manufacturing method therefor, problems caused due to contact between the conductor post and the magnetic element body.

MODE FOR CARRYING OUT THE INVENTION

Hereinafter, preferred embodiments of the present invention will be described in detail with reference to the accompanying drawings.

First Embodiment

Figure 1:
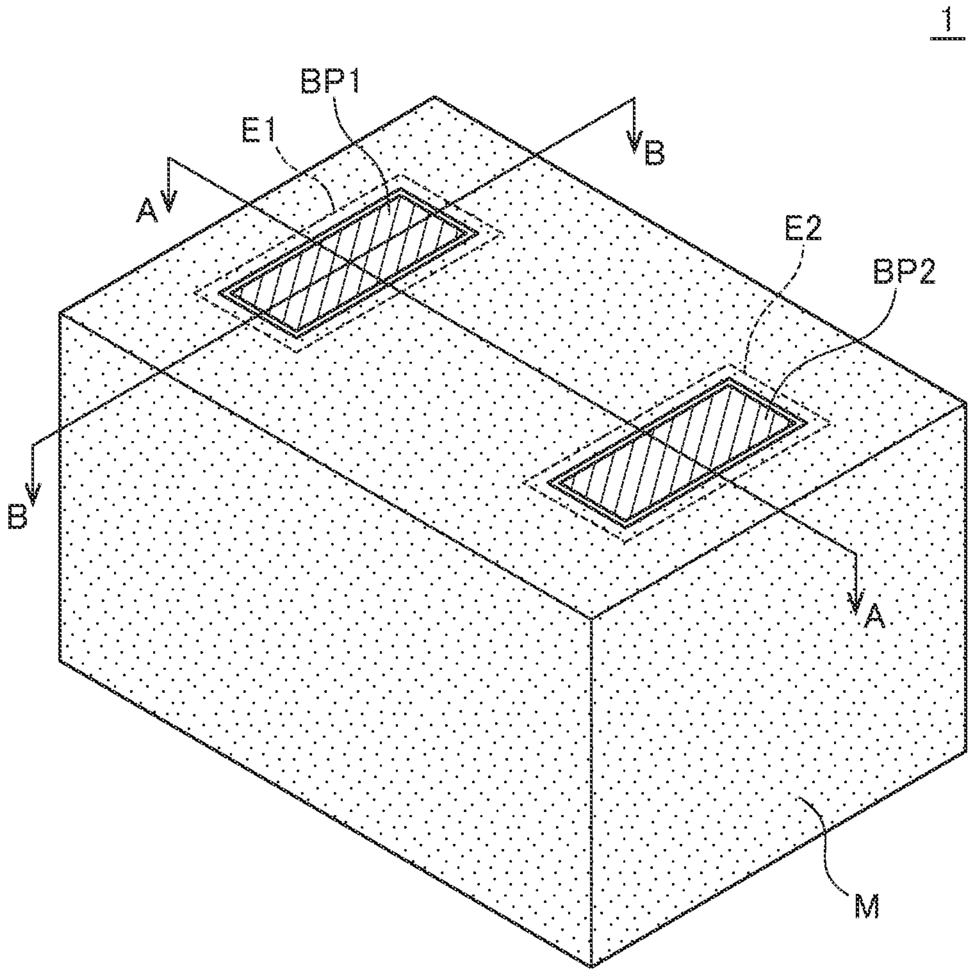
FIG. 1 is a schematic perspective view illustrating the outer appearance of a coil component 1 according to a first embodiment of the present invention.
Figure 2:
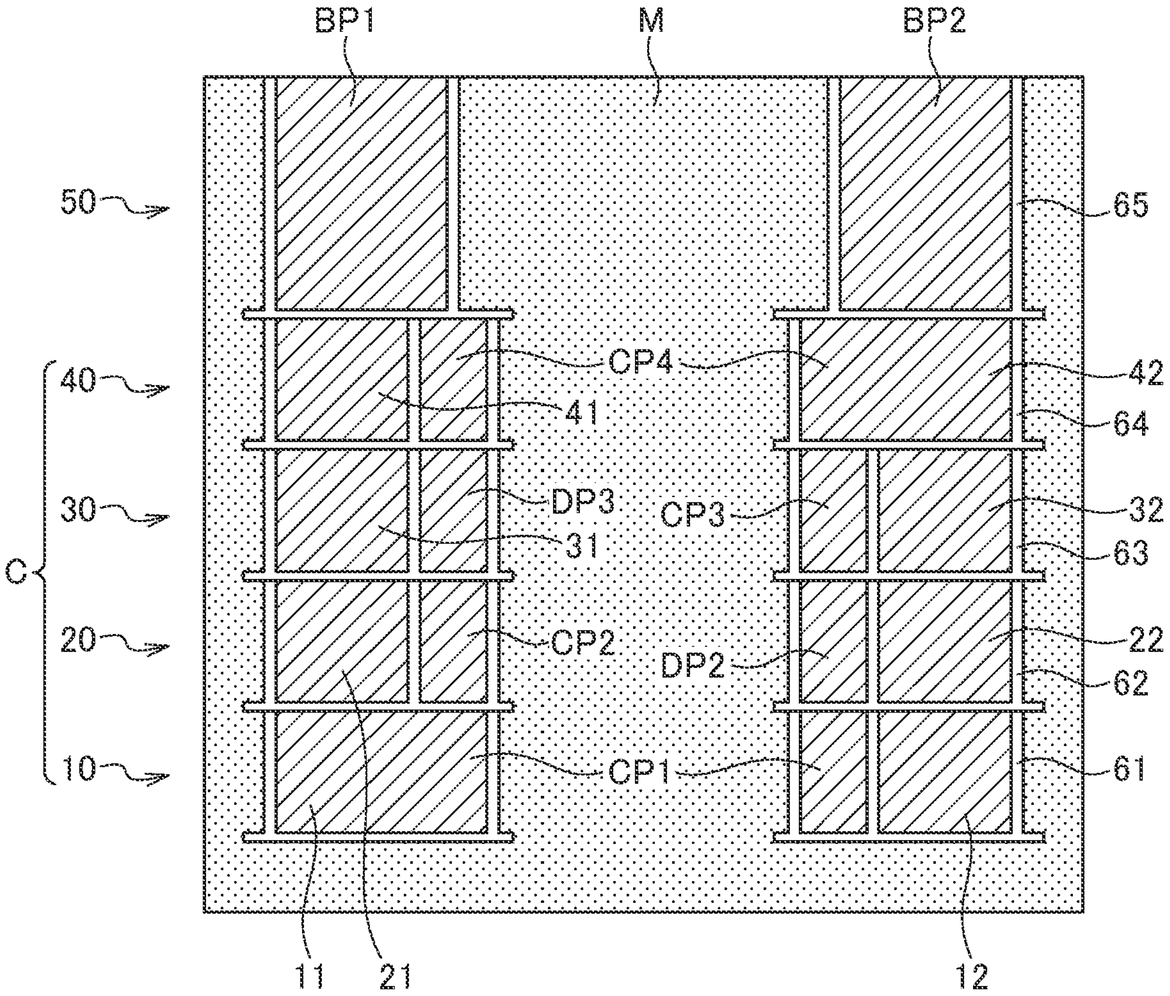
FIG. 2 is a schematic cross-sectional view taken along the line A-A in FIG. 1

FIG. 1 is a schematic perspective view illustrating the outer appearance of a coil component 1 according to a first embodiment of the present invention. FIG. 2 is a schematic cross-sectional view taken along the line A-A in FIG. 1, and FIG. 3 is a schematic cross-sectional view taken along the line B-B in FIG. 1.

Figure 3:
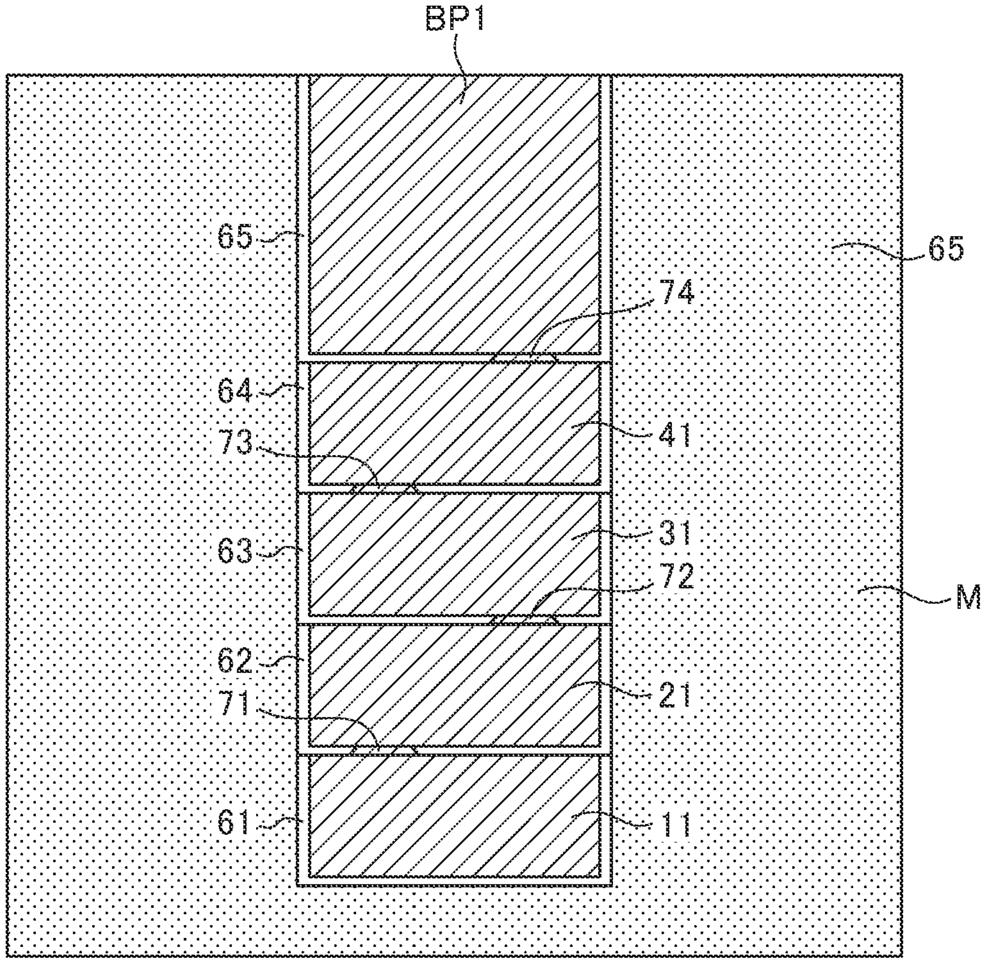
FIG. 3 is a schematic cross-sectional view taken along the line B-B in FIG. 1.

The coil component 1 according to the present embodiment is a surface-mount type chip component suitably used as an inductor for a power supply circuit and has, as illustrated in FIGS. 1 to 3, a magnetic element body M, a coil part C embedded in the magnetic element body M, and a pair of conductor posts BP1 and BP2. Although the configuration of the coil part C will be described later, in the present embodiment, four conductor layers each having a spiral-shaped coil pattern are stacked to form one coil conductor. One end of the coil conductor is connected to the conductor post BP1, and the other end thereof is connected to the conductor post BP2.

In the example illustrated in FIGS. 1 to 3, end potions of the respective conductor posts BP1 and BP2 are completely exposed, but not limited thereto, and they may be covered with conductive paste or the like formed in areas E1 and E2 illustrated in FIG. 1.

The magnetic element body M is a composite member made of resin containing magnetic particles and constitutes a magnetic path for magnetic flux generated by making current flow in a coil. The magnetic particles may be magnetic metal such as iron (Fe) or a permalloy-based material and a magnetic oxide such as ferrite. The resin may be epoxy resin of liquid or powder.

As illustrated in FIG. 2, the coil part C constituting the coil component 1 is embedded in the magnetic element body M and has alternately stacked insulating layers 61 to and conductor layers 10, 20, 30, 40, and 50. The conductor layers 10, 20, 30, and 40 have spiral-shaped coil patterns CP1 to CP4, respectively, and the upper, lower, and side surfaces of the coil patterns CP1 to CP4 are covered with the insulating layers 61 to 65. The conductor layers 10, 20, 30, and 40 include dummy patterns DP1 to DP4, respectively (only dummy patterns DP2 and DP3 are visible in the cross-sectional view of FIG. 2). The upper, lower, and side surfaces of the dummy patterns DP1 to DP4 are also covered with the insulating layers 61 to 65. The conductor layer 50 includes the conductor posts BP1 and BP2. The lower and side surfaces of the conductor posts BP1 and BP2 are covered with the insulating layer 65. The above-mentioned upper and lower surfaces each refer to a surface perpendicular to the coil axis, and the side surface refers to a surface parallel to the coil axis.

The coil patterns CP1 to CP4 are mutually connected through through holes formed in the insulating layers 62 to 64 to constitute the coil conductor. The conductor layers 10, 20, 30, 40, and 50 are preferably made of copper (Cu). The magnetic element body M is filled also in the inner diameter area and outer area of each of the coil patterns CP1 to CP4. Out of the insulating layers 61 to 65, at least the insulating layers 62 to 64 are made of a non-magnetic material. The lowermost insulating layer 61 and uppermost insulating layer 65 may be made of a magnetic material.

The conductor layer 10 is the lowermost layer; however, as described later, in a manufacturing process for the coil component 1 according to the present embodiment, the conductor layers are stacked from the conductor layer 50 side in a state inverted upside down with respect to the state illustrated in FIG. 2, so that the conductor layer 10 is positioned uppermost at the time of manufacture. The conductor layer 10 has the coil pattern CP1 spirally wound in about ⅝ turns, the dummy pattern DP1 (not visible in FIG. 2), and two electrode patterns 11 and 12. The lower and side surfaces of the coil pattern CP1, dummy pattern DP1, and electrode patterns 11 and 12 are covered with the insulating layer 61, and the upper surfaces thereof are covered with the insulating layer 62. As illustrated in FIG. 2, in a predetermined cross section, one end of the coil pattern CP1 and the electrode pattern 11 are connected, whereas the electrode pattern 12 is provided independently of the coil pattern CP1.

The conductor layer 20 is the second conductor layer formed on the upper surface of the conductor layer 10 through the insulating layer 62. The conductor layer 20 has the coil pattern CP2 spirally wound in about ⅝ turns, the dummy pattern DP2, and two electrode patterns 21 and 22. The lower and side surfaces of the coil pattern CP2, dummy pattern DP2, and electrode patterns 21 and 22 are covered with the insulating layer 62, and the upper surfaces thereof are covered with the insulating layer 63. One end of the coil pattern CP2 is connected to the other end of the coil pattern CP1 through a through hole formed in the insulating layer 62. Both the electrode patterns 21 and 22 are provided independently of the coil pattern CP2 and connected to the electrode patterns 11 and 12, respectively, through through holes formed in the insulating layer 62, respectively.

The conductor layer 30 is the third conductor layer formed on the upper surface of the conductor layer 20 through the insulating layer 63. The conductor layer 30 has the coil pattern CP3 spirally wound in about ⅝ turns, the dummy pattern DP3, and two electrode patterns 31 and 32. The lower and side surfaces of the coil pattern CP3, dummy pattern DP3, and electrode patterns 31 and 32 are covered with the insulating layer 63, and the upper surfaces thereof are covered with the insulating layer 64. One end of the coil pattern CP3 is connected to the other end of the coil pattern CP2 through a through hole formed in the insulating layer 63. Both the electrode patterns 31 and 32 are provided independently of the coil pattern CP3 and connected to the electrode patterns 21 and 22, respectively, through through holes formed in the insulating layer 63, respectively.

The conductor layer 40 is the fourth conductor layer formed on the upper surface of the conductor layer 30 through the insulating layer 64. The conductor layer 40 has the coil pattern CP4 spirally wound in about ⅝ turns, the dummy pattern DP4 (not visible in FIG. 2), and two electrode patterns 41 and 42. The lower and side surfaces of the coil pattern CP4, dummy pattern DP4, and electrode patterns 41 and 42 are covered with the insulating layer 64, and the upper surfaces thereof are covered with the insulating layer 65. One end of the coil pattern CP4 is connected to the other end of the coil pattern CP3 through a through hole formed in the insulating layer 64. As illustrated in FIG. 2, in a predetermined cross section, the other end of the coil pattern CP4 and the electrode pattern 42 are connected, whereas the electrode pattern 41 is provided independently of the coil pattern CP4. The electrode patterns 41 and 42 are connected to the electrode patterns 31 and 32, respectively, through through holes formed in the insulating layer 64, respectively.

The conductor layer 50 is the uppermost layer formed on the upper surface of the conductor layer 40 through the insulating layer 65. The conductor layer 50 has the conductor posts BP1 and BP2. The lower and side surfaces of the conductor posts BP1 and BP2 are covered with the insulating layer 65. The conductor post BP1 is connected to the electrode pattern 41 through a through hole formed in the insulating layer 65, and the conductor post BP2 is connected to the electrode pattern 42 through a through hole formed in the insulating layer 65. Thus, the coil patterns CP1 to CP4 constitute a 2.5-turn coil conductor, whose one end is connected to the conductor post BP1 and the other end is connected to the conductor post BP2. The conductor posts BP1 and BP2 each have a height in the stacking direction greater than that of each of the coil patterns CP1 to CP4 and are each connected at one end to the coil part C and each exposed at the other end from the magnetic element body M.

In the coil component 1 according to the present embodiment, not only that the coil part C formed in the conductor layers 10, 20, 30, and 40 is covered with the insulating layers 61 to 65, but also that the side surfaces of the conductor posts BP1 and BP2 formed in the conductor layer 50 are covered with the insulating layer 65. This makes it possible to ensure insulation performance between the conductor posts BP1, BP2 and the magnetic element body M and to prevent the occurrence of peeling therebetween. If the side surfaces of the conductor posts BP1 and BP2 are not covered with the insulating layer 65, the presence of magnetic filler having a comparatively large particle size on the surfaces of the conductor posts BP1 and BP2 will make it likely to cause a gap between the conductor posts BP1, BP2 and the magnetic element body M, which may contribute to the risk for peeling. On the other hand, in the present embodiment, the insulating layer 65 is provided between the conductor posts BP1, BP2 and the magnetic element body M and functions as a buffer member, thus making it unlikely to cause peeling at the interface therebetween.

In view of more effectively preventing peel-off, the insulating layer 65 is preferably made of a material having a thermal expansion coefficient of a value between those of the conductor posts BP1, BP2 and the magnetic element body M. Further, the insulating layer 65 need not necessarily be made of the same material as those for the insulating layers 61 to 64 and may be made of a different material from those therefor. However, when the insulating layer 65 is made of the same material as those for the insulating layers 61 to 64, it is not necessary to prepare a plurality of types of insulating materials, thus preventing complication of a manufacturing process and increasing product reliability. The insulating layer 65 may be larger in film thickness than the insulating layers 61 to 64. This further improves insulation performance between the conductor posts BP1, BP2 and the magnetic element body M. The conductor layer 50 is lower in pattern density than the conductor layers 10, 20, 30, and 40 in which the coil part C is formed, so that an increase in the film thickness of the insulating layer 65 will not lead to enlargement of chip size.

As illustrated in FIG. 3, a via conductor 71 connecting the electrode patterns 11 and 21, a via conductor 72 connecting the electrode patterns 21 and 31, a via conductor 73 connecting the electrode patterns 31 and 41, and a via conductor 74 connecting the electrode pattern 41 and the conductor post BP1 each have a diameter larger at a part contacting the lower side pattern (the pattern on the side far from the conductor post BP1) than that at a part contacting the upper side pattern (the pattern on the side close to the conductor post BP1). This is due to a manufacturing process to be described later, and the same applies to all the other via conductors not shown. Actually, the via conductor 71 is a part of the electrode pattern 11, the via conductor 72 is a part of the electrode pattern 21, the via conductor 73 is a part of the electrode pattern 31, and the via conductor 74 is a part of the electrode pattern 41. Since the via conductors have such a shape, a contact area between the via conductor and the conductor layer positioned therebelow increases, with the result that heat inside the coil component 1 can be dissipated more efficiently.

The following describes a manufacturing method for the coil component 1 according to the present embodiment.

FIGS. 4 to 32 are process views for explaining the manufacturing method for the coil component 1 according to the present embodiment. While the process views illustrated in FIGS. 4 to 32 each illustrate a cross section corresponding to one coil component 1, multiple coil components 1 can actually be obtained by creating every one of them at a time using an aggregate substrate.

A support substrate 80 having a structure in which a metal foil 82 such as copper (Cu) is formed on the surface of a base 81 is prepared (FIG. 4), and an insulating layer 83 and a metal foil 84 are formed on the surface of the metal foil 82

Figure 5:
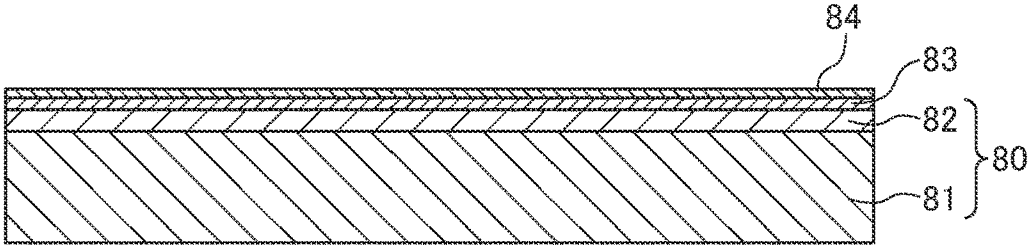
FIG. 5 is a process view for explaining the manufacturing method for the coil component 1.
Figure 6:
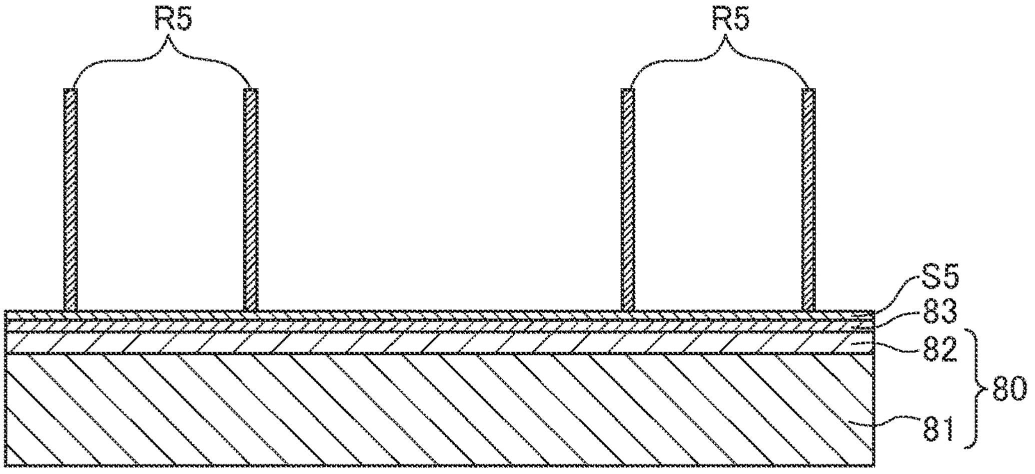
FIG. 6 is a process view for explaining the manufacturing method for the coil component 1.

(FIG. 5). The insulating layer 83 and metal foil 84 can be formed by a laminate method. After removal of the metal foil 84, electroless plating is performed to form a seed layer S5 on the entire surface, followed by formation of a resist pattern R5 on the seed layer S5 (FIG. 6). The resist pattern R5 serves as negative patterns of the conductor posts BP1 and BP2.

Figure 7:
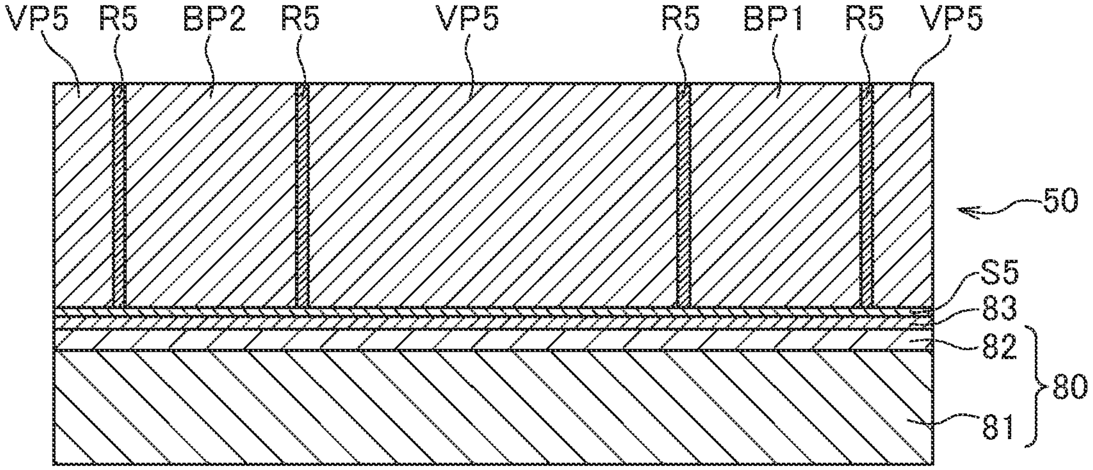
FIG. 7 is a process view for explaining the manufacturing method for the coil component 1.
Figure 8:
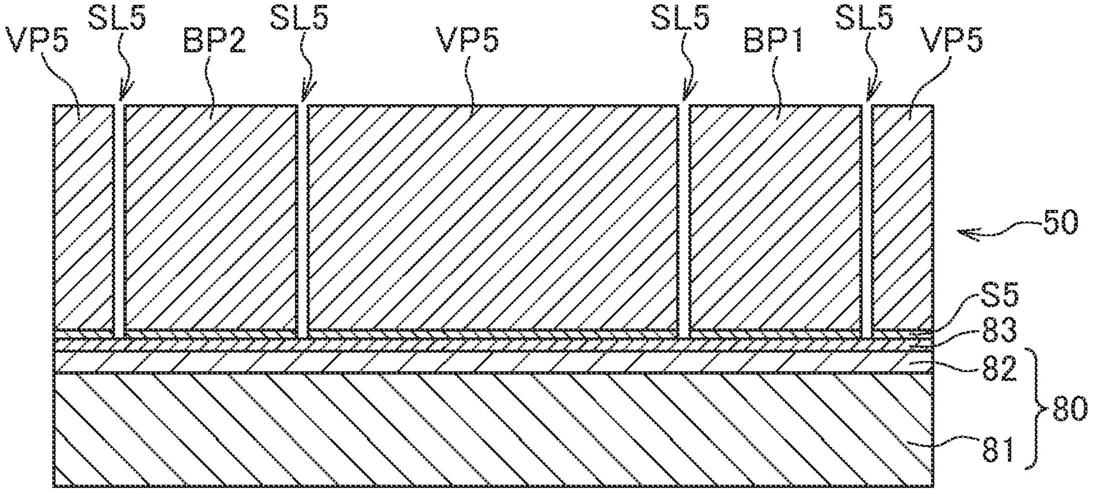
FIG. 8 is a process view for explaining the manufacturing method for the coil component 1.
Figure 33:
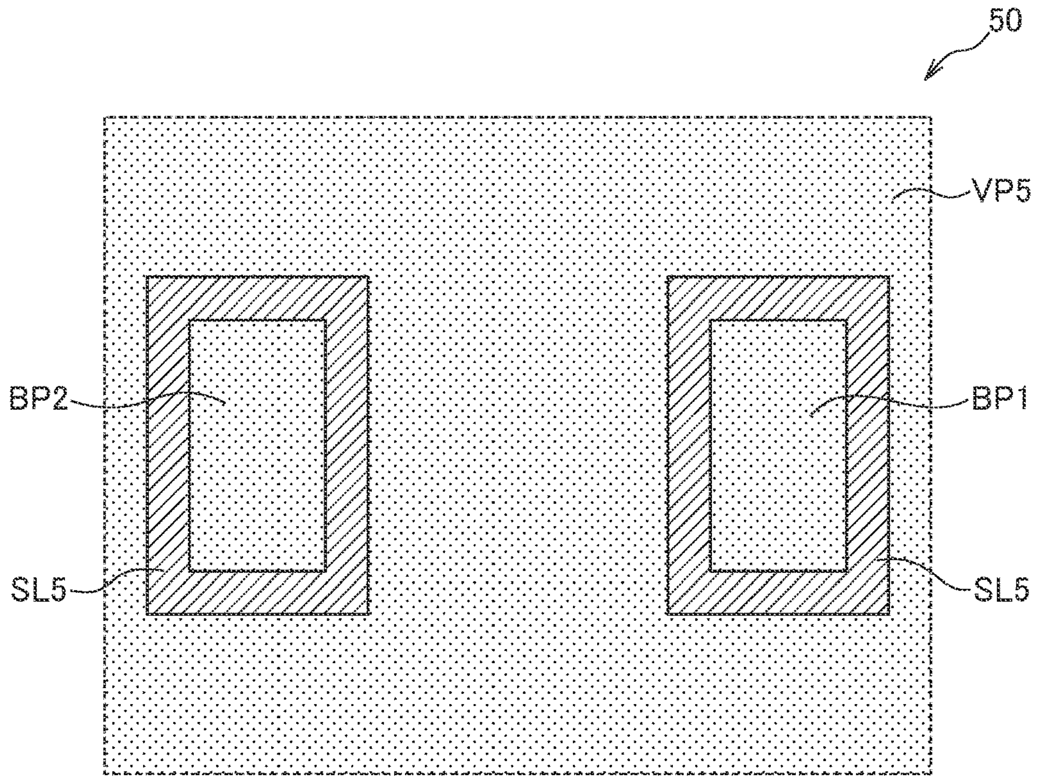
FIG. 33 is a plan view illustrating a pattern shape of the conductor layer 50.

Subsequently, electrolytic plating is performed to grow the seed layer S5 to thereby form the conductor layer 50 (FIG. 7). As a result, the conductor posts BP1 and BP2 are each formed in an area defined by the resist pattern R5. At this time, a sacrificial pattern VP5 is formed around the conductor posts BP1 and BP2. After peeling off the resist pattern R5, a part of the seed layer S5 that is exposed to the peeled portion of the resist pattern R5 is removed by etching (FIG. 8). As a result, the conductor posts BP1, BP2 and the sacrificial pattern VP5 are electrically isolated from each other by a slit SL5. The planar shape of the conductor layer 50 is as illustrated in FIG. 33.

Figure 9:
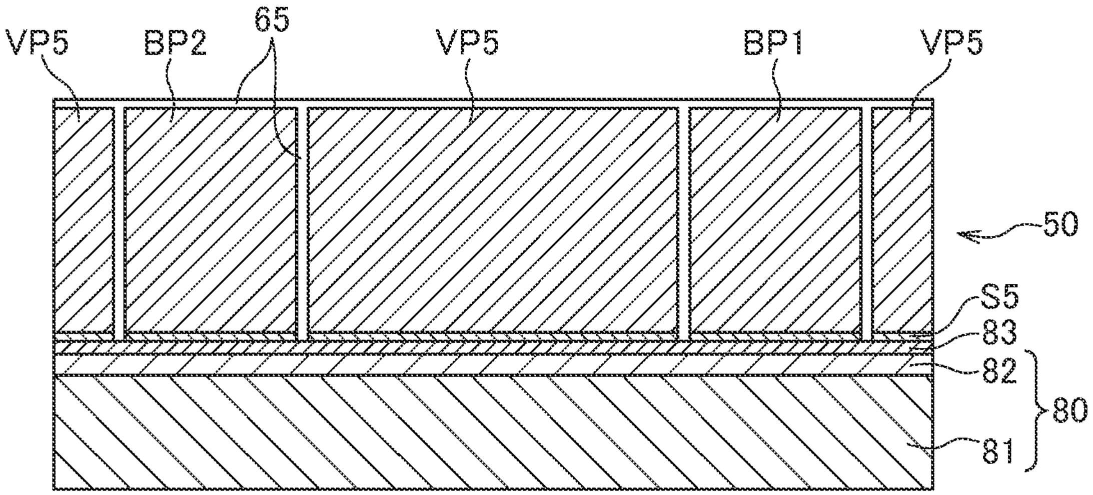
FIG. 9 is a process view for explaining the manufacturing method for the coil component 1.
Figure 10:
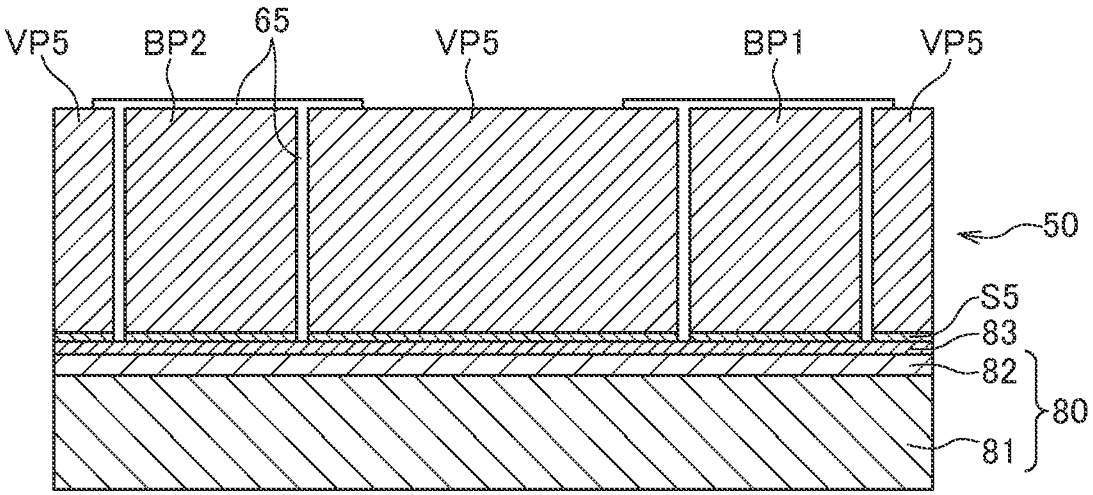
FIG. 10 is a process view for explaining the manufacturing method for the coil component 1.
Figure 34:
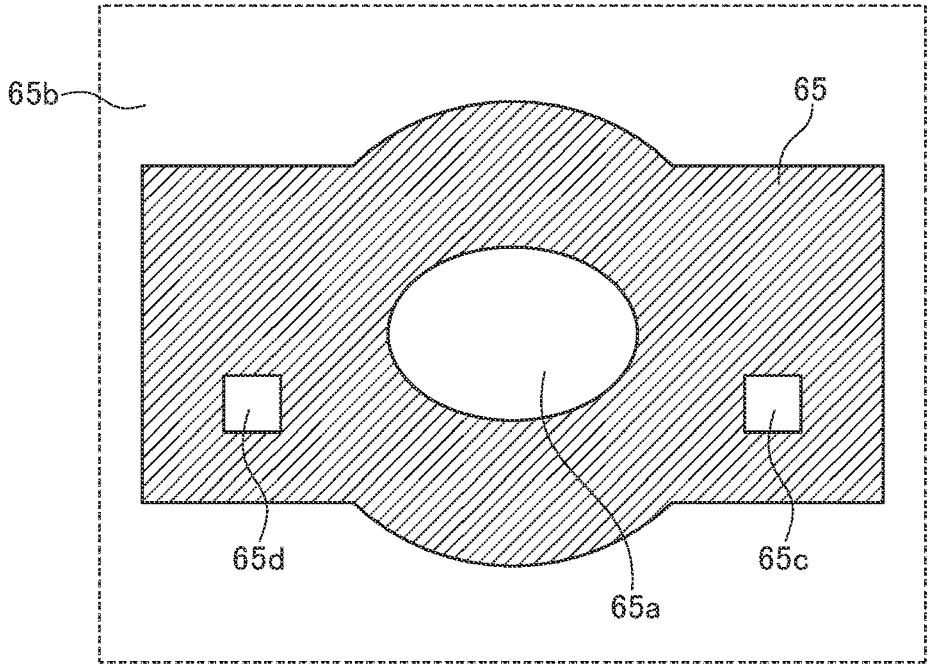
FIG. 34 is a plan view illustrating a pattern shape of the conductor layer 65.

Subsequently, the insulating layer 65 is formed on the surface of the conductor layer 50 so as to fill the slit SL5 (FIG. 9). The insulating layer 65 can be formed by a laminate method. Then, the insulating layer 65 is patterned to partly expose the conductor posts BP1, BP2 and sacrificial pattern VP5 (FIG. 10). The pattern shape of the insulating layer 65 is as illustrated in FIG. 34. That is, openings 65*a* and 65*b* are formed at positions not overlapping the conductor posts BP1 and BP2, and openings 65*c* and 65*d* are formed at positions overlapping the conductor posts BP1 and BP2, respectively.

Figure 11:
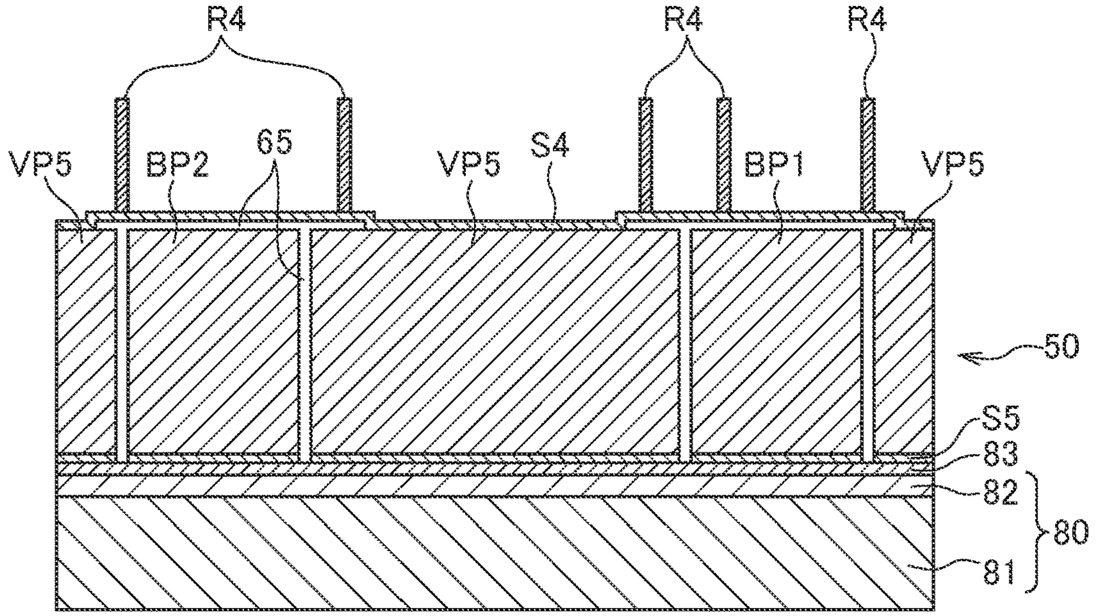
FIG. 11 is a process view for explaining the manufacturing method for the coil component 1.
Figure 12:
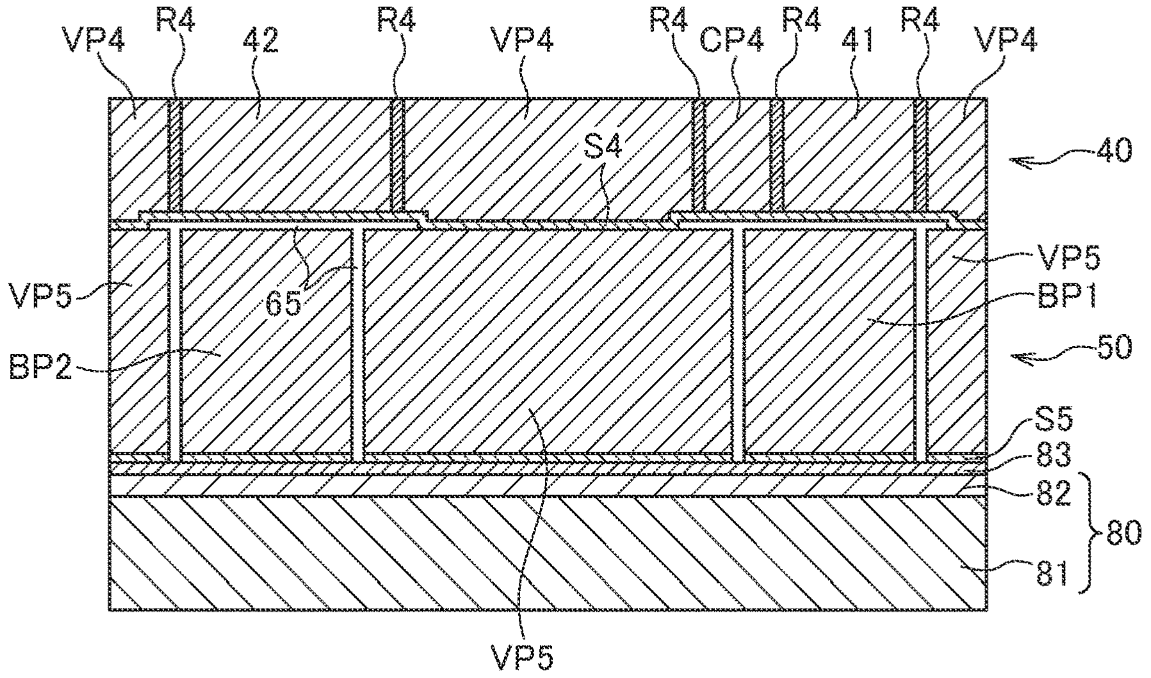
FIG. 12 is a process view for explaining the manufacturing method for the coil component 1.

Subsequently, electroless plating is performed to form a seed layer S4 on the entire surface, followed by formation of a resist pattern R4 on the seed layer S4 (FIG. 11). The resist pattern R4 serves as negative patterns of the coil pattern CP4, dummy pattern DP4 (not visible in the cross-sectional view), and electrode patterns 41 and 42. Then, electrolytic plating is performed to grow the seed layer S4 to thereby form the conductor layer 40 (FIG. 12). As a result, the spiral-shaped coil pattern CP4, dummy pattern DP4, and electrode patterns 41 and 42 are formed in areas defined by the resist pattern R4. At this time, a sacrificial pattern VP4 is formed in the inner diameter areas and outer areas of the coil pattern CP4 and dummy pattern DP4.

Figure 13:
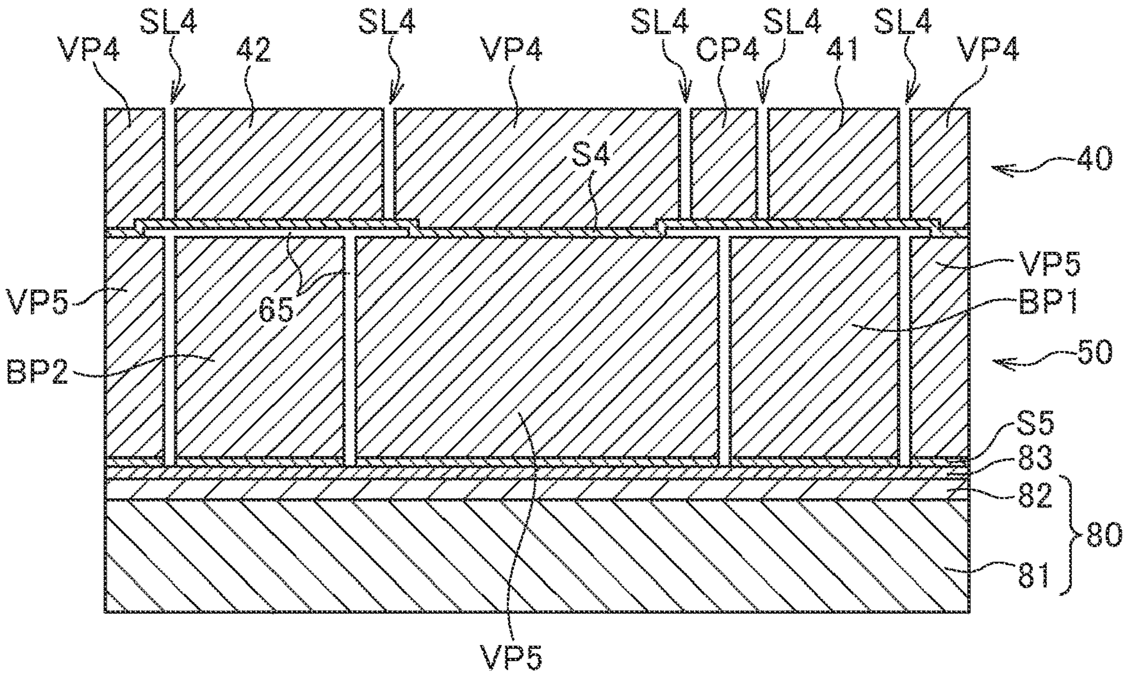
FIG. 13 is a process view for explaining the manufacturing method for the coil component 1.
Figure 35:
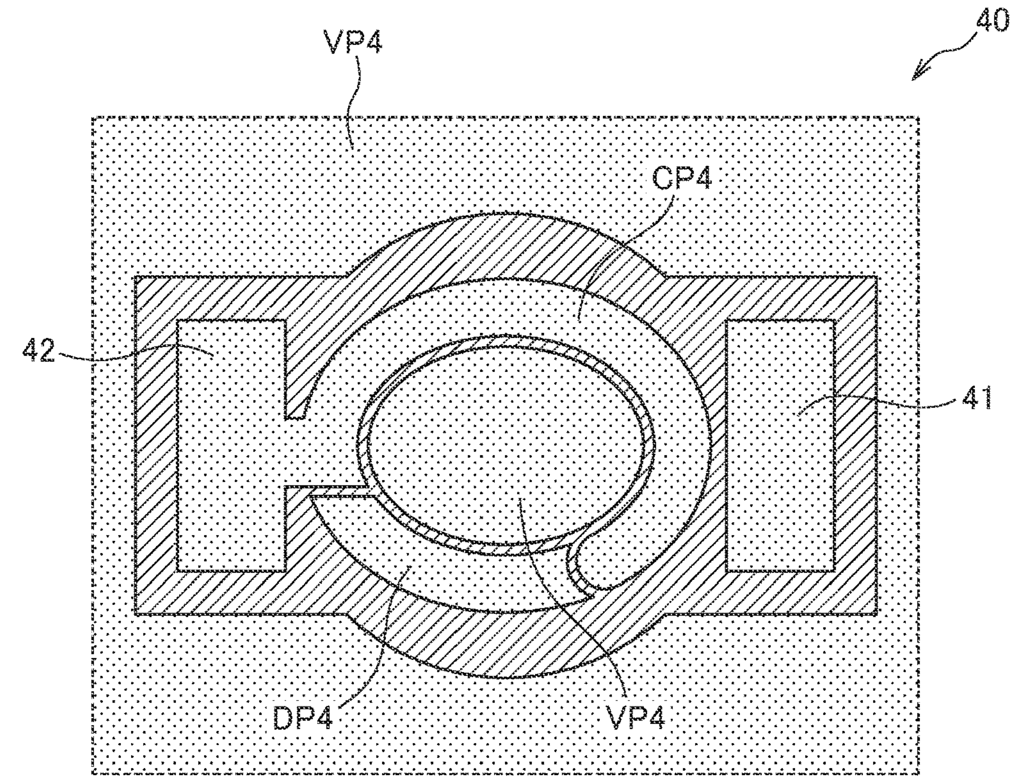
FIG. 35 is a plan view illustrating a pattern shape of the conductor layer 40.

After peeling off the resist pattern R4, a part of the seed layer S4 that is exposed to the peeled portion of the resist pattern R4 is removed by etching (FIG. 13). As a result, the coil pattern CP4, electrode patterns 41 and 42, sacrificial pattern VP4, and dummy pattern DP4 are electrically isolated from one another other by a slit SL4. The conductor layer 40, whose planar shape is as illustrated in FIG. 35, includes the spirally wound coil pattern CP4 and dummy pattern DP4, two electrode patterns 41 and 42 positioned in the outer areas of the coil pattern CP4 and dummy pattern DP4, and sacrificial pattern VP4 positioned in the inner diameter areas and outer areas of the coil pattern CP4 and dummy pattern DP4. As illustrated in FIG. 35, one end of the coil pattern CP4 is connected to the electrode pattern 42. The dummy pattern DP4 is a pattern separated from the coil pattern CP4 and positioned on the extension thereof and provided for reducing a level difference. The dummy patterns DP1 to DP3 to be described below have the same role.

Figure 14:
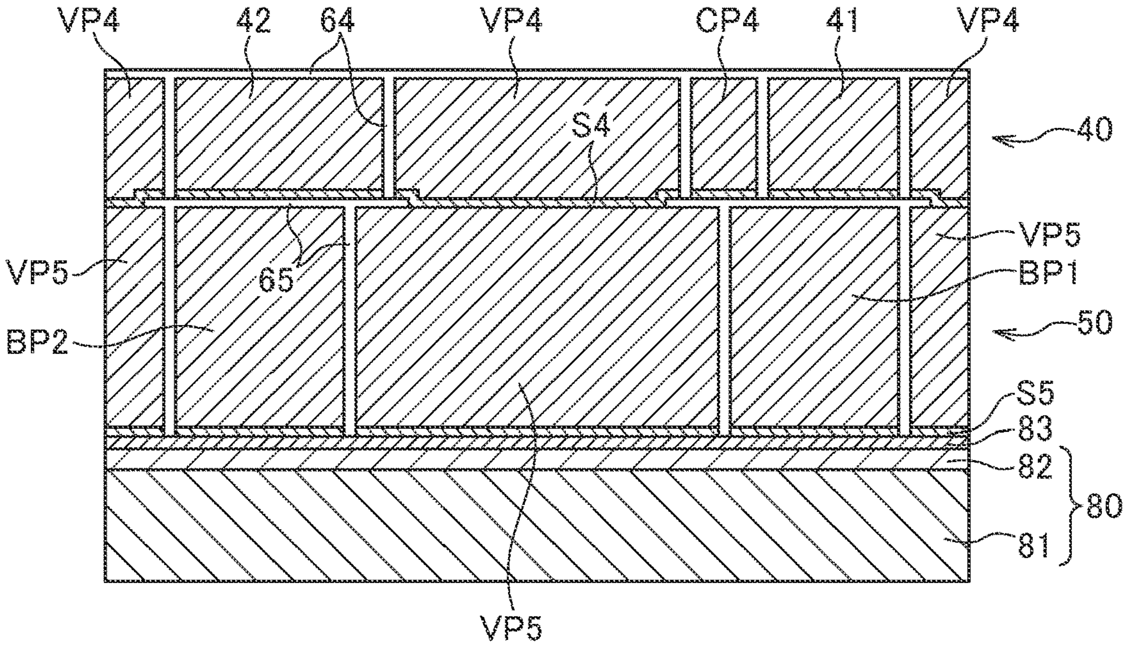
FIG. 14 is a process view for explaining the manufacturing method for the coil component 1.
Figure 15:
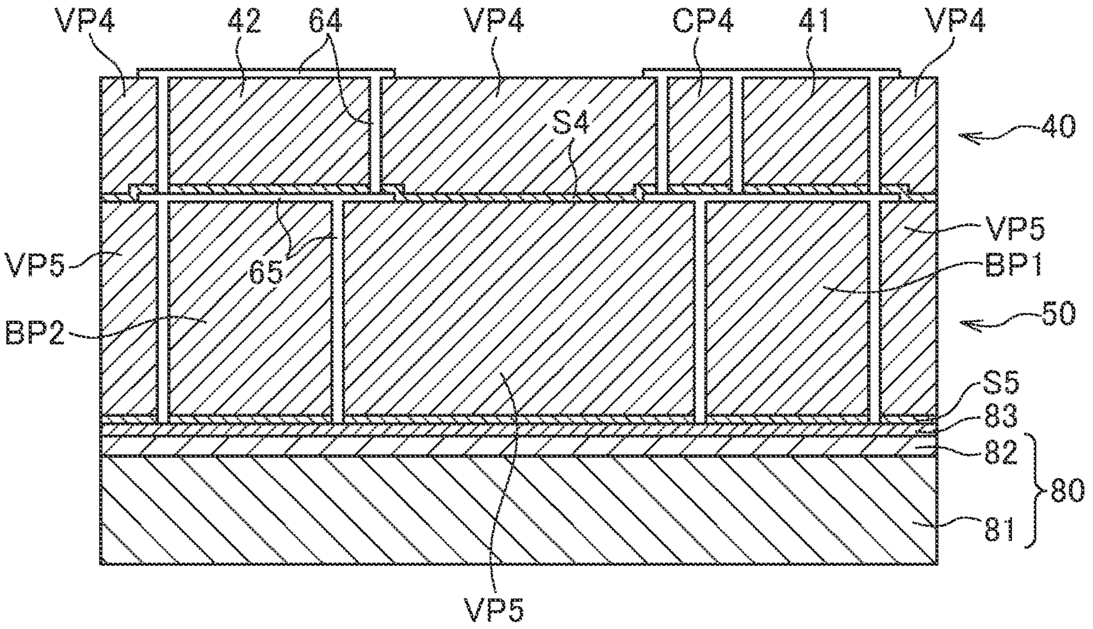
FIG. 15 is a process view for explaining the manufacturing method for the coil component 1.
Figure 36:
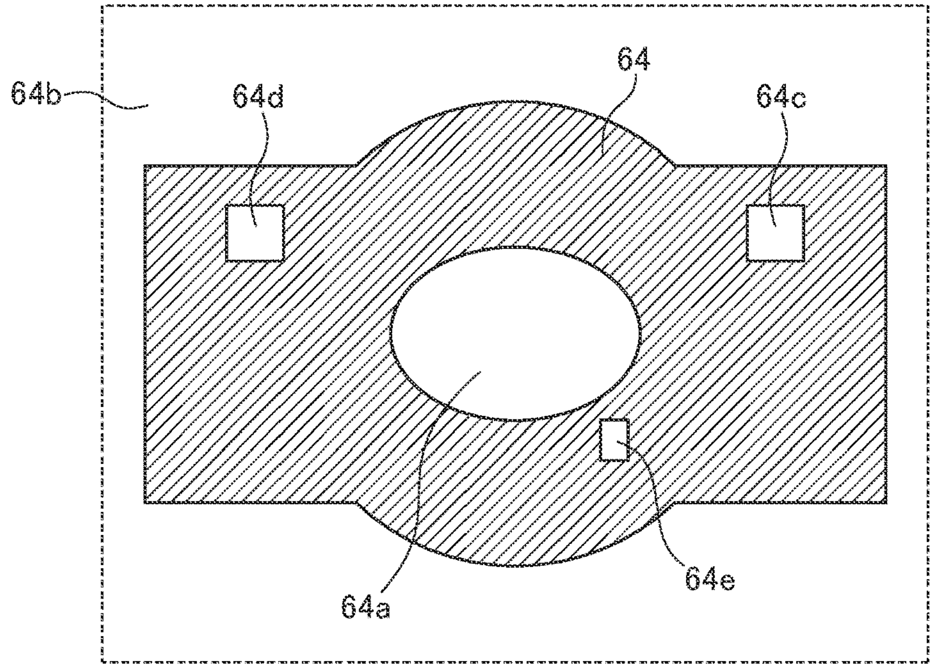
FIG. 36 is a plan view illustrating a pattern shape of the conductor layer 64.

Subsequently, the insulating layer 64 is formed on the surface of the conductor layer 40 so as to fill the slit SL4 (FIG. 14). The insulating layer 64 can be formed by a laminate method. Then, the insulating layer 64 is patterned to partly expose the coil pattern CP4, electrode patterns 41, 42, and sacrificial pattern VP4 (FIG. 15). The pattern shape of the insulating layer 64 is as illustrated in FIG. 36. That is, an opening 64*a* is formed at a position corresponding to the inner diameter area of the coil pattern CP4, an opening 64*b* is formed at a position corresponding to the outer area of the coil pattern CP4, and openings 64*c* to 64*e* are formed at positions corresponding to the electrode patterns 41, 42, and the other end of the coil pattern CP4, respectively.

Figure 16:
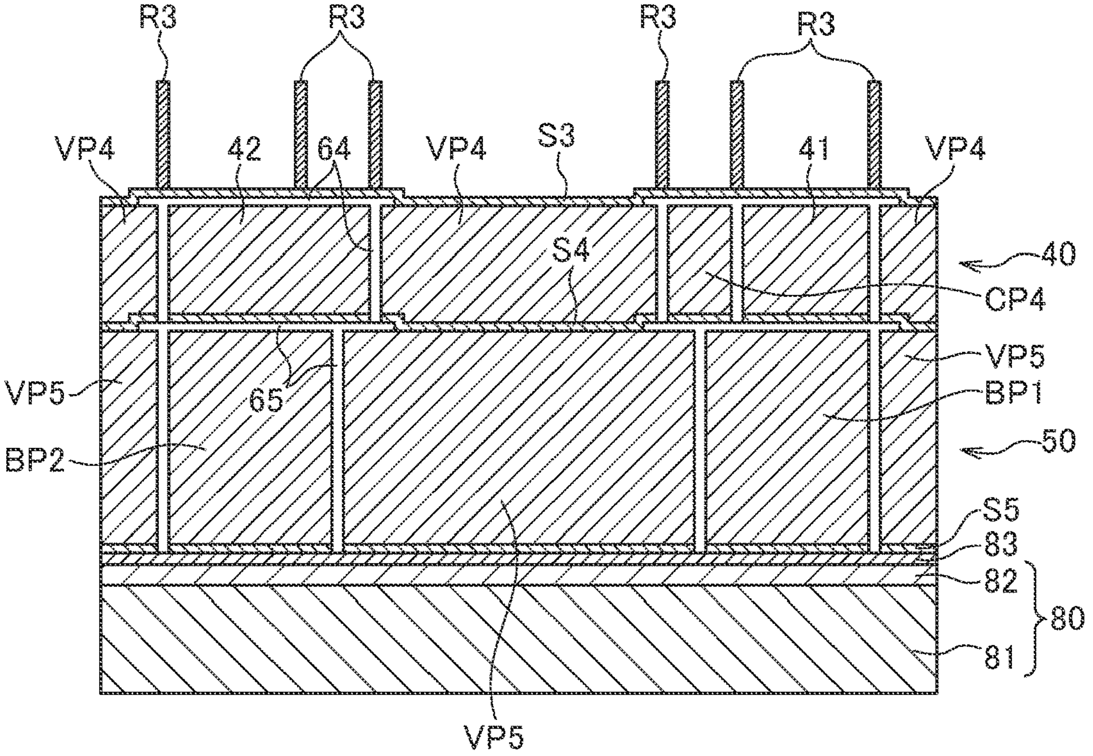
FIG. 16 is a process view for explaining the manufacturing method for the coil component 1.
Figure 17:
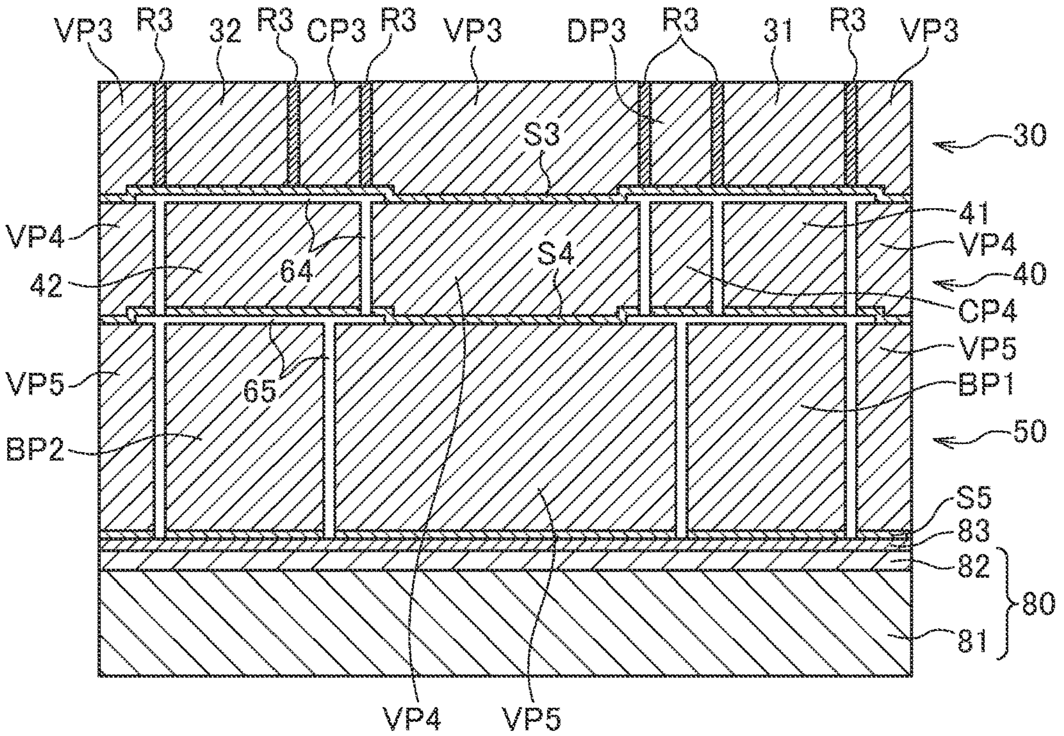
FIG. 17 is a process view for explaining the manufacturing method for the coil component 1.

Subsequently, electroless plating is performed to form a seed layer S3 on the entire surface, followed by formation of a resist pattern R3 on the seed layer S3 (FIG. 16). The resist pattern R3 serves as negative patterns of the coil pattern CP3, dummy pattern DP3, and electrode patterns 31 and 32. Then, electrolytic plating is performed to grow the seed layer S3 to thereby form the conductor layer 30 (FIG. 17). As a result, the spiral-shaped coil pattern CP3 and dummy pattern DP3, and electrode patterns 31 and 32 are formed in areas defined by the resist pattern R3. At this time, a sacrificial pattern VP3 is formed in the inner diameter areas and outer areas of the coil pattern CP3 and dummy pattern DP3.

Figure 18:
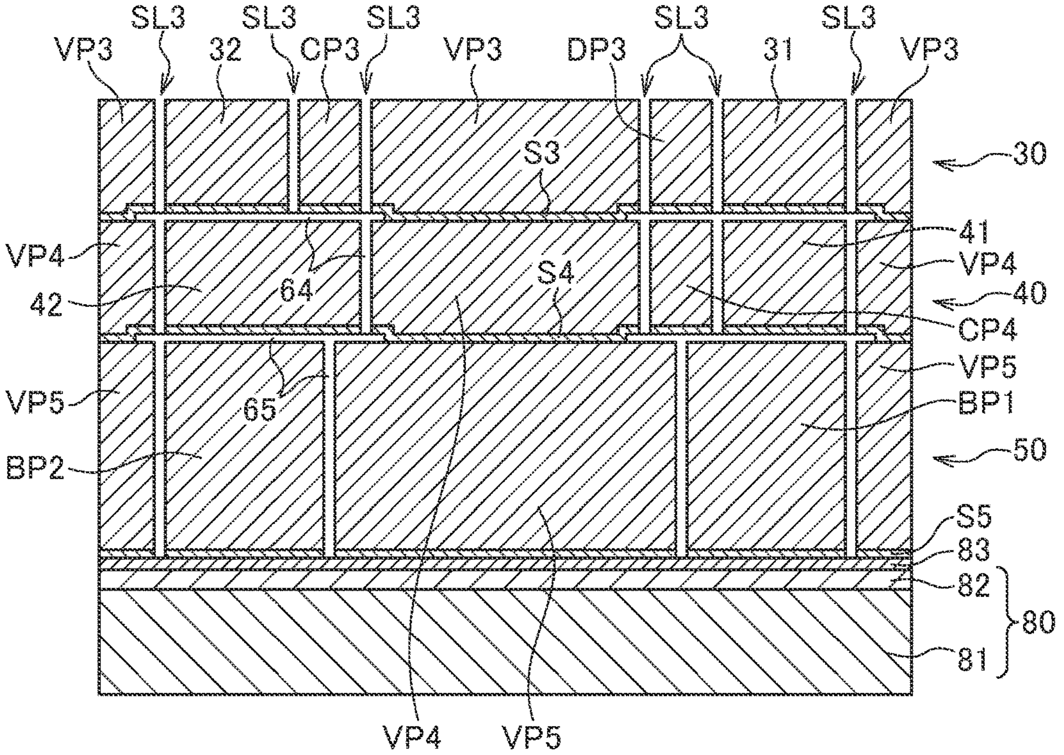
FIG. 18 is a process view for explaining the manufacturing method for the coil component 1.
Figure 37:
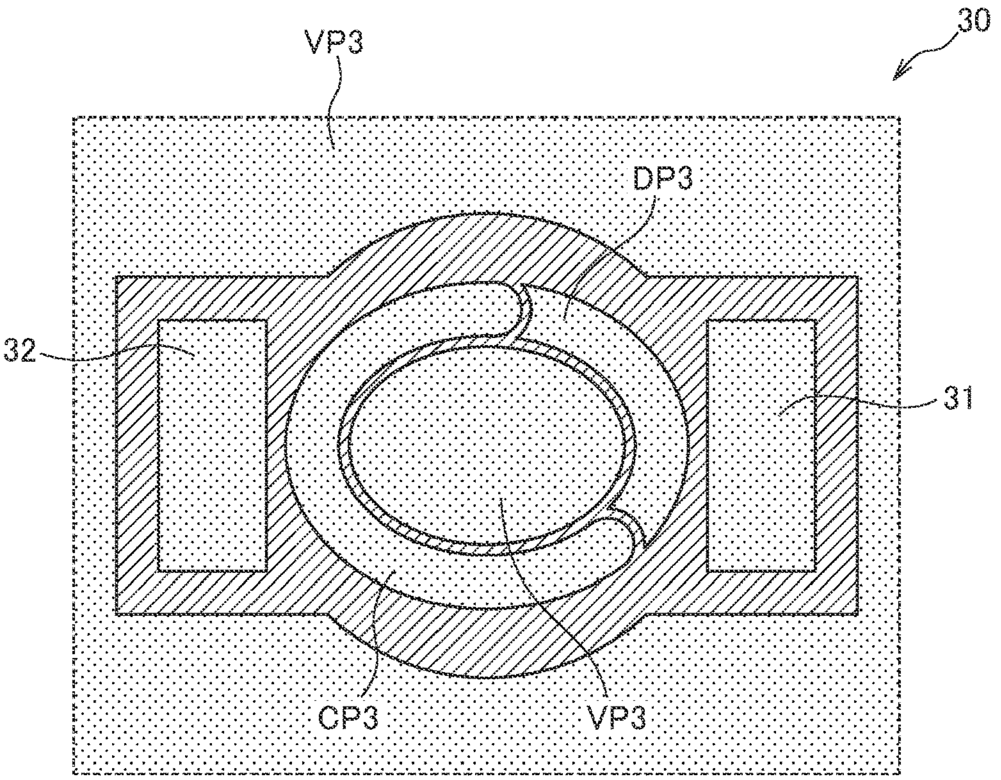
FIG. 37 is a plan view illustrating a pattern shape of the conductor layer 30.

After peeling off the resist pattern R3, a part of the seed layer S3 that is exposed to the peeled portion of the resist pattern R3 is removed by etching (FIG. 18). As a result, the coil pattern CP3, electrode patterns 31 and 32, sacrificial pattern VP3, and dummy pattern DP3 are electrically isolated by a slit SL3. The conductor layer 30, whose planar shape is as illustrated in FIG. 37, includes the spirally wound coil pattern CP3 and dummy pattern DP3, two electrode patterns 31 and 32 positioned in the outer areas of the coil pattern CP3 and dummy pattern DP3, and the sacrificial pattern VP3 positioned in the inner diameter areas and outer areas of the coil pattern CP3 and dummy pattern DP3. One end of the coil pattern CP3 is connected to the other end of the coil pattern CP4 through the opening 64*e* formed in the insulating layer 64.

Figure 19:
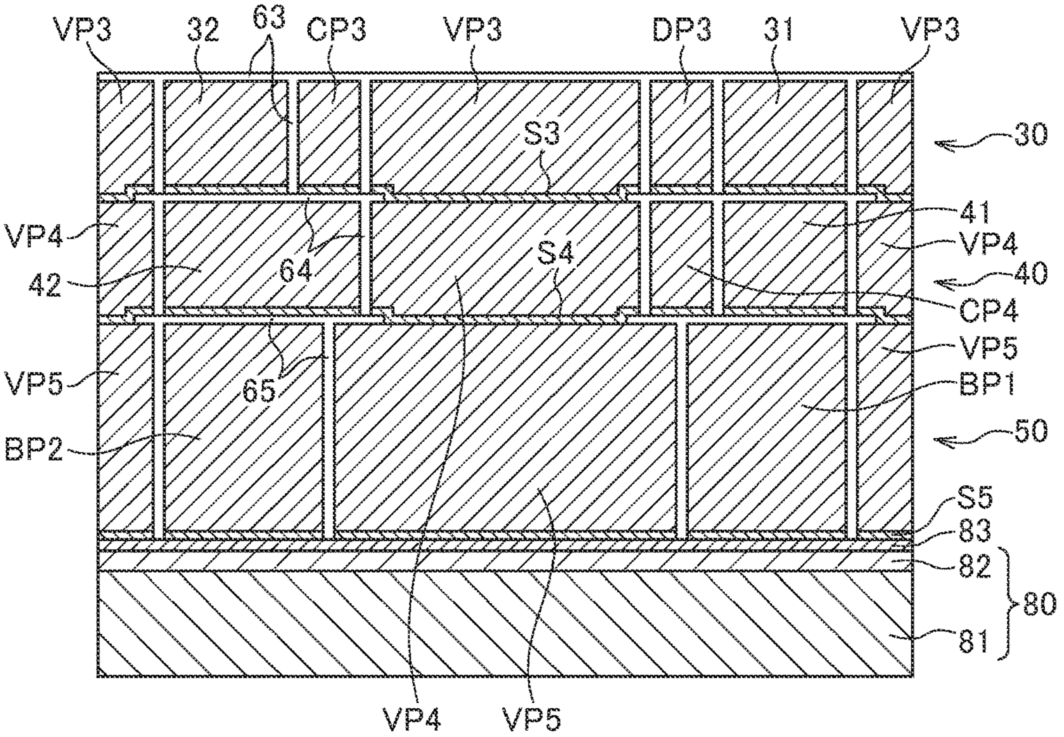
FIG. 19 is a process view for explaining the manufacturing method for the coil component 1.
Figure 20:
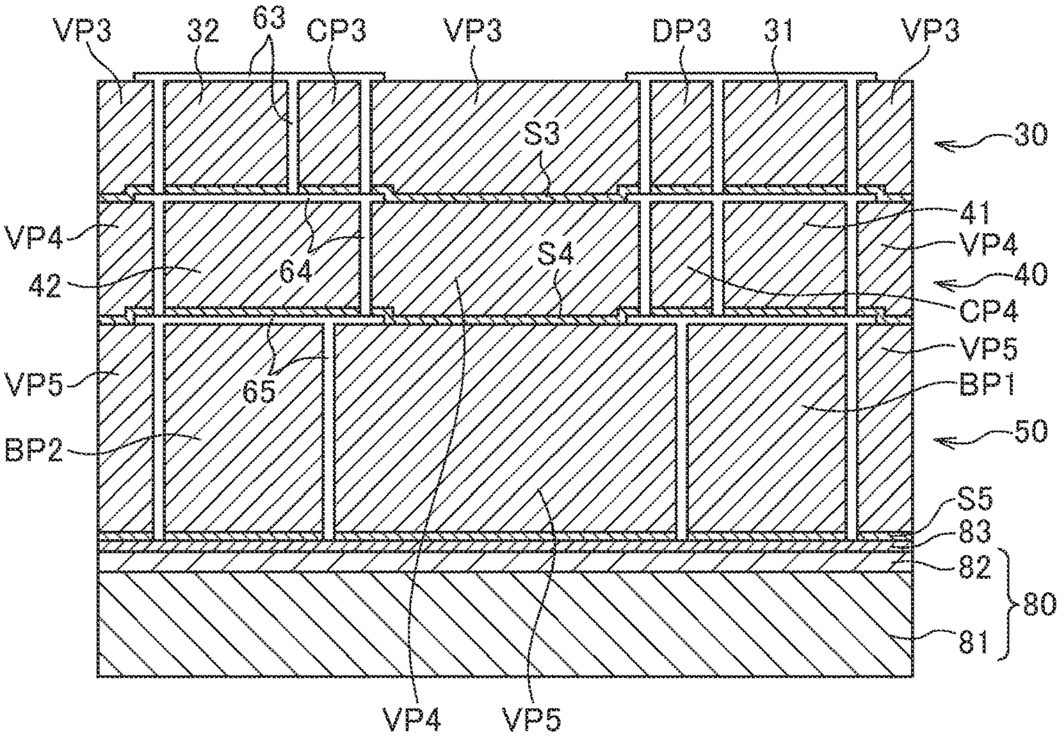
FIG. 20 is a process view for explaining the manufacturing method for the coil component 1.
Figure 38:
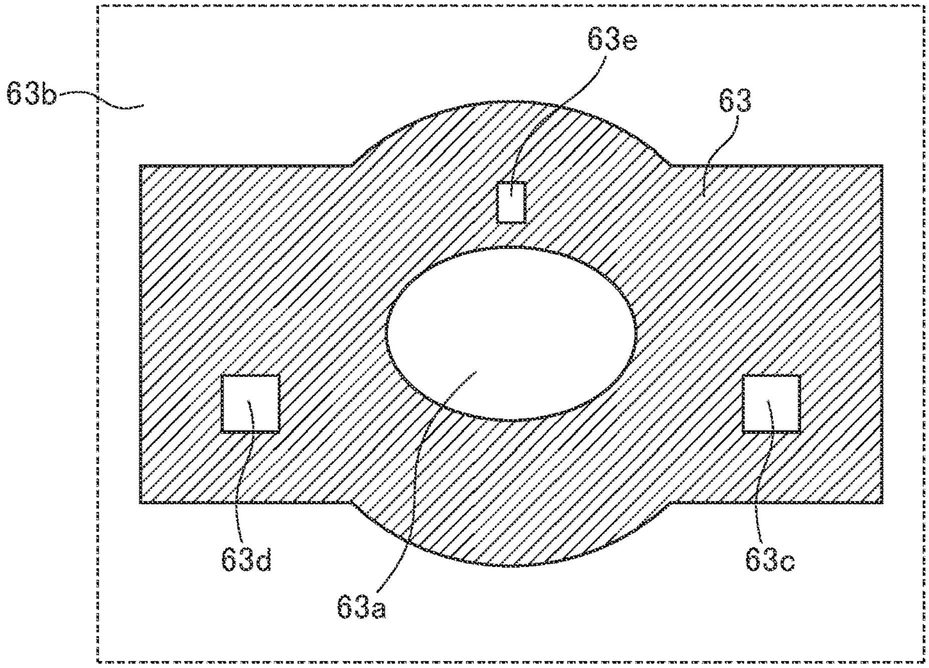
FIG. 38 is a plan view illustrating a pattern shape of the conductor layer 63.

Subsequently, the insulating layer 63 is formed on the surface of the conductor layer 30 so as to fill the slit SL3 (FIG. 19). The insulating layer 63 can be formed by a laminate method. Then, the insulating layer 63 is patterned to partly expose the coil pattern CP3, electrode patterns 31, 32, and sacrificial pattern VP3 (FIG. 20). The pattern shape of the insulating layer 63 is as illustrated in FIG. 38. That is, an opening 63*a* is formed at a position corresponding to the inner diameter area of the coil pattern CP3, an opening 63*b* is formed at a position corresponding to the outer area of the coil pattern CP3, and openings 63*c* to 63*e* are formed at positions corresponding to the electrode patterns 31, 32, and the other end of the coil pattern CP3, respectively.

Figure 21:
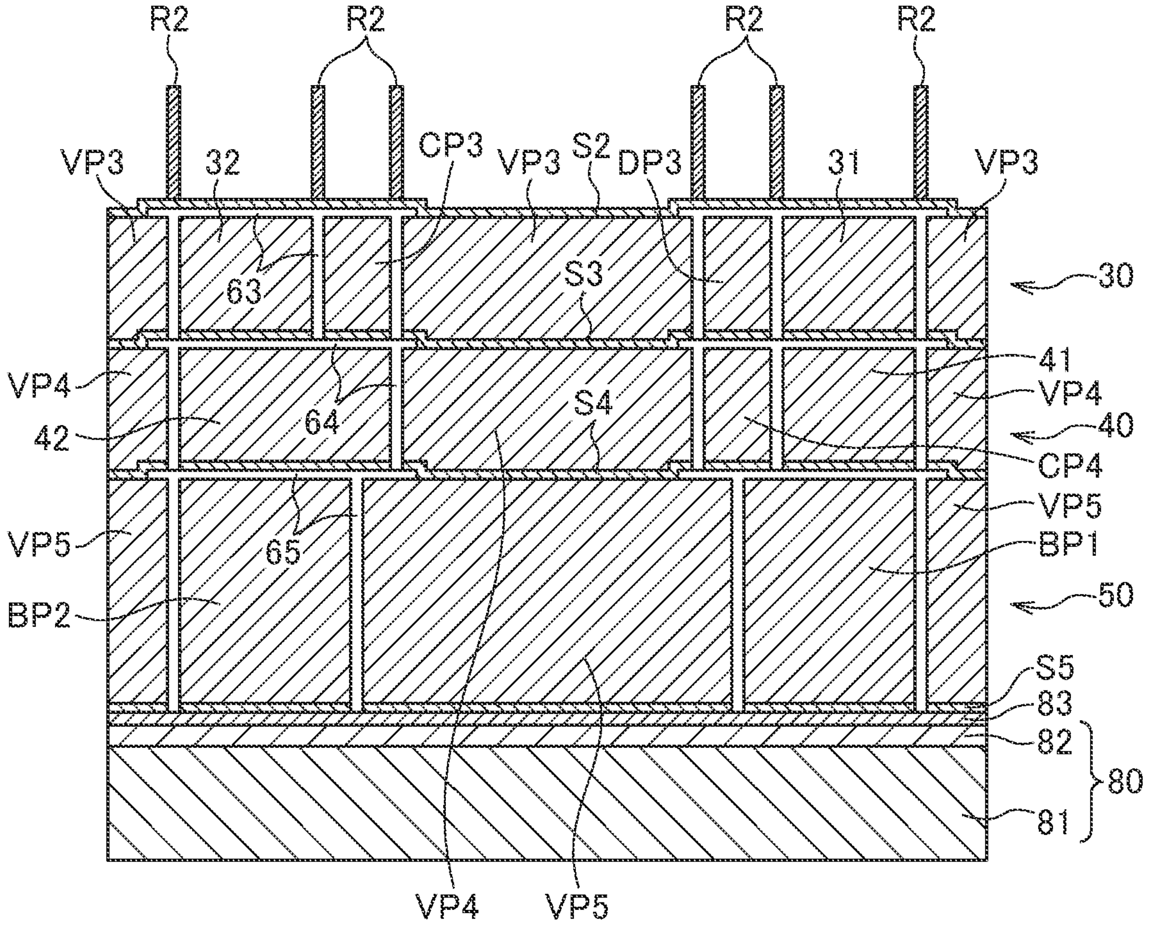
FIG. 21 is a process view for explaining the manufacturing method for the coil component 1.
Figure 22:
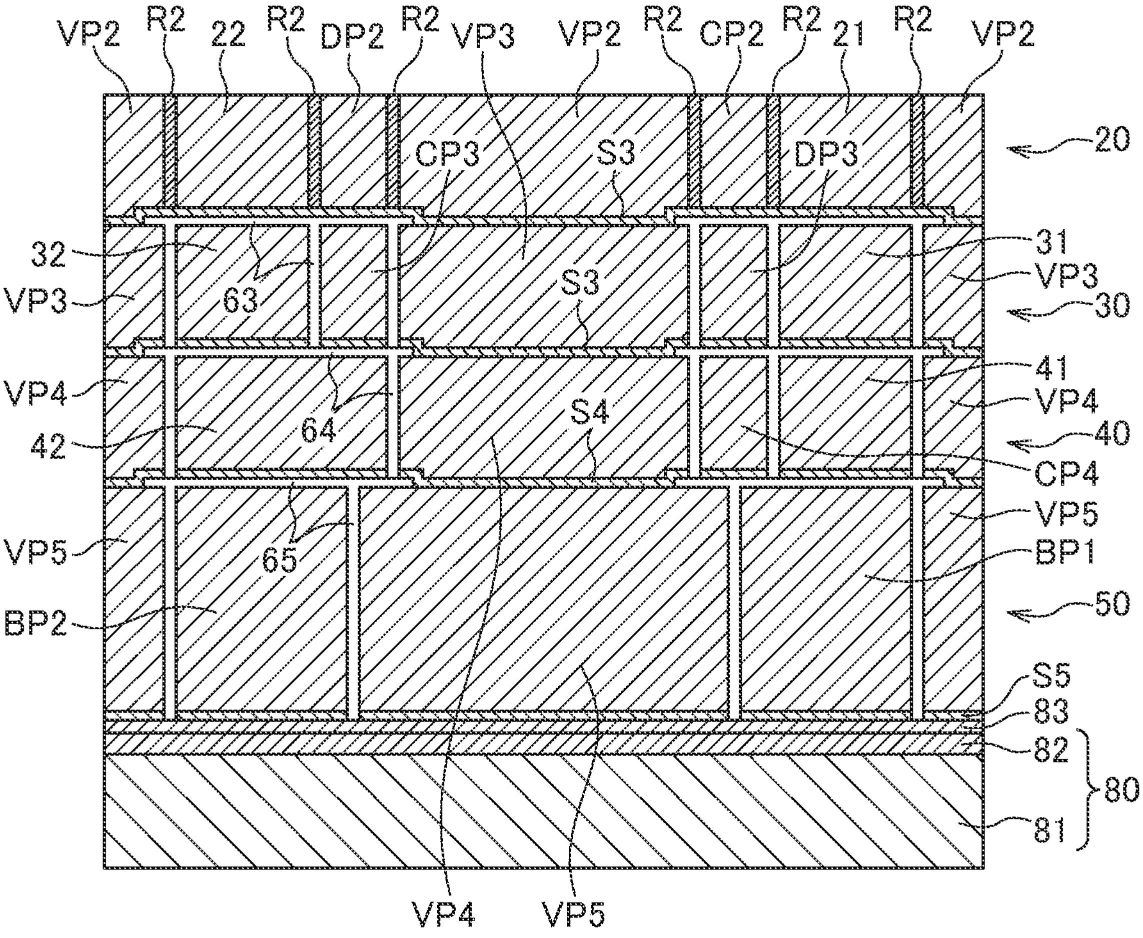
FIG. 22 is a process view for explaining the manufacturing method for the coil component 1.

Subsequently, electroless plating is performed to form a seed layer S2 on the entire surface, followed by formation of a resist pattern R2 on the seed layer S2 (FIG. 21). The resist pattern R2 serves as negative patterns of the coil pattern CP2, dummy pattern DP2, and electrode patterns 21 and 22. Then, electrolytic plating is performed to grow the seed layer S2 to thereby form the conductor layer 20 (FIG. 22). As a result, the spiral-shaped coil pattern CP2 and dummy pattern DP2, and electrode patterns 21 and 22 are formed in areas defined by the resist pattern R2. At this time, a sacrificial pattern VP2 is formed in the inner diameter areas and outer areas of the coil pattern CP2 and dummy pattern DP2.

Figure 23:
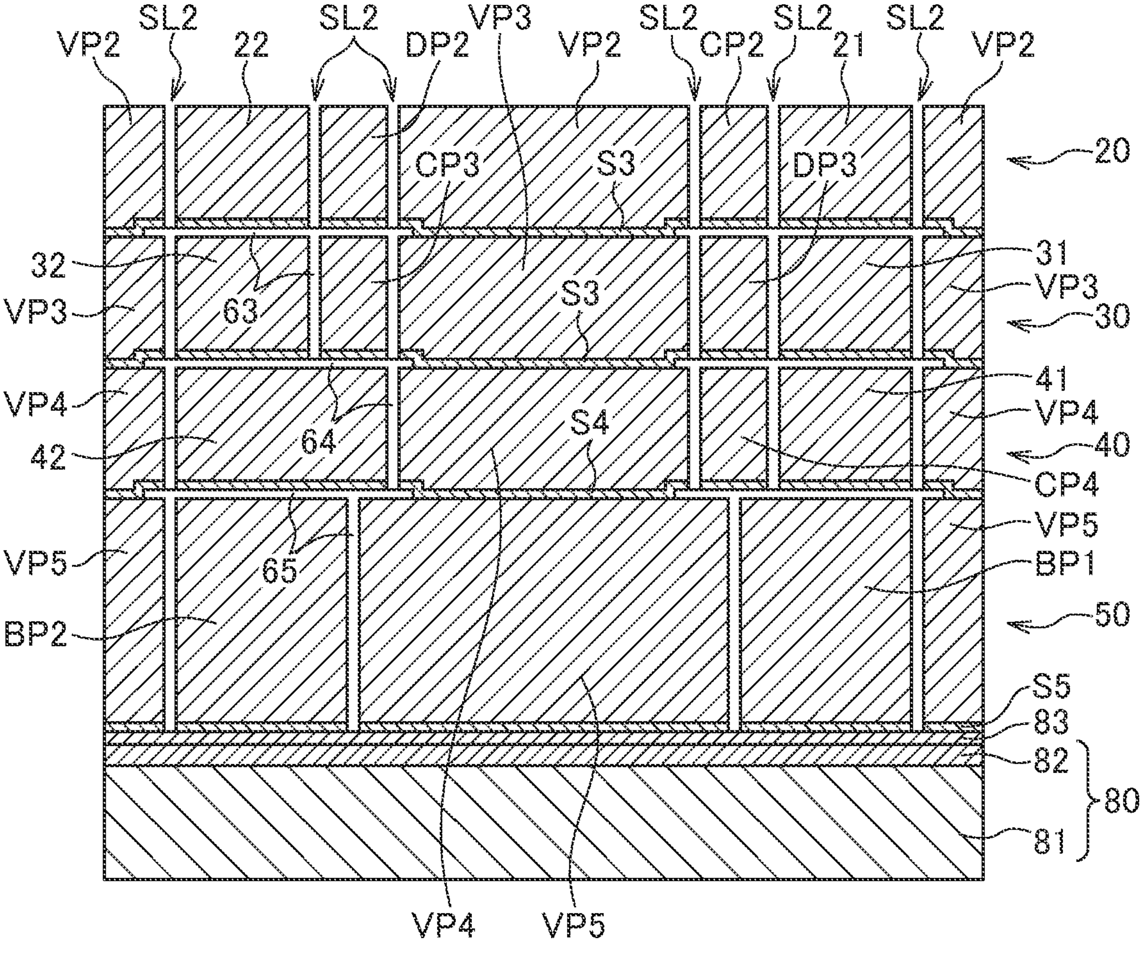
FIG. 23 is a process view for explaining the manufacturing method for the coil component 1.
Figure 39:
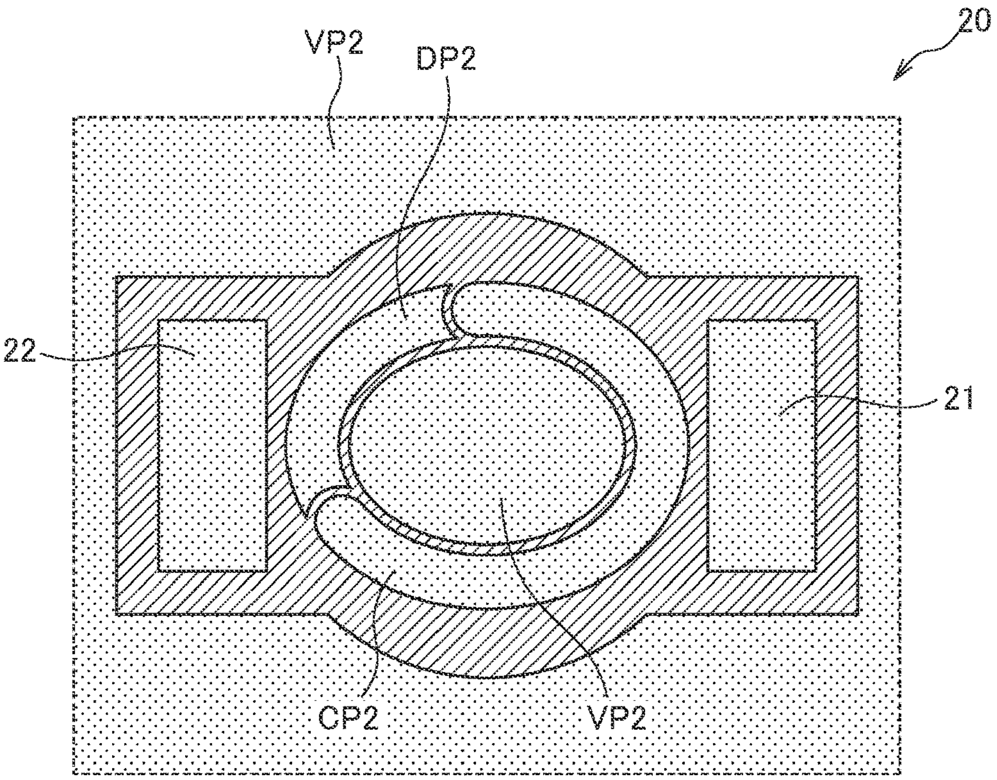
FIG. 39 is a plan view illustrating a pattern shape of the conductor layer 20.

After peeling off the resist pattern R2, a part of the seed layer S2 that is exposed to the peeled portion of the resist patterns R2 is removed by etching (FIG. 23). As a result, the coil pattern CP2, electrode patterns 21 and 22, sacrificial pattern VP2, and dummy pattern DP2 are electrically isolated from one another by a slit SL2. The conductor layer 20, whose planar shape is as illustrated in FIG. 39, includes the spirally wound coil pattern CP2 and dummy pattern DP2, two electrode patterns 21 and 22 positioned in the outer areas of the coil pattern CP2 and dummy pattern DP2, and the sacrificial pattern VP2 positioned in the inner diameter areas and outer areas of the coil pattern CP2 and dummy pattern DP2. One end of the coil pattern CP2 is connected to the other end of the coil pattern CP3 through the opening 63*e* formed in the insulating layer 63.

Figure 24:
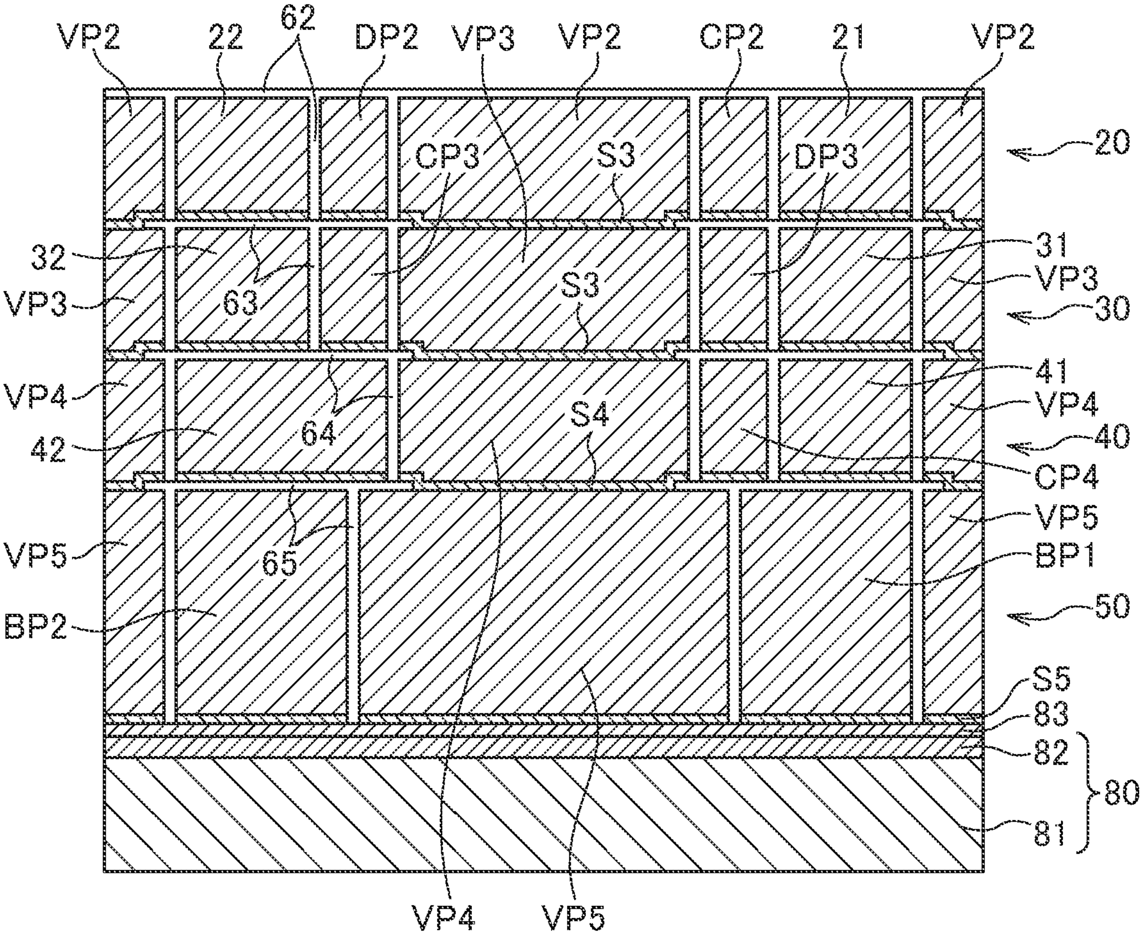
FIG. 24 is a process view for explaining the manufacturing method for the coil component 1.
Figure 25:
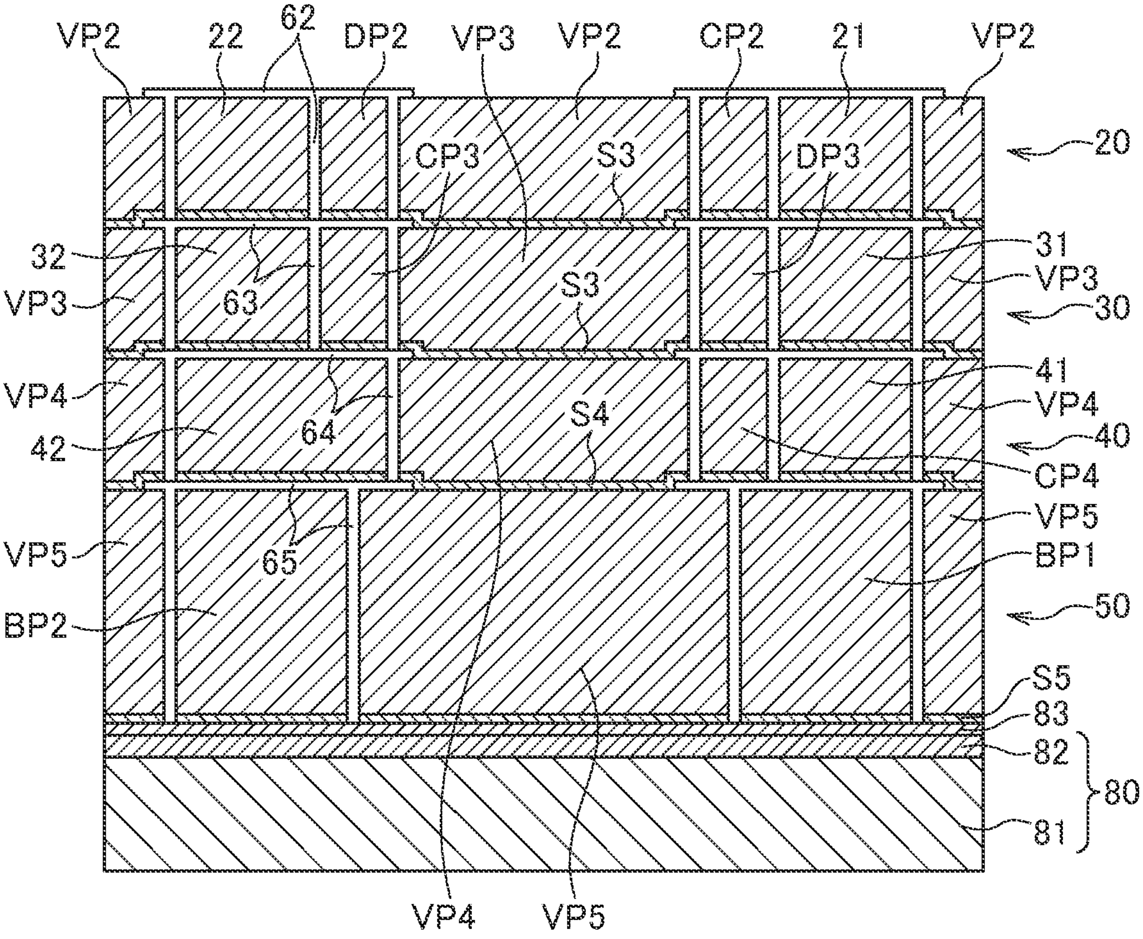
FIG. 25 is a process view for explaining the manufacturing method for the coil component 1.
Figure 40:
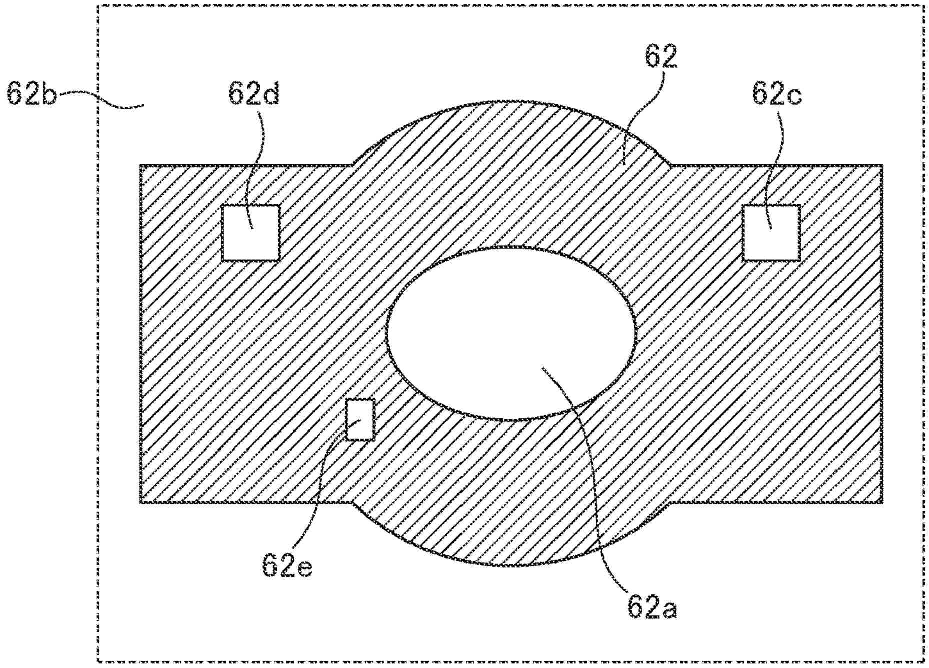
FIG. 40 is a plan view illustrating a pattern shape of the conductor layer 62.

Subsequently, the insulating layer 62 is formed on the surface of the conductor layer 20 so as to fill the slit SL2 (FIG. 24). The insulating layer 62 can be formed by a laminate method. Then, the insulating layer 62 is patterned to partly expose the coil pattern CP2, electrode patterns 21, 22, and sacrificial pattern VP2 (FIG. 25). The pattern shape of the insulating layer 62 is as illustrated in FIG. 40. That is, an opening 62*a* is formed at a position corresponding to the inner diameter areas of the coil pattern CP2 and dummy pattern DP2, an opening 62*b* is formed at a position corresponding to the outer areas of the coil pattern CP2 and dummy pattern DP2, and openings 62*c* to 62*e* are formed at positions corresponding to the electrode patterns 21, 22, and the other end of the coil pattern CP2, respectively.

Figure 26:
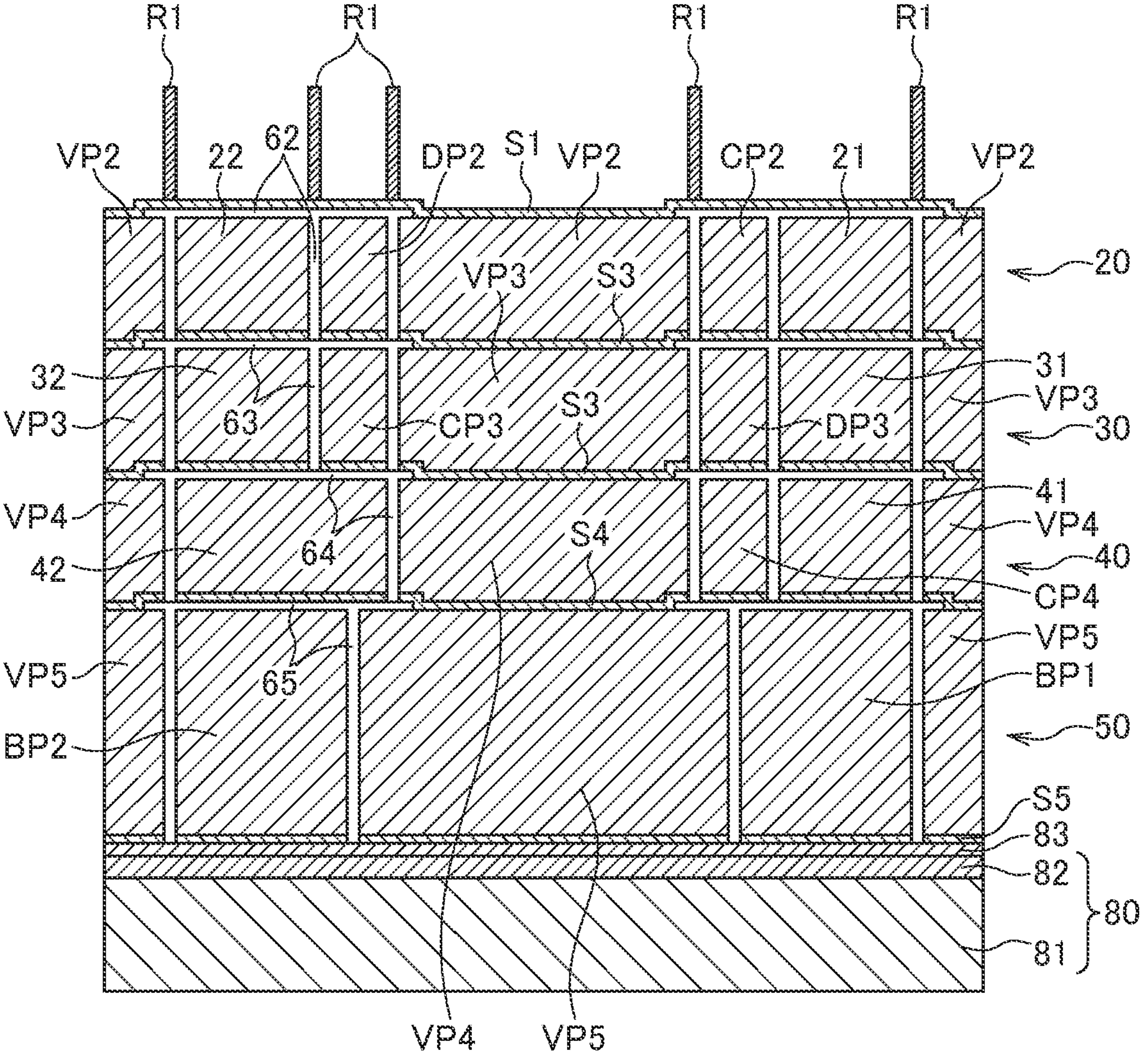
FIG. 26 is a process view for explaining the manufacturing method for the coil component 1.
Figure 27:
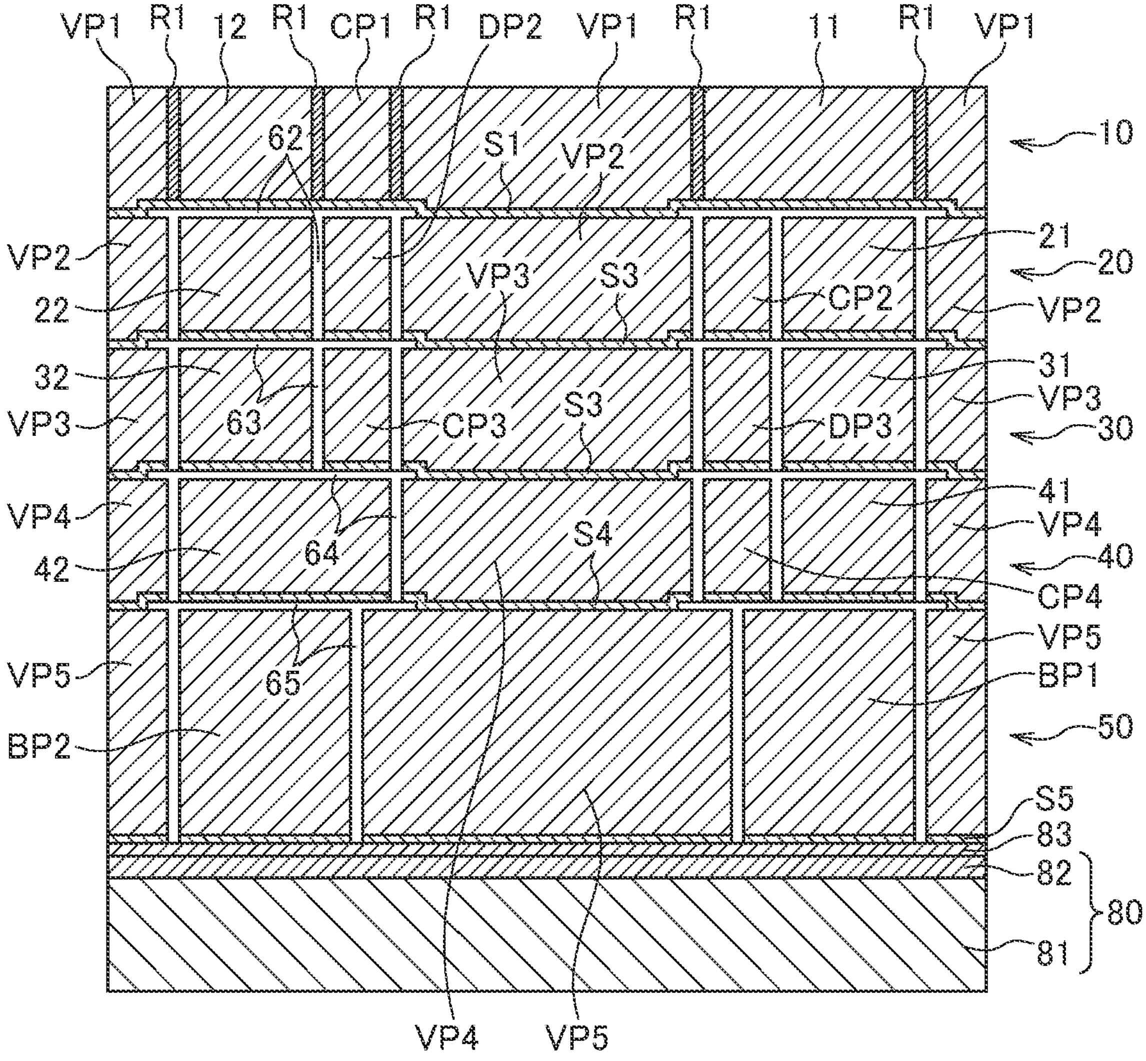
FIG. 27 is a process view for explaining the manufacturing method for the coil component 1.

Subsequently, electroless plating is performed to form a seed layer S1 on the entire surface, followed by formation of a resist pattern R1 on the seed layer S1 (FIG. 26). The resist pattern R1 serves as negative patterns of the coil pattern CP1, dummy pattern DP1 (not visible in the cross-sectional view), and electrode patterns 11 and 12. Then, electrolytic plating is performed to grow the seed layer S1 to thereby form the conductor layer 10 (FIG. 27). As a result, the spiral-shaped coil pattern CP1 and dummy pattern DP1, and electrode patterns 11 and 12 are formed in areas defined by the resist pattern R1. At this time, a sacrificial pattern VP1 is formed in the inner diameter areas and outer areas of the coil pattern CP1 and dummy pattern DP1.

Figure 28:
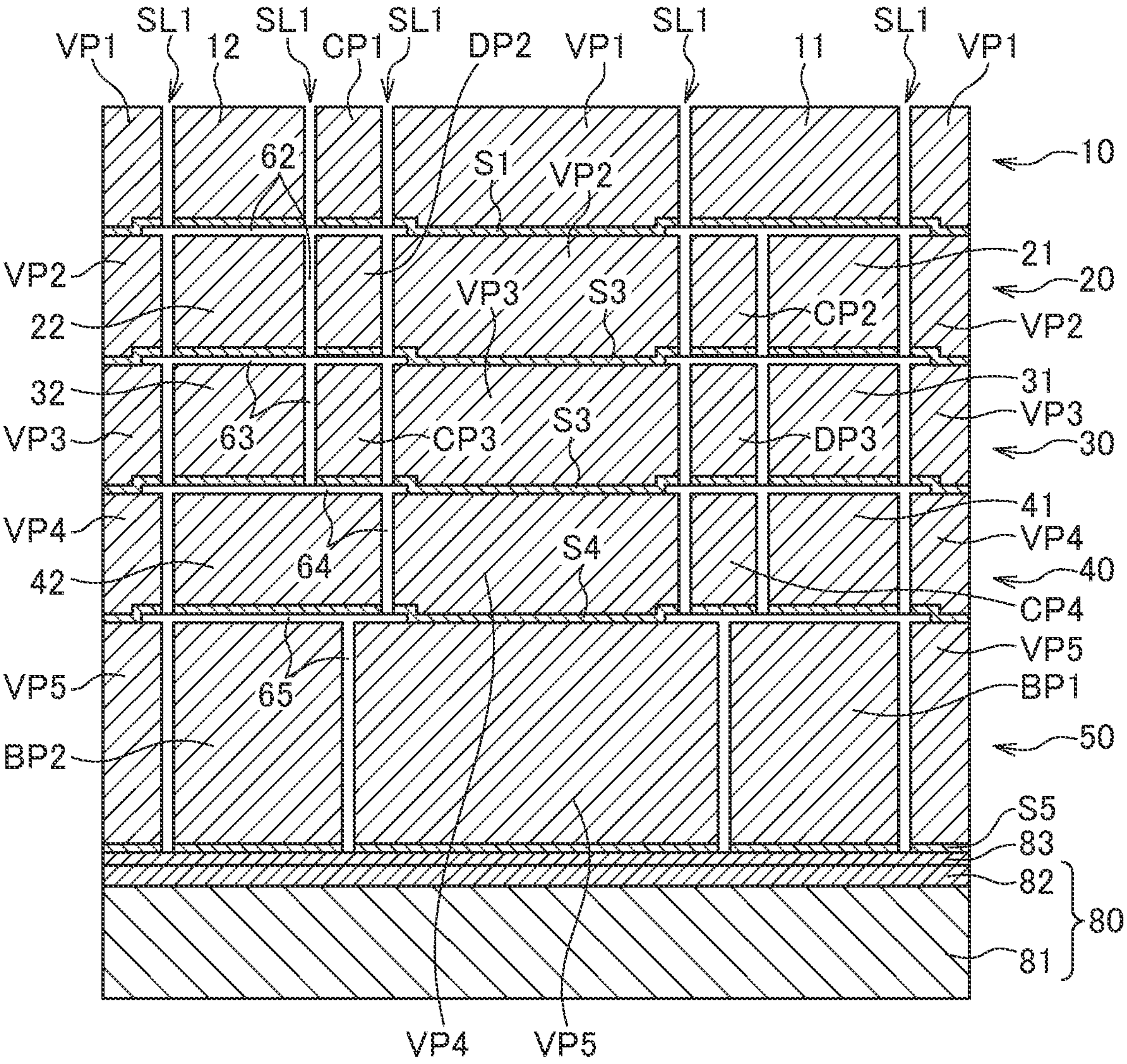
FIG. 28 is a process view for explaining the manufacturing method for the coil component 1.
Figure 41:
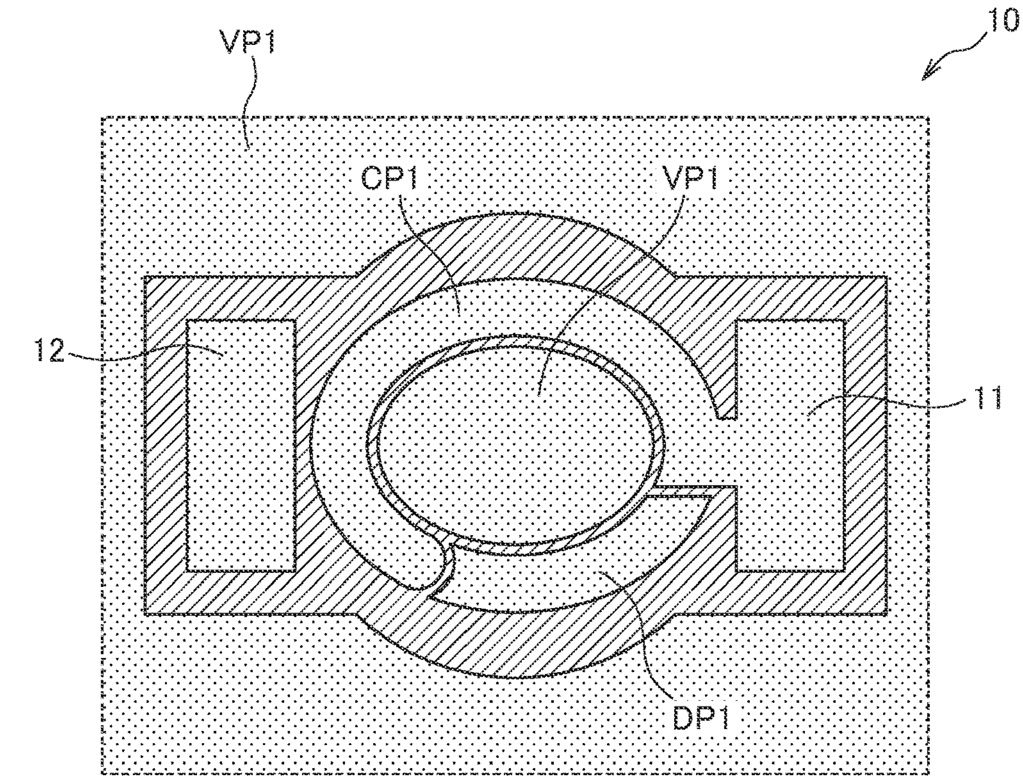
FIG. 41 is a plan view illustrating a pattern shape of the conductor layer 10.

After peeling off the resist pattern R1, a part of the seed layer S1 that is exposed to the peeled portion of the resist pattern R1 is removed by etching (FIG. 28). As a result, the coil pattern CP1, electrode patterns 11 and 12, sacrificial pattern VP1, and dummy pattern DP1 are electrically isolated from one another by a slit SL1. The conductor layer 10, whose planar shape is as illustrated in FIG. 41, includes the spirally wound coil pattern CP1 and dummy pattern DP1, two electrode patterns 11 and 12 positioned in the outer areas of the coil pattern CP1 and dummy pattern DP1, and the sacrificial pattern VP1 positioned in the inner diameter areas and outer areas of the coil pattern CP1 and dummy pattern DP1. One end of the coil pattern CP1 is connected to the other end of the coil pattern CP2 through the opening 62*e* formed in the insulating layer 62. As illustrated in FIG. 41, the other end of the coil pattern CP1 is connected to the electrode pattern 11.

Figure 29:
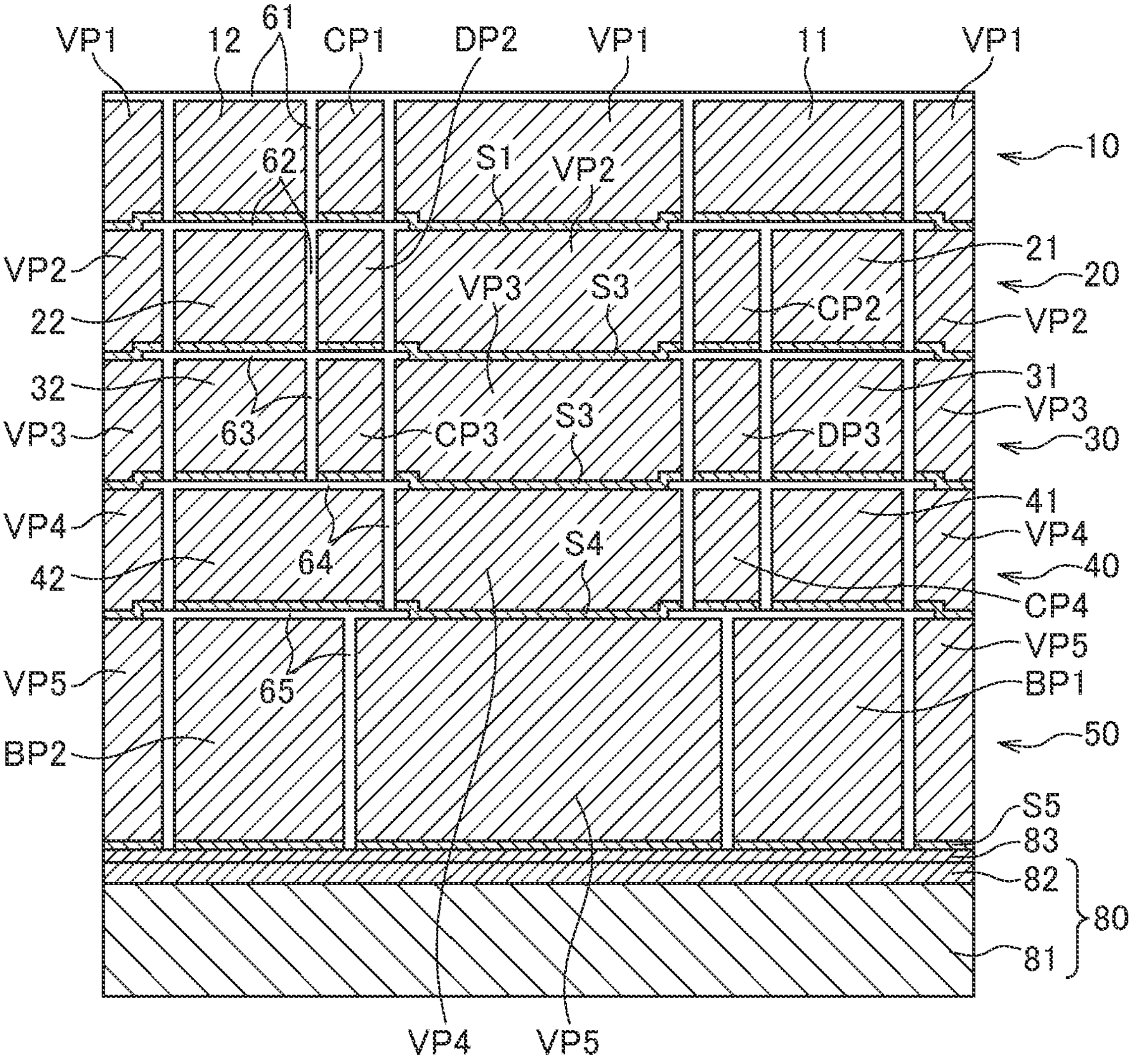
FIG. 29 is a process view for explaining the manufacturing method for the coil component 1.
Figure 30:
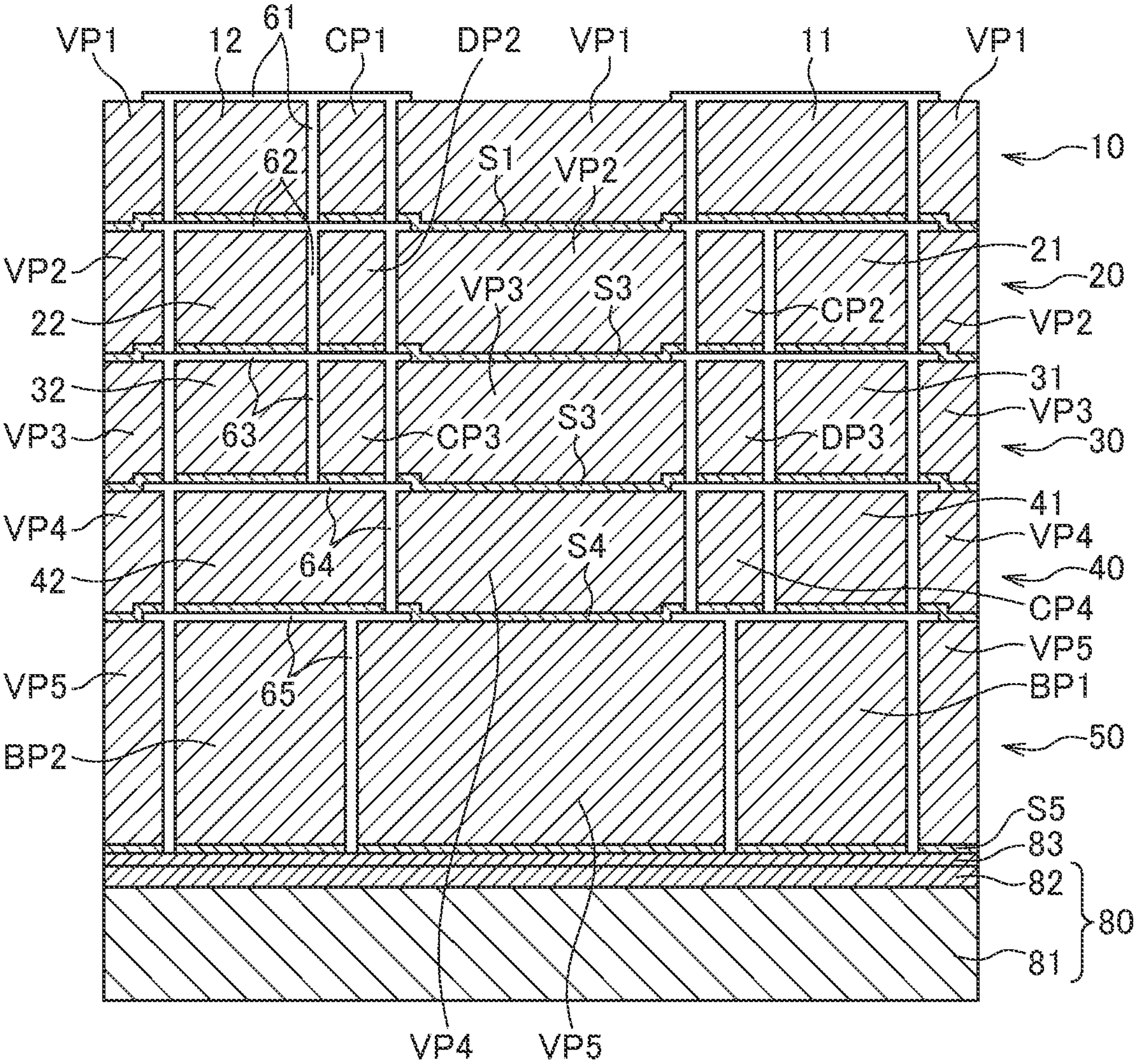
FIG. 30 is a process view for explaining the manufacturing method for the coil component 1.
Figure 42:
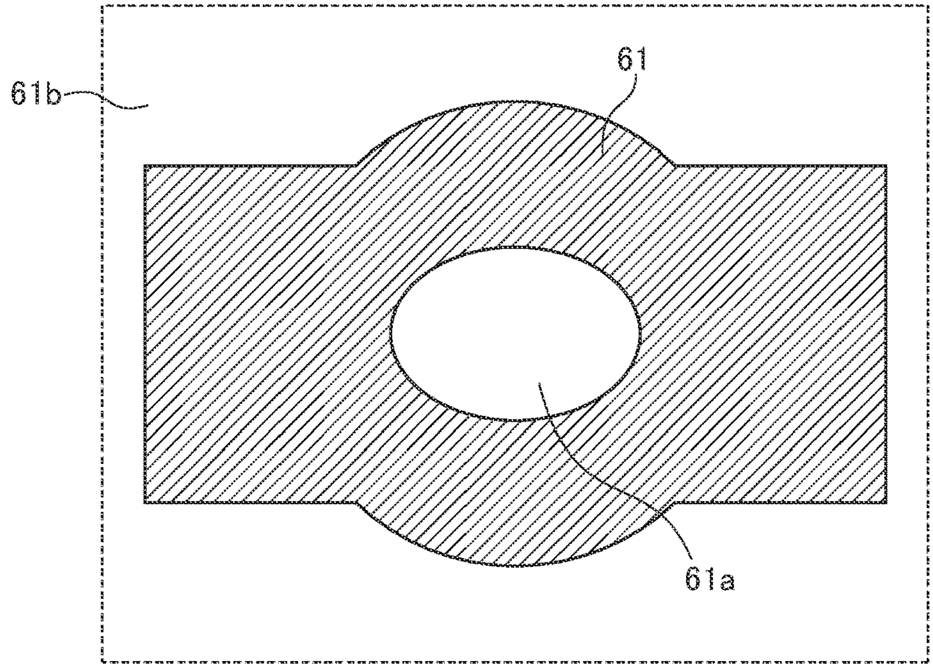
FIG. 42 is a plan view illustrating a pattern shape of the conductor layer 61.

Subsequently, the insulating layer 61 is formed on the surface of the conductor layer 10 so as to fill the slit SL1 (FIG. 29). The insulating layer 61 can be formed by a laminate method. Then, the insulating layer 61 is patterned to partly expose the sacrificial pattern VP1 (FIG. 30). The pattern shape of the insulating layer 61 is as illustrated in FIG. 42. That is, an opening 61*a* is formed at a position corresponding to the inner diameter area of the coil pattern CP1, and an opening 61*b* is formed at a position corresponding to the outer area of the coil pattern CP1.

Figure 31:
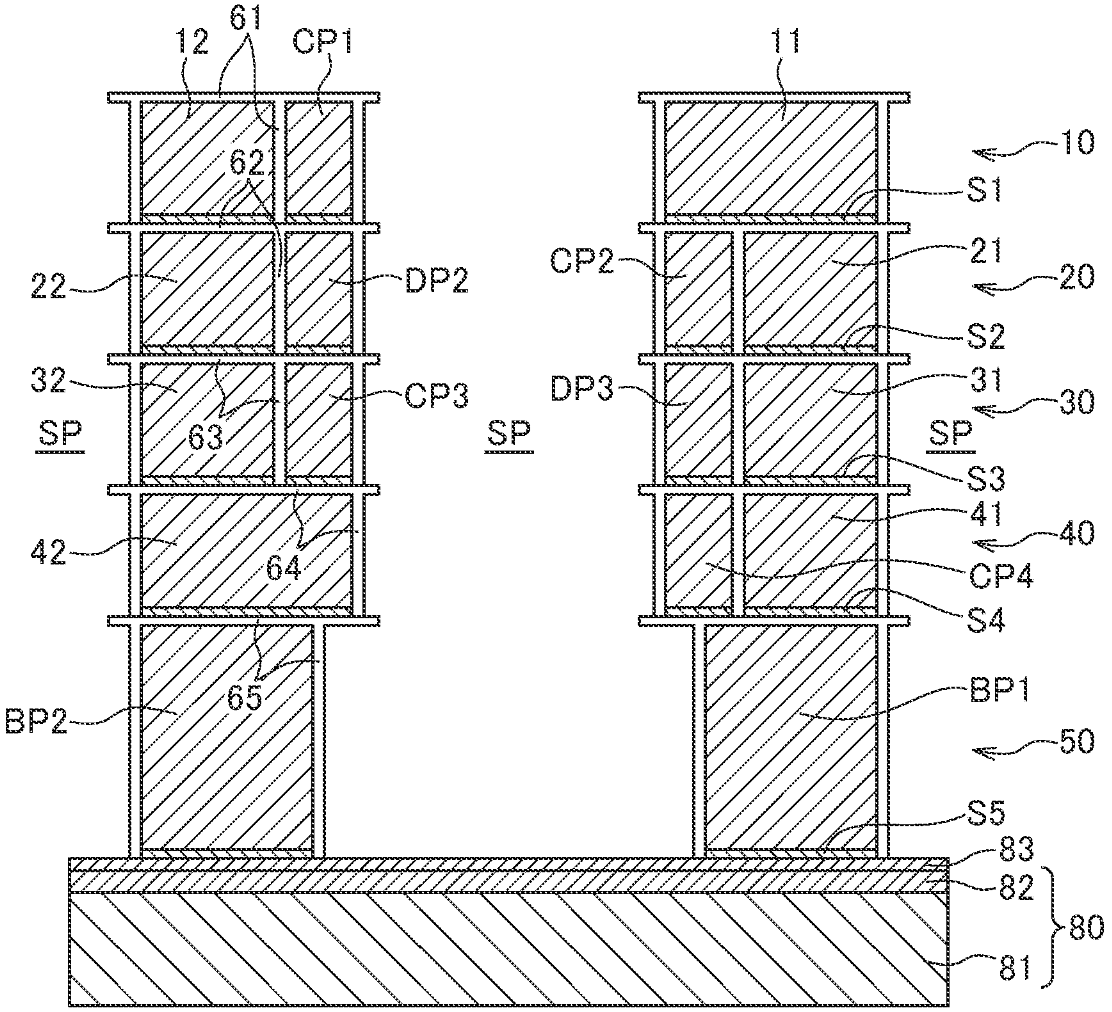
FIG. 31 is a process view for explaining the manufacturing method for the coil component 1.
Figure 32:
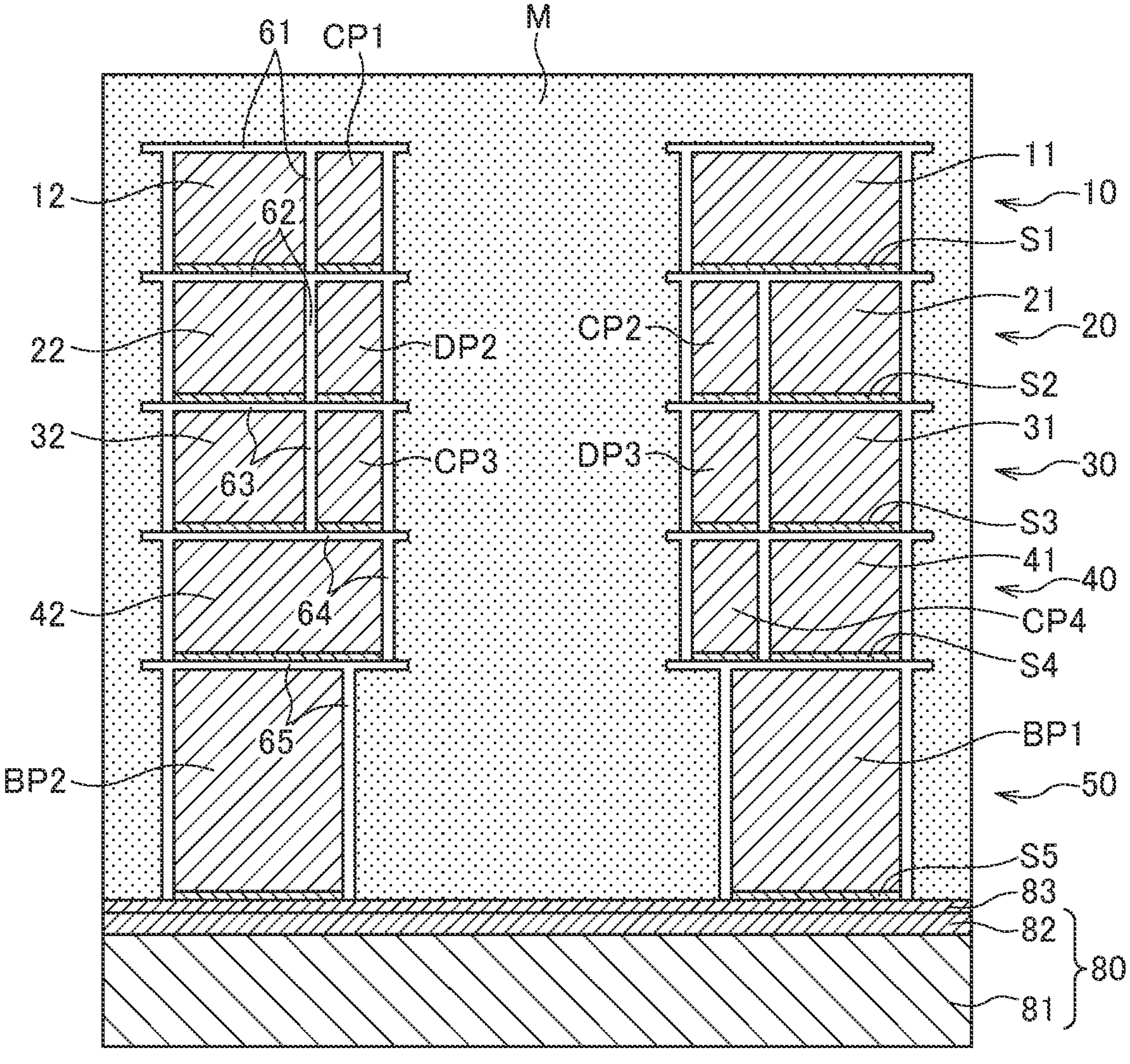
FIG. 32 is a process view for explaining the manufacturing method for the coil component 1.

Then, wet etching is performed in this state to remove the sacrificial patterns VP1 to VP5 (FIG. 31). The coil patterns CP1 to CP4, dummy patterns DP1 to DP4, electrode patterns 11, 12, 21, 22, 31, 32, 41, and 42, and conductor posts BP1 and BP2 are covered with the insulating layers 61 to 65 and are thus not etched. This forms a space SP in the inner diameter areas and outer areas of the coil patterns CP1 to CP4 and dummy patterns DP1 to DP4.

After the magnetic element body M is formed so as to fill the space SP (FIG. 32), the base 81, metal foil 82, and insulating layer 83 are peeled to expose the end portions of the conductor posts BP1 and BP2, whereby the coil component 1 according to the present embodiment is completed. The magnetic element body M can be formed by formation of an uncured or semi-cured composite member, followed by curing of resin contained in the composite member.

As described above, in the present embodiment, a plurality of conductor layers are stacked in order from the conductor layer 50 in which the conductor posts BP1 and BP2 are formed, to produce the coil component 1, so that not only the coil part C, but also the conductor posts BP1 and BP2 can be covered with the insulating layer 65. This can obtain a structure in which the insulating layer 65 is interposed between the conductor posts BP1, BP2 and the magnetic element body M, making it possible to prevent the occurrence of peeling therebetween.

Figure 43:
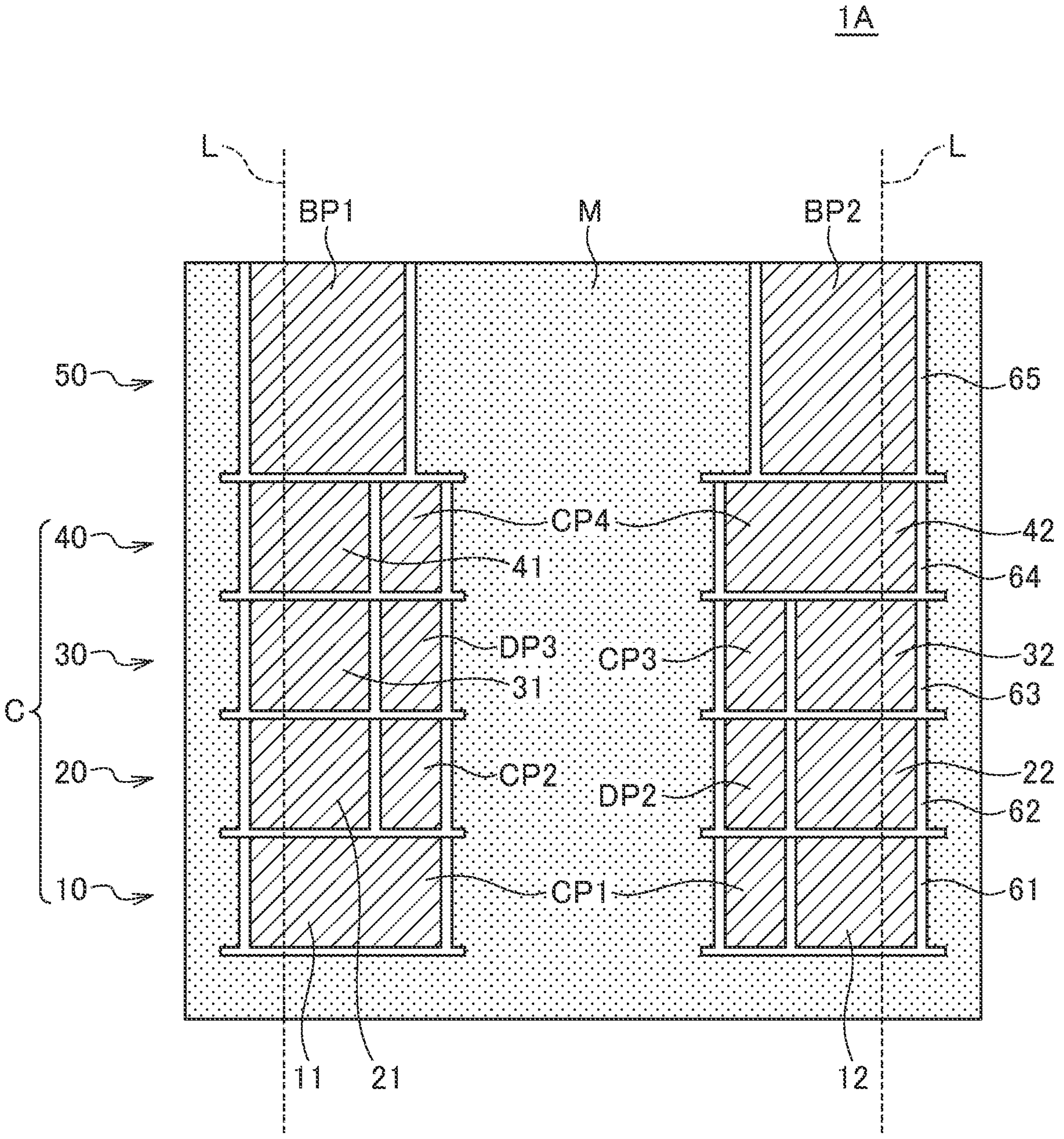
FIG. 43 is a schematic sectional view for explaining a structure of a coil component 1A according to a modification.

In the above-described coil component 1, only the upper end surfaces of the conductor posts BP1 and BP2 are exposed; however, as in a coil component 1A according to a modification illustrated in FIG. 43, dicing may be performed along the dicing line L to expose the side surfaces of the conductor posts BP1, BP2 and the side surfaces of the electrode patterns 11, 12, 21, 22, 31, 32, 41, and 42 from the magnetic element body M.

Second Embodiment

Figure 44:
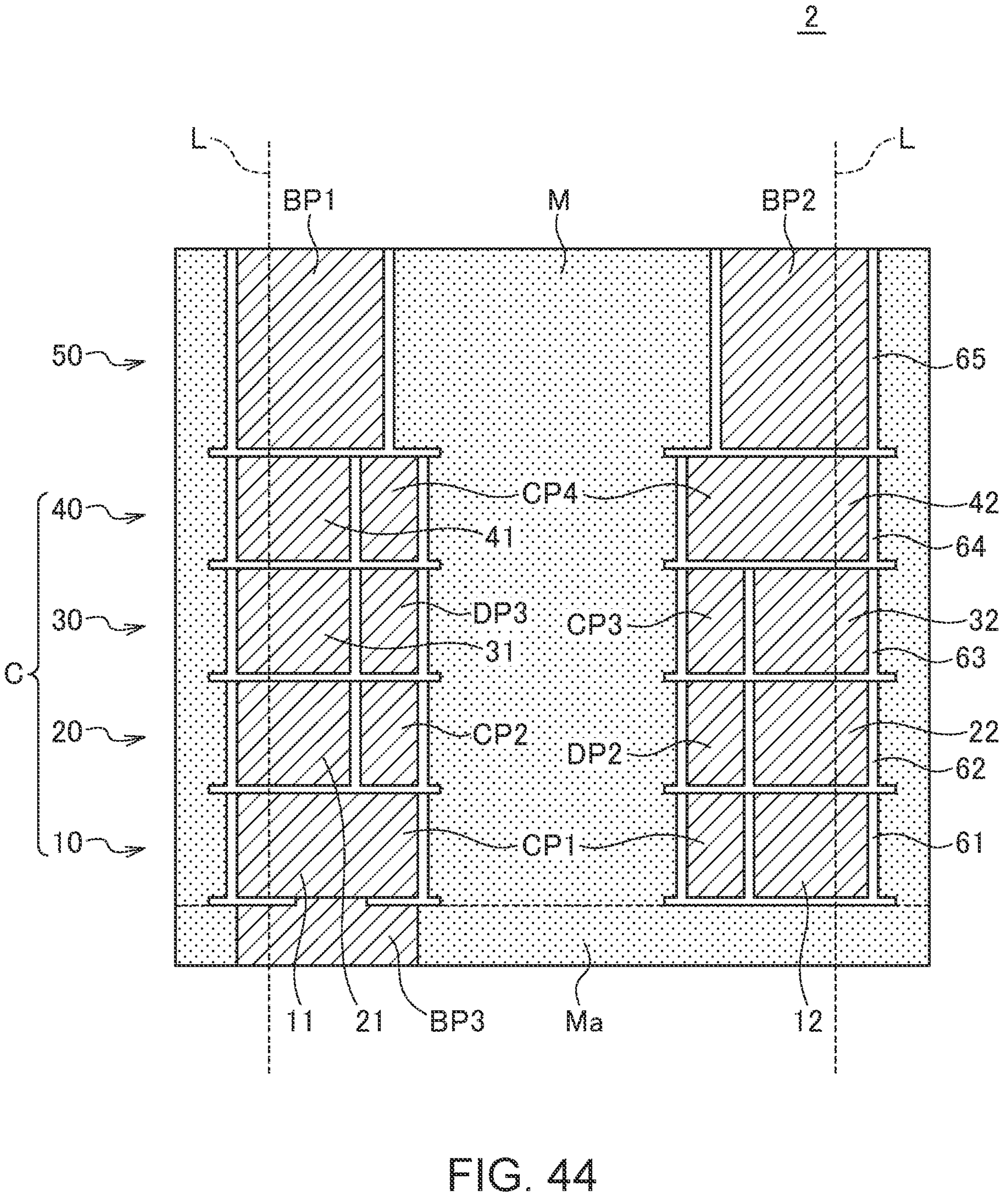
FIG. 44 is a schematic cross-sectional view for explaining the structure of a coil component 2 according to a second embodiment of the present invention.

FIG. 44 is a schematic cross-sectional view for explaining the structure of a coil component 2 according to a second embodiment of the present invention.

As illustrated in FIG. 44, the coil component 2 according to the present embodiment differs from the coil component 1 according to the first embodiment in that a conductor post BP3 is additionally provided. Other basic configurations are the same as those of the coil component 1 according to the first embodiment, so the same reference numerals are given to the same elements, and overlapping description will be omitted.

The conductor post BP3 is provided on the side opposite to the conductor posts BP1 and BP2 and is connected to the electrode pattern 11. It follows that the conductor posts BP3 and BP1 have the same potential. The conductor post BP3 is embedded in a magnetic element body Ma. The magnetic element body Ma may be made of the same material as that of the magnetic element body M; however, the magnetic element body Ma is formed through a process different from that for the magnetic element body M, which will be described later, so that an interface is formed between the magnetic element bodies M and Ma. Unlike the conductor post BP1, the side surfaces of the conductor post BP3 directly contact the magnetic element body Ma not through an insulating layer. When this may deteriorate reliability, a material having conductivity lower than that of the magnetic element body M may be selected as the material of the magnetic element body Ma, or an insulating layer may be interposed between the conductor posts B3 and the magnetic element body Ma.

As described above, in the coil component 2 according to the present embodiment, the conductor posts are provided so as to be exposed from both sides in the coil axis direction, i.e., from a first surface of the magnetic element body M positioned on one side in the coil axis direction and a second surface of the magnetic element body Ma positioned on the other side in the coil axis direction. Thus, for example, when the coil component 2 is embedded in a multilayer substrate, connection can be established from both upper and lower sides. Although only the conductor post BP3 is provided on the back surface side in the example illustrated in FIG. 44, another conductor post connected to the electrode pattern 12 may be provided in addition to the conductor post BP3.

The following describes a manufacturing method for the coil component 2 according to the present embodiment.

FIGS. 45 to 48 are process views for explaining the manufacturing method for the coil component 2 according to the present embodiment. Although the process views illustrated in FIGS. 45 to 48 each illustrate a cross section corresponding to one coil component 2, multiple coil components 2 can actually be obtained by creating every one of them at a time using an aggregate substrate.

Figure 45:
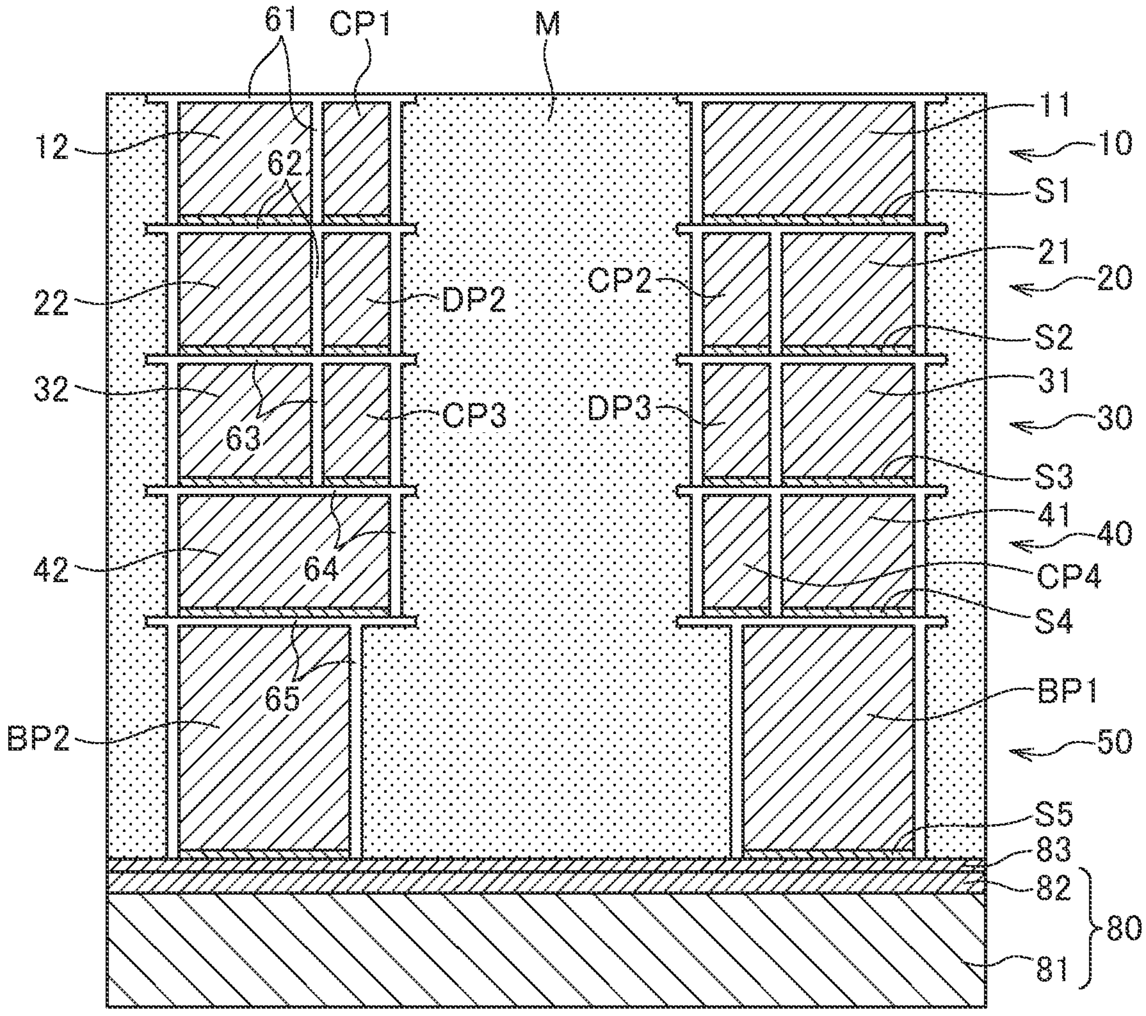
FIG. 45 is a process view for explaining the manufacturing method for the coil component 2.
Figure 46:
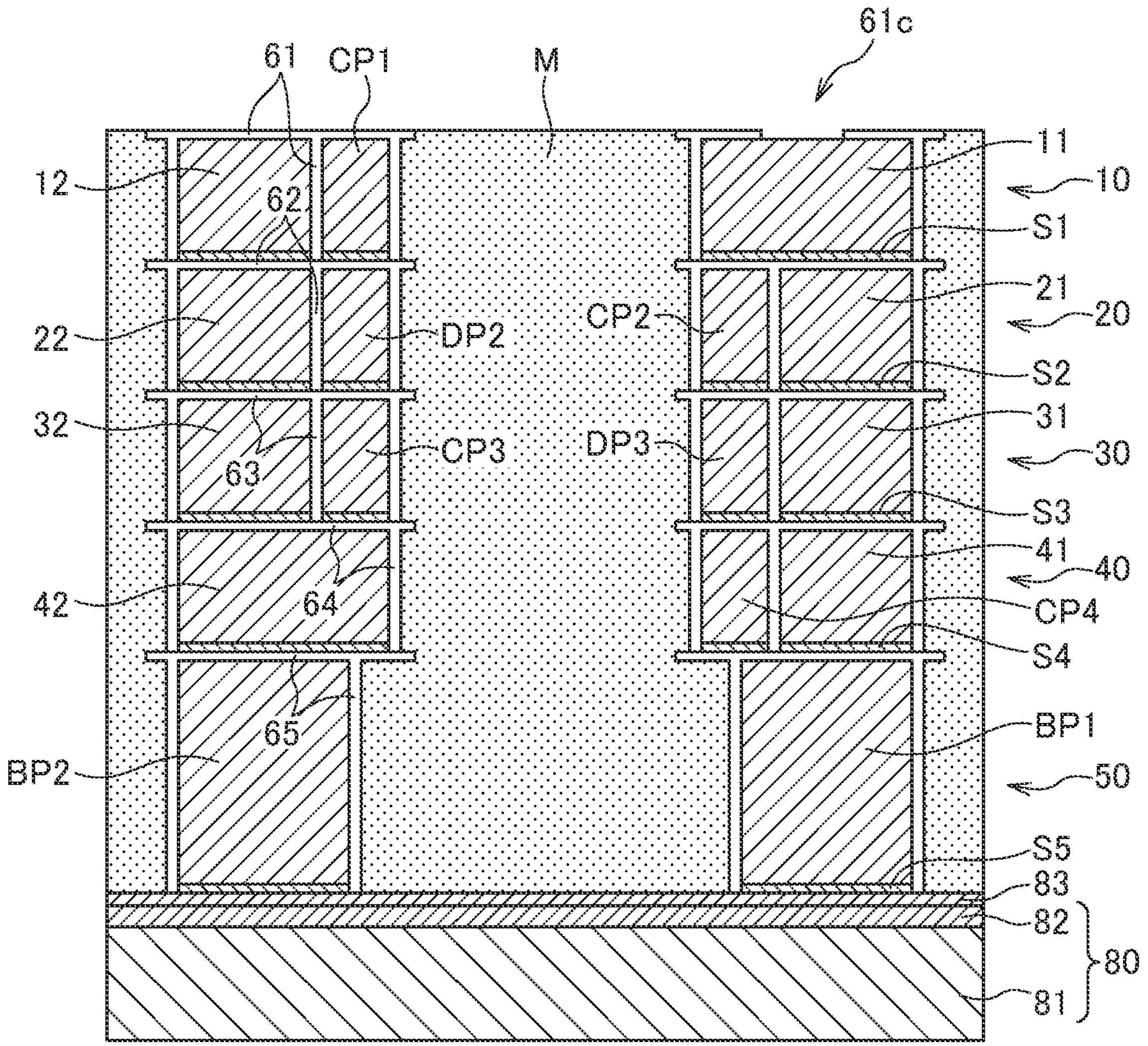
FIG. 46 is a process view for explaining the manufacturing method for the coil component 2.
Figure 47:
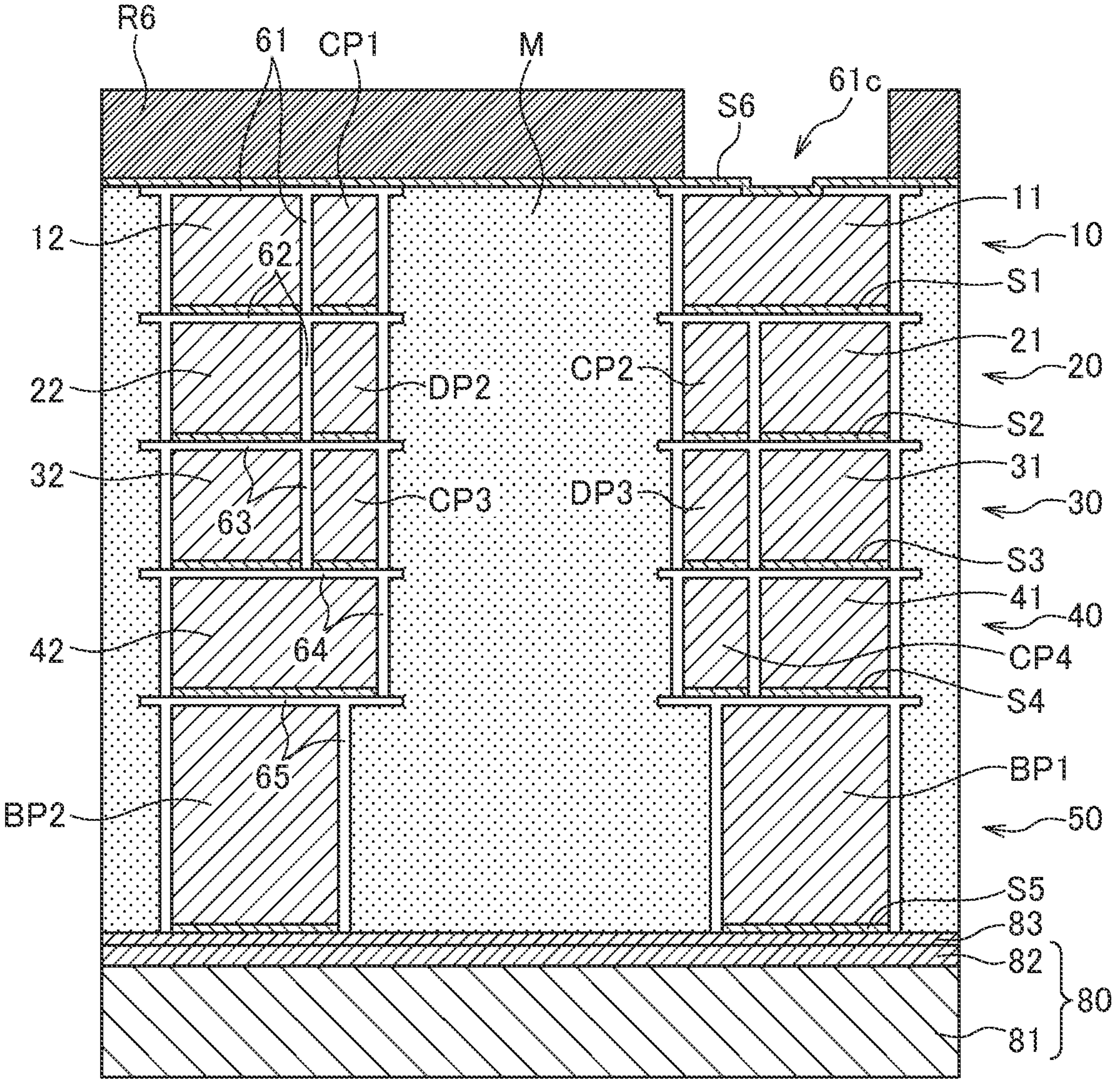
FIG. 47 is a process view for explaining the manufacturing method for the coil component 2.

After completion of the processes described using FIGS. 4 to 32, the magnetic element body M is polished to expose the insulating layer 61 (FIG. 45). Then, a photolithography method is used to form an opening 61*c* in the insulating layer 61 (FIG. 46). As a result, the electrode pattern 11 is partly exposed through the opening 61*c*. Then, electroless plating is performed to form a seed layer S6 that contacts the electrode pattern 11 through the opening 61*c*, and a resist pattern R6 is formed on the seed layer S6 (FIG. 47). The resist pattern R6 serves as a negative pattern of the conductor post BP3.

Figure 48:
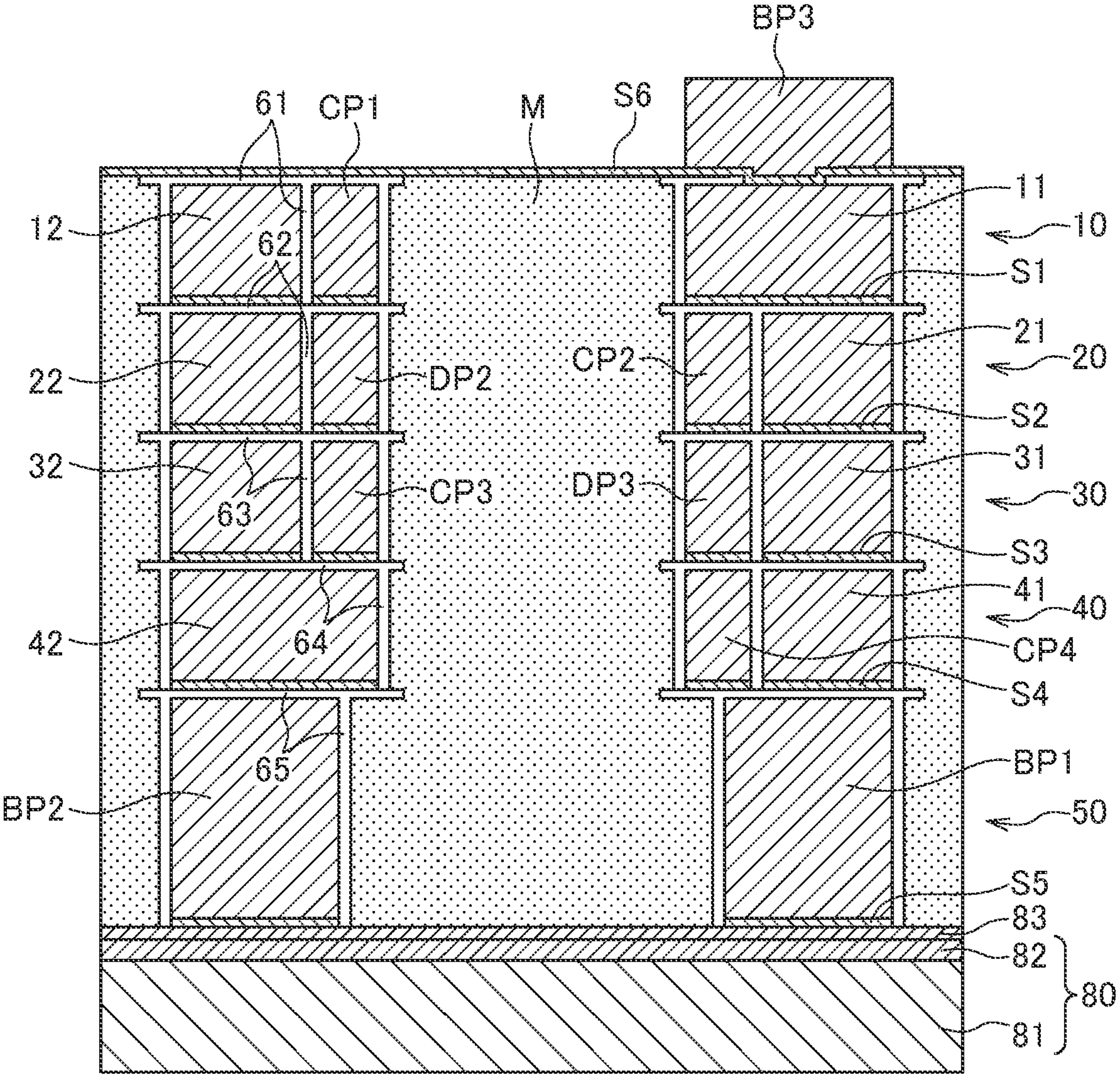
FIG. 48 is a process view for explaining the manufacturing method for the coil component 2.

Subsequently, electrolytic plating is performed to grow the seed layer S6 to thereby form the conductor post BP3 in an area defined by the resist pattern R6 (FIG. 48).

After removal of the unnecessary seed layer S6, the magnetic element body Ma is formed around the conductor post BP3, and the base 81, metal foil 82, and insulating layer 83 are peeled off, whereby the coil component 2 according to the present embodiment is completed. Note that dicing may be performed along the dicing line L illustrated in FIG. 44 to expose the side surfaces of the conductor posts BP1 to BP3 and the side surfaces of the electrode patterns 11, 12, 21, 22, 31, 32, 41, and 42 from the magnetic element bodies M and Ma.

As described above, in the present embodiment, after formation of the conductor posts BP1 and BP2, the conductor post BP3 is formed on the side opposite to the conductor posts BP1 and BP2, whereby a structure in which the conductor post is formed on both surface sides can be obtained.

Third Embodiment

Figure 49:
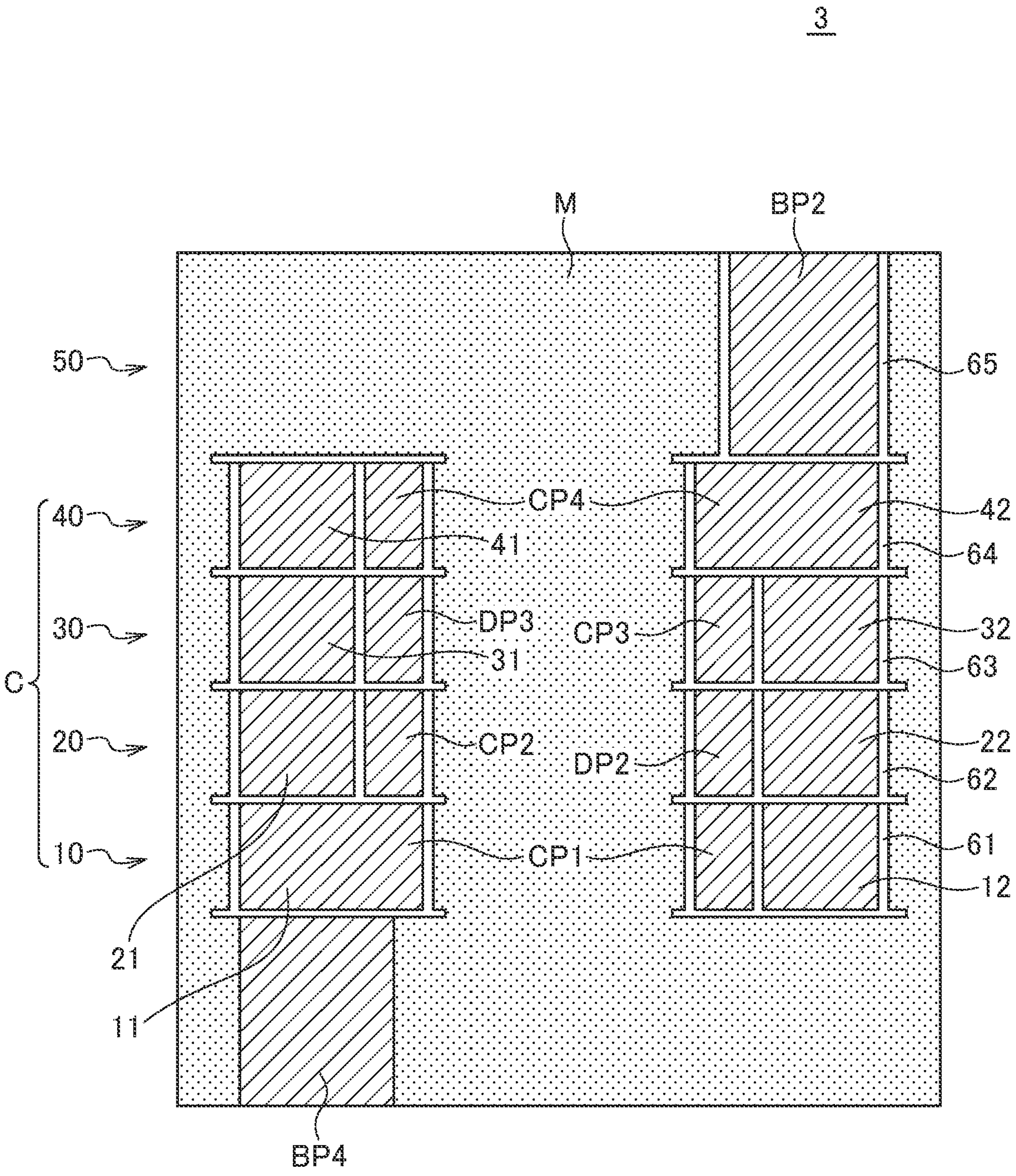
FIG. 49 is a schematic cross-sectional view for explaining the structure of a coil component 3 according to a third embodiment of the present invention.

FIG. 49 is a schematic cross-sectional view for explaining the structure of a coil component 3 according to a third embodiment of the present invention.

As illustrated in FIG. 49, the coil component 3 according to the present embodiment differs from the coil component 1 according to the first embodiment in that a conductor post BP4 is provided in place of the conductor post BP1. Other basic configurations are the same as those of the coil component 1 according to the first embodiment, so the same reference numerals are given to the same elements, and overlapping description will be omitted.

As with the coil component 2 according to the second embodiment, the conductor post BP4 is provided on the side opposite to the conductor post BP2 and is connected to the electrode pattern 11. However, unlike the coil component 2 according to the second embodiment, the conductor post BP4 is embedded in the magnetic element body M. Further, unlike the conductor post BP2, the conductor post BP4 directly contacts the magnetic element body M not through an insulating layer. When there are concerns over decrease in reliability, an insulating layer may be interposed between the conductor posts B4 and the magnetic element body M.

As described above, in the coil component 3 according to the present embodiment, the conductor posts are provided so as to be exposed from both sides in the coil axis direction, i.e., from the first surface of the magnetic element body M positioned on one side in the coil axis direction and a second surface of the magnetic element body Ma positioned on the other side in the coil axis direction as with the coil component 2 according to the second embodiment. Thus, for example, when the coil component 3 is embedded in a multilayer substrate for actual use, connection can be established from both upper and lower sides.

The following describes a manufacturing method for the coil component 2 according to the present embodiment.

FIGS. 50 to 60 are process views for explaining the manufacturing method for the coil component 3 according to the present embodiment. Although the process views illustrated in FIGS. 50 to 60 each illustrate a cross section corresponding to one coil component 3, multiple coil components 3 can actually be obtained by creating every one of them at a time using an aggregate substrate.

Figure 4:
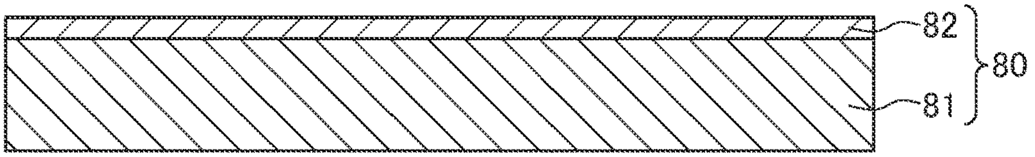
FIG. 4 is a process view for explaining the manufacturing method for the coil component 1.
Figure 50:
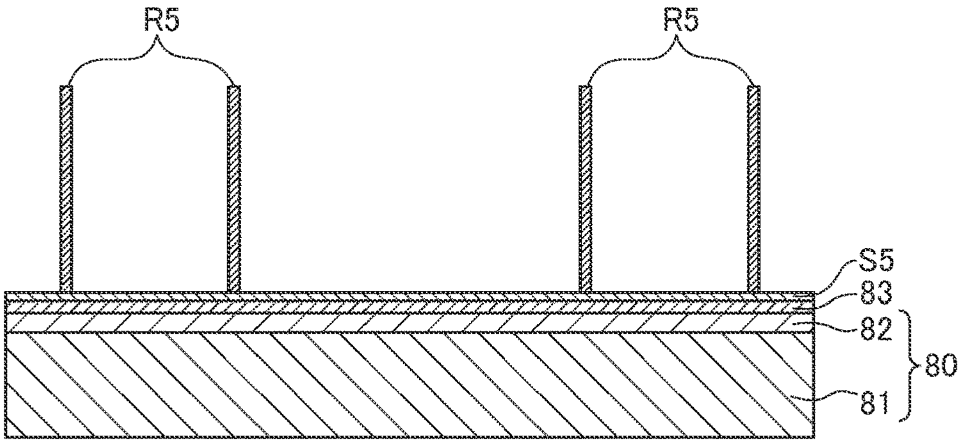
FIG. 50 is a process view for explaining the manufacturing method for the coil component 3.

The processes described using FIGS. 4 and 5 are performed, followed by removal of the metal foil 84. Then, electroless plating is performed to form the seed layer S5 on the entire surface, and the resist pattern R5 is formed on the seed layer S5 (FIG. 50). The resist pattern R5 serves as a negative pattern of the conductor post BP2. Unlike the first embodiment, the negative pattern of the conductor post BP1 is not formed.

Figure 51:
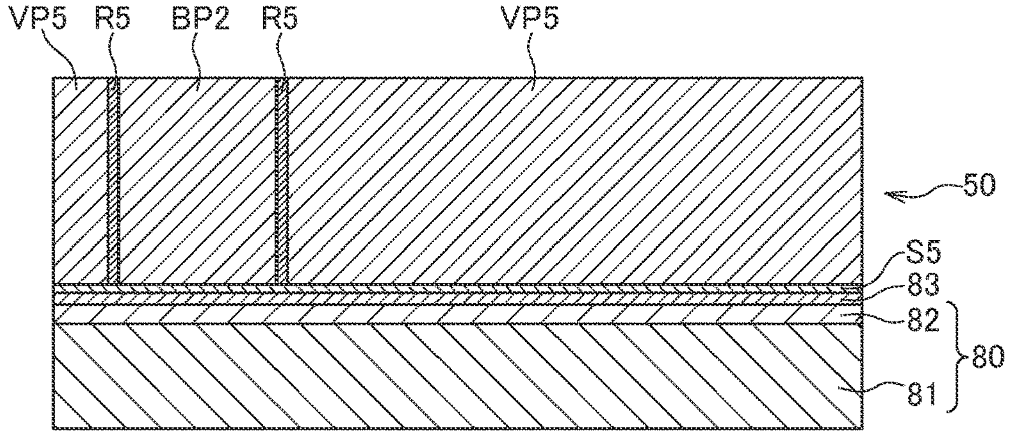
FIG. 51 is a process view for explaining the manufacturing method for the coil component 3.
Figure 52:
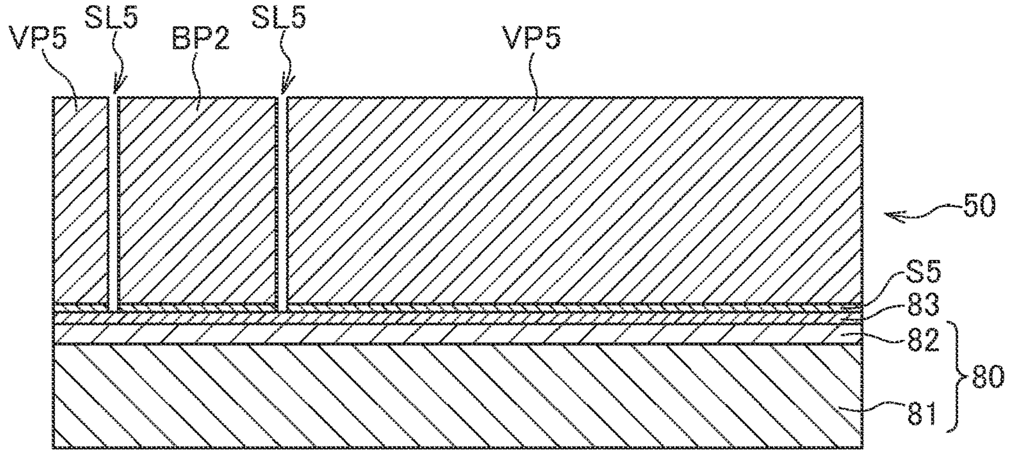
FIG. 52 is a process view for explaining the manufacturing method for the coil component 3.
Figure 61:
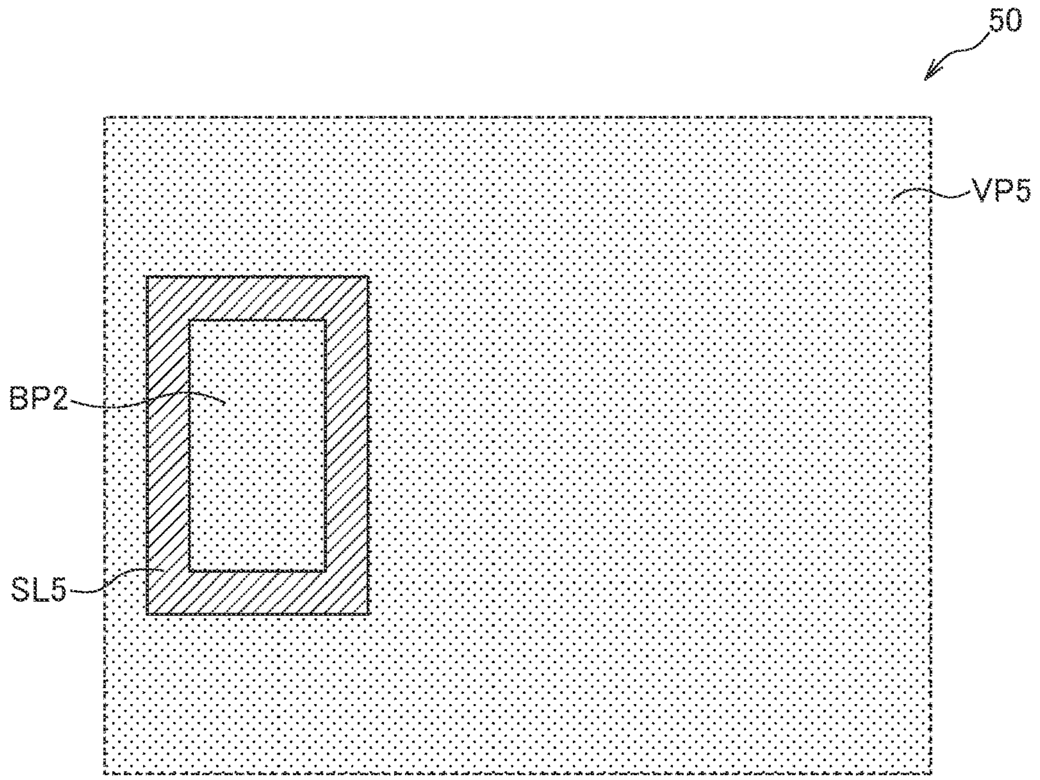
FIG. 61 is a plan view illustrating a pattern shape of the conductor layer 50.

Subsequently, electrolytic plating is performed to grow the seed layer S5 to thereby form the conductor layer 50 (FIG. 51). As a result, the conductor post BP2 is formed in an area defined by the resist pattern R5. At this time, the sacrificial pattern VP5 is formed around the conductor post BP2. After peeling off the resist pattern R5, a part of the seed layer S5 that is exposed to the peeled portion of the resist pattern R5 is removed by etching (FIG. 52). As a result, the conductor post BP2 and the sacrificial pattern VP5 are electrically isolated from each other by the slit SL5. The planar shape of the conductor layer 50 is as illustrated in FIG. 61.

Figure 53:
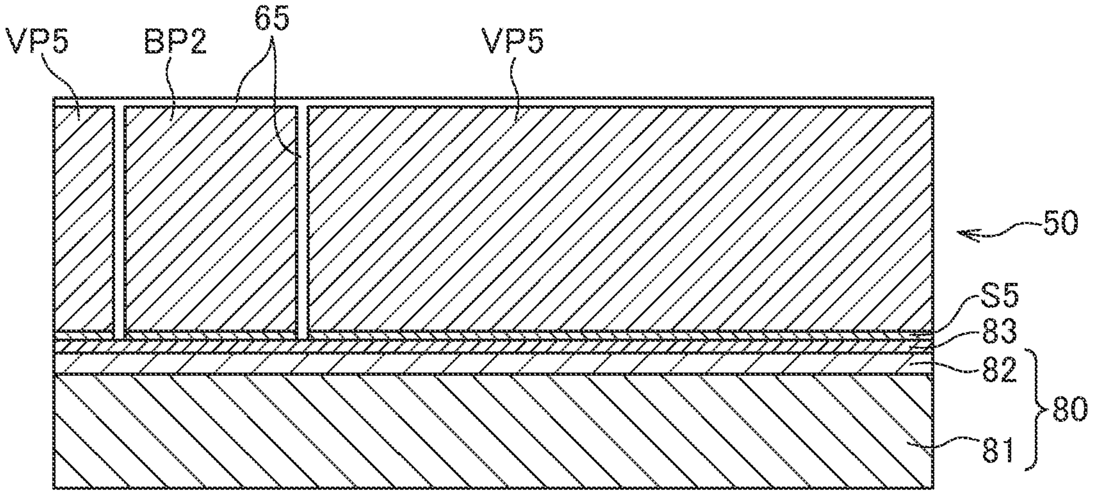
FIG. 53 is a process view for explaining the manufacturing method for the coil component 3.
Figure 54:
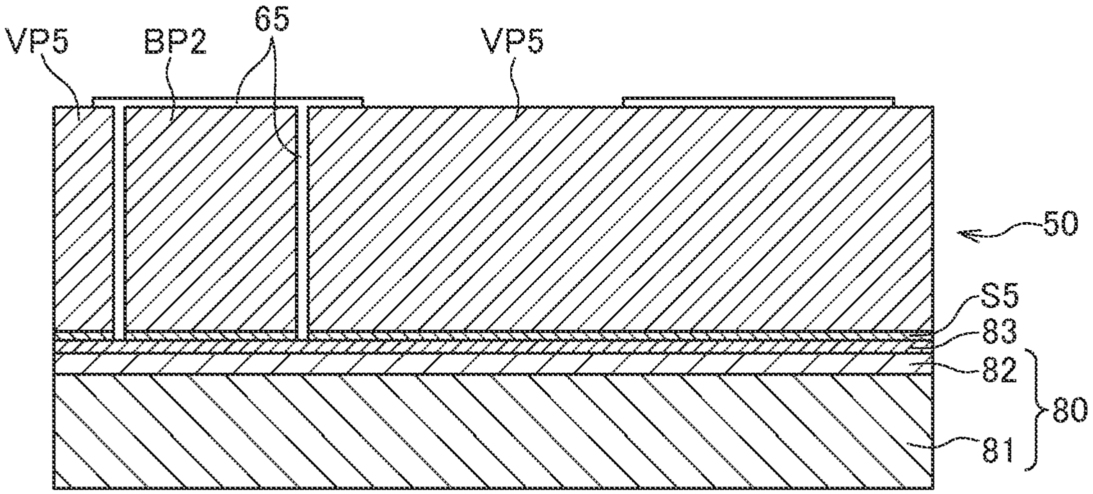
FIG. 54 is a process view for explaining the manufacturing method for the coil component 3.
Figure 62:
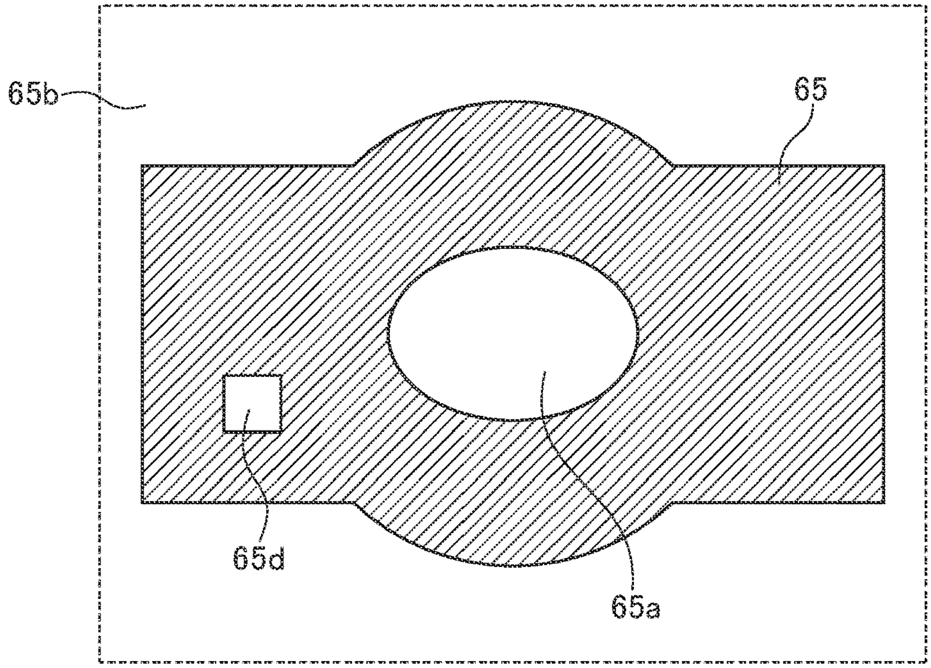
FIG. 62 is a plan view illustrating a pattern shape of the conductor layer 65.

Subsequently, the insulating layer 65 is formed on the surface of the conductor layer 50 so as to fill the slit SL5 (FIG. 53). The insulating layer 65 can be formed by a laminate method. Then, the insulating layer 65 is patterned to partly expose the conductor post BP2 and sacrificial pattern VP5 (FIG. 54). The pattern shape of the insulating layer 65 is as illustrated in FIG. 62. That is, openings 65*a* and 65*b* are formed at positions not overlapping the conductor post BP2, and an opening 65*d* is formed at a position overlapping the conductor post BP2.

Figure 55:
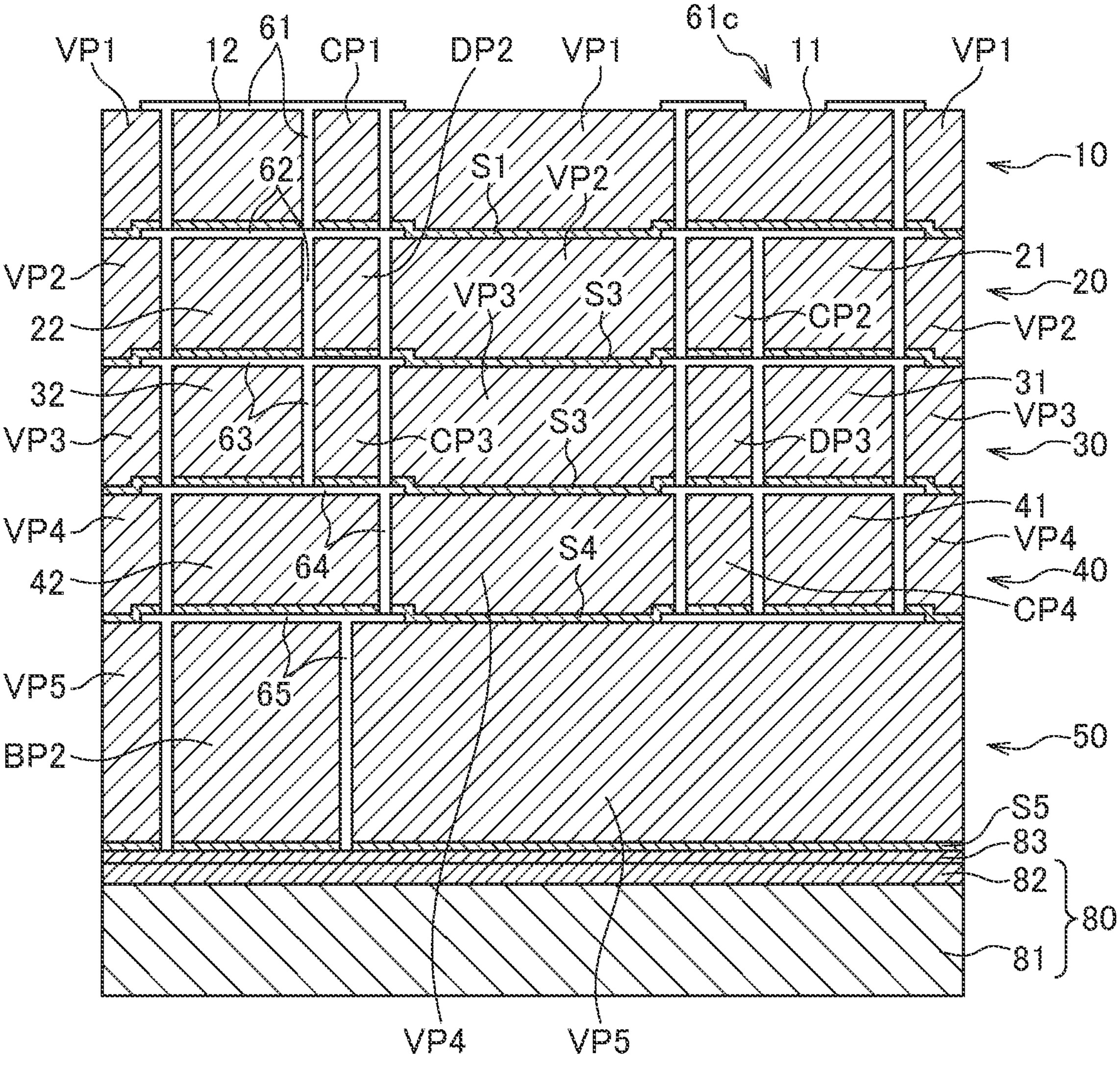
FIG. 55 is a process view for explaining the manufacturing method for the coil component 3.
Figure 63:
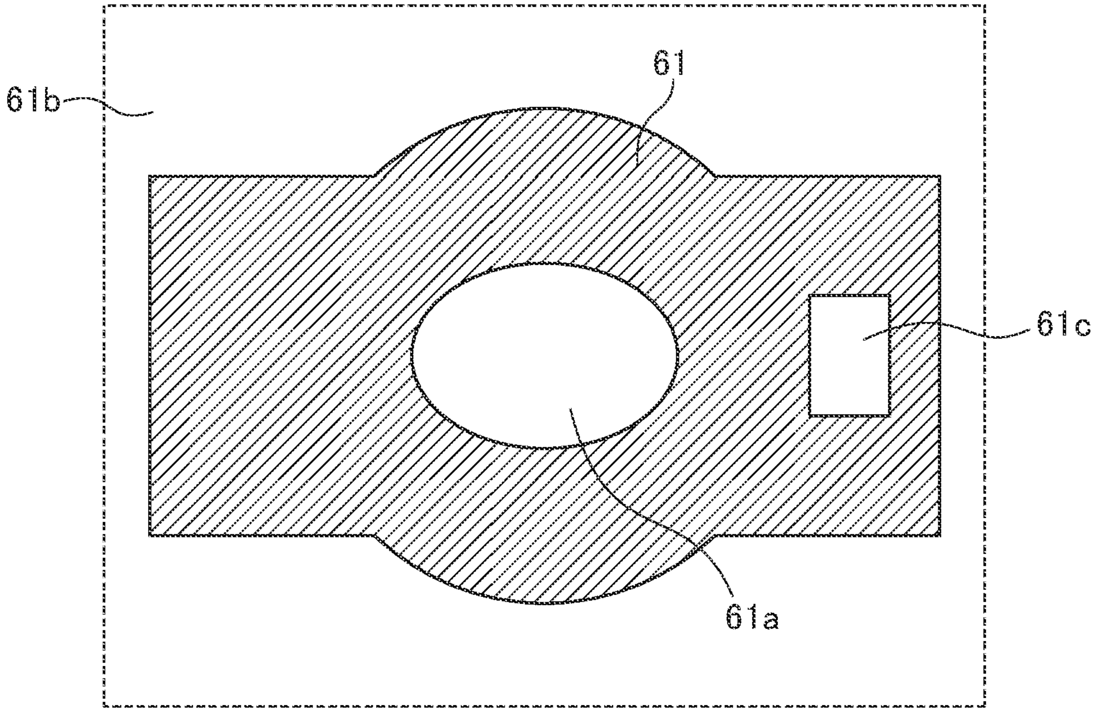
FIG. 63 is a plan view illustrating a pattern shape of the conductor layer 61.

After that, the processes described using FIGS. 11 to 29 are performed to form the conductor layers 40, 30, 20, and 10 in this order. Then, the insulating layer 61 is patterned to partly expose the electrode pattern 11 and sacrificial pattern VP1 (FIG. 55). The pattern shape of the insulating layer 61 is as illustrated in FIG. 63. That is, the opening 61*a* is formed at a position corresponding to the inner diameter area of the coil pattern CP1, the opening 61*b* is formed at a position corresponding to the outer area of the coil pattern CP1, and the opening 61*c* is formed at a position overlapping the electrode pattern 11.

Figure 56:
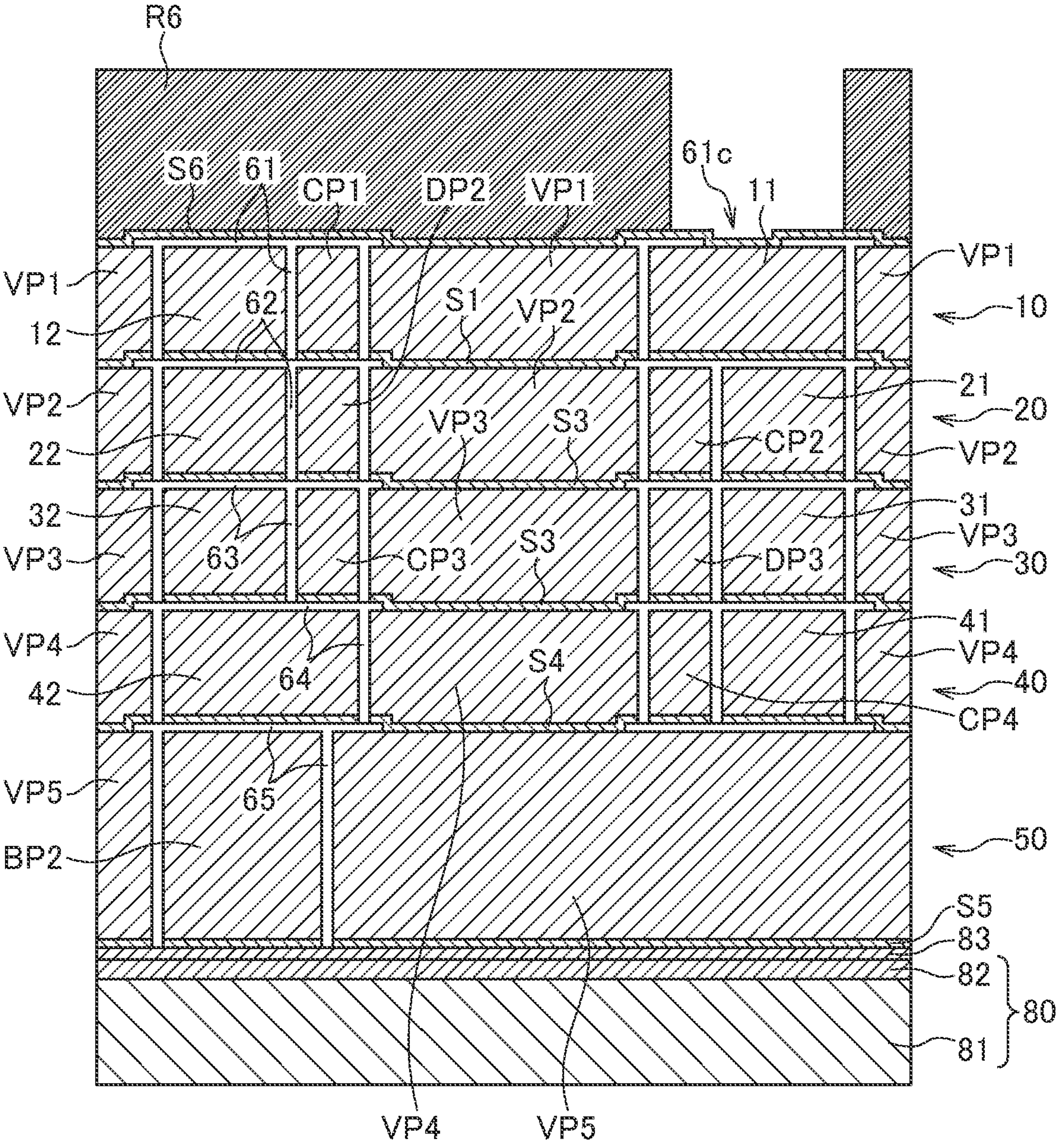
FIG. 56 is a process view for explaining the manufacturing method for the coil component 3.

Subsequently, electroless plating is performed to form the seed layer S6 that contacts the electrode pattern 11 through the opening 61*c*, and the resist pattern R6 is formed on the seed layer S6 (FIG. 56). The resist pattern R6 serves as a negative pattern of the conductor post BP4.

Figure 57:
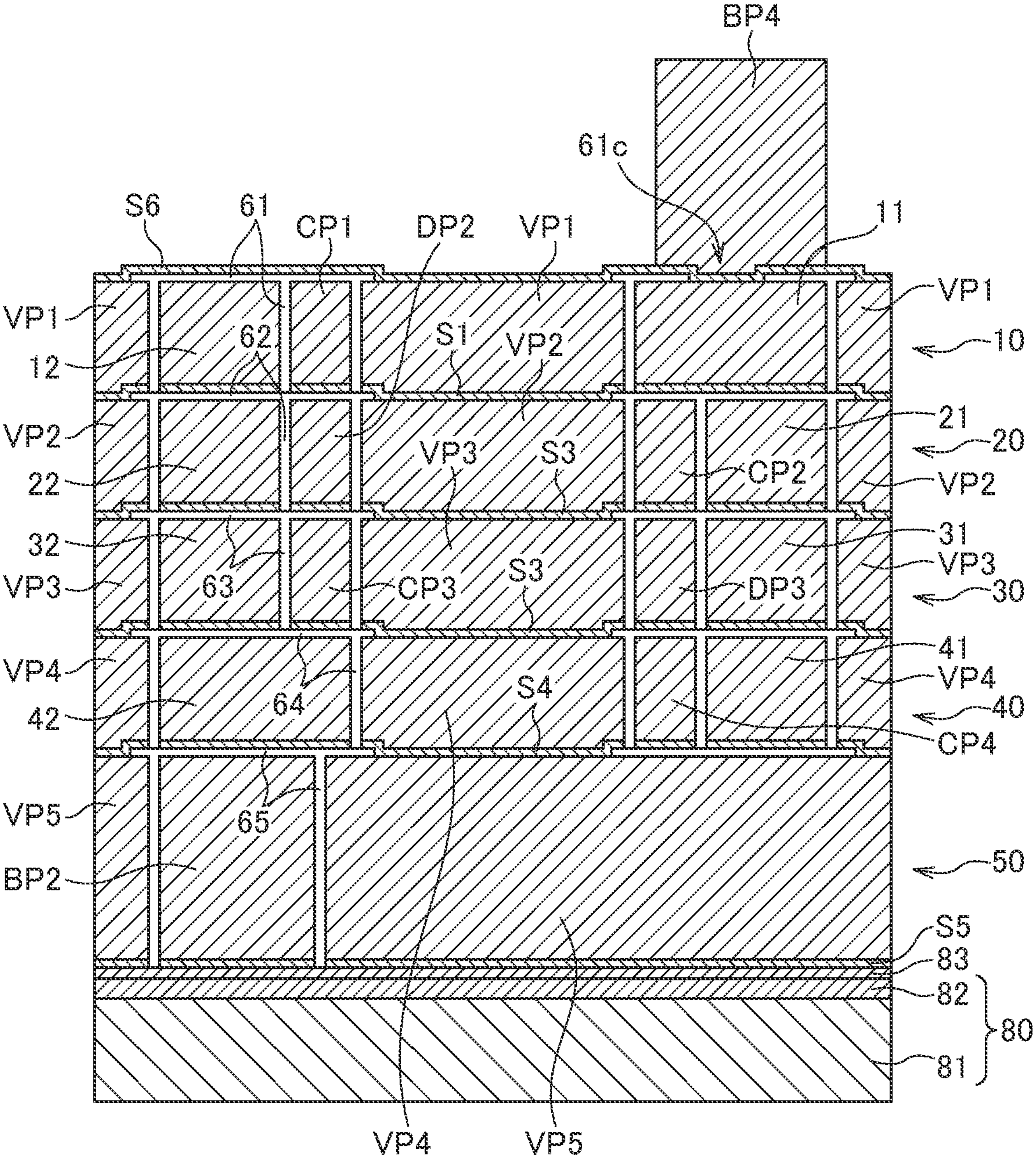
FIG. 57 is a process view for explaining the manufacturing method for the coil component 3.
Figure 58:
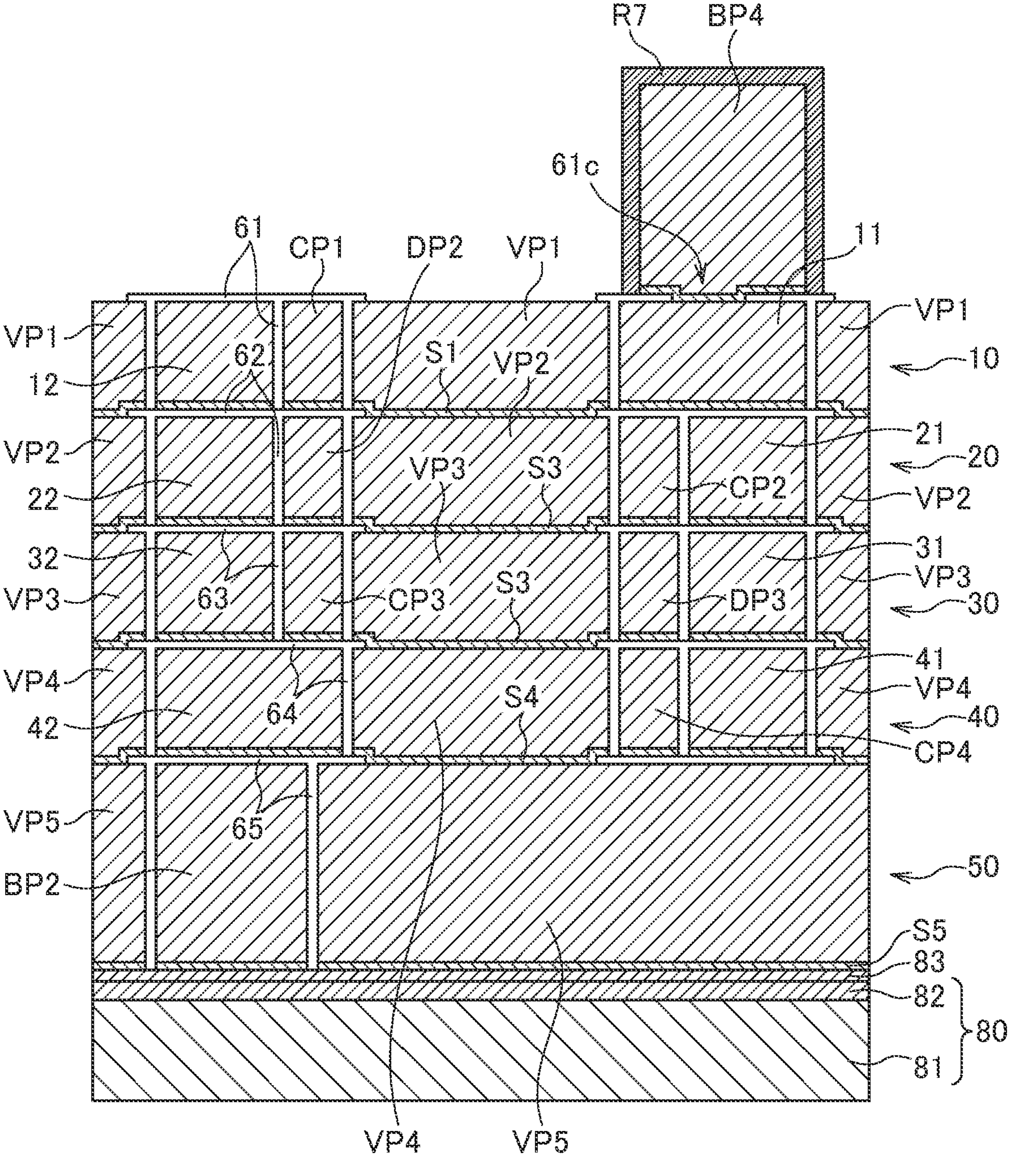
FIG. 58 is a process view for explaining the manufacturing method for the coil component 3.
Figure 59:
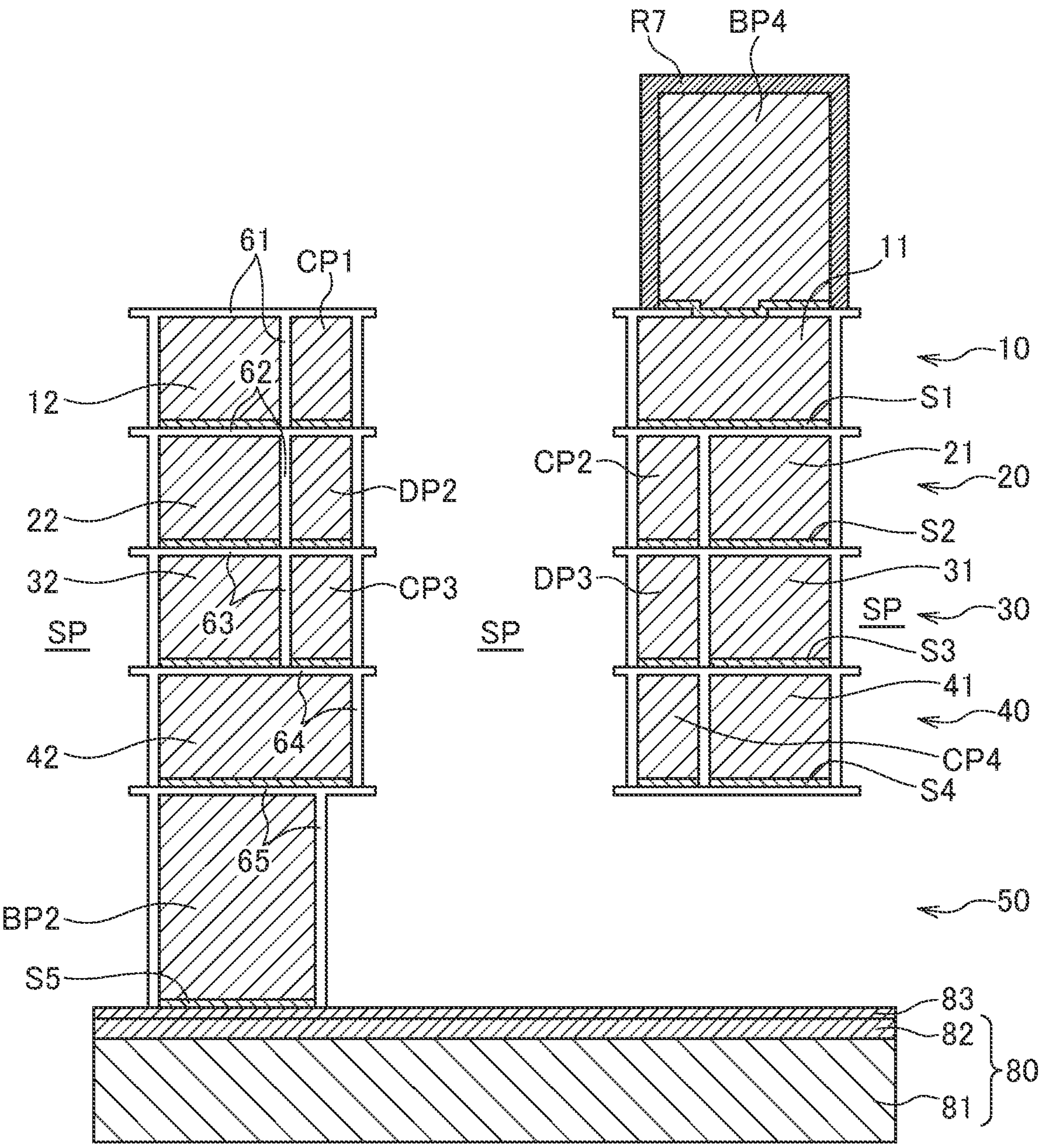
FIG. 59 is a process view for explaining the manufacturing method for the coil component 3.
Figure 60:
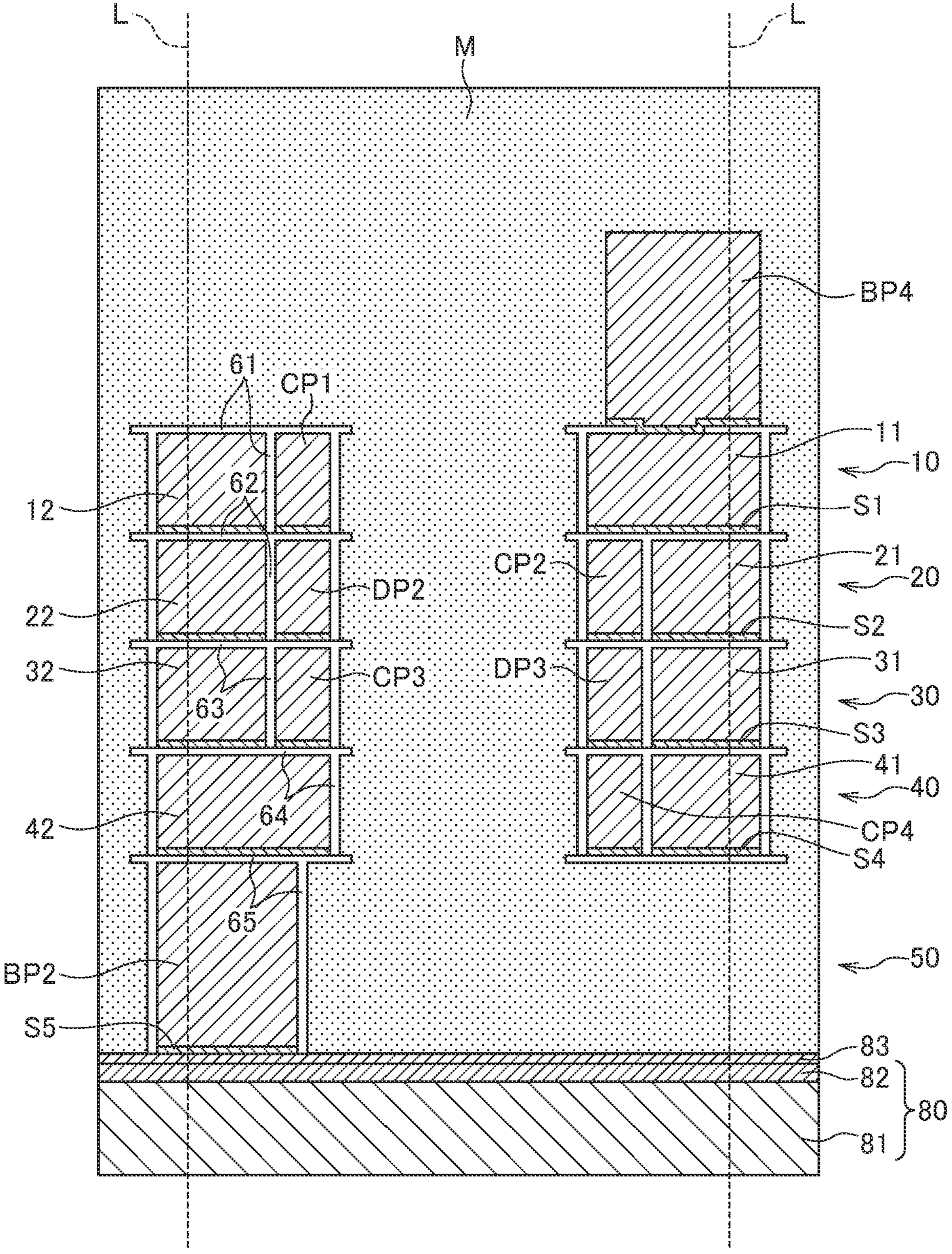
FIG. 60 is a process view for explaining the manufacturing method for the coil component 3.

Subsequently, electrolytic plating is performed to grow the seed layer S6 to thereby form the conductor post BP4 in an area defined by the resist pattern R6 (FIG. 57). After removal of the unnecessary seed layer S6, the conductor post BP4 is covered with a resist film R7 (FIG. 58), followed by wet etching to remove the sacrificial patterns VP1 to VP5 (FIG. 59). The coil patterns CP1 to CP4, dummy patterns DP1 to DP4, electrode patterns 11, 12, 21, 22, 31, 32, 41, and 42. and conductor posts BP2 and BP4 are covered with the insulating layers 61 to 65 or resist film R7 and are thus not etched. This forms the space SP in the inner diameter areas and outer areas of the coil patterns CP1 to CP4 and dummy patterns DP1 to DP4.

After the magnetic element body M is formed so as to fill the space SP (FIG. 60), the base 81, metal foil 82, and insulating layer 83 are peeled off to expose the end portion of the conductor post BP2, and the upper surface of the magnetic element body M is polished to expose the end portion of the conductor post BP4, whereby the coil component 3 according to the present embodiment is completed. Note that dicing may be performed along the dicing line L illustrated in FIG. 60 to expose the side surfaces of the conductor posts BP2 and BP4 and the side surfaces of the electrode patterns 11, 12, 21, 22, 31, 32, 41, and 42 from the magnetic element body M.

As described above, in the present embodiment, after formation of the conductor post BP2, the conductor post BP4 is formed on the side opposite to the conductor post BP2, whereby a structure in which the conductor post is formed on both surface sides can be obtained.

While the preferred embodiment of the present invention has been described, the present invention is not limited to the above embodiment, and various modifications may be made within the scope of the present invention, and all such modifications are included in the present invention.

REFERENCE SIGNS LIST

1-3, 1A coil component
10, 20, 30, 40, 50 conductor layer
11, 12, 21, 22, 31, 32, 41, 42 electrode pattern
11, 21 electrode pattern
61-65 insulating layer
61*a*, 61*b*, 62*a*-62*e*, 63*a*-63*e*, 64*a*-64*e*, 65*a*-65*d* opening
71-74 via conductor
80 support substrate
81 base
82 metal foil
83 insulating layer
84 metal foil
BP1-BP4 conductor post
C coil part
CP1-CP4 coil pattern
DP1-DP4 dummy pattern
E1, E2 area
M magnetic element body
R1-R6 resist pattern
R7 resist film
S1-S6 seed layer
SL1-SL5 slit
SP space
VP1-VP5 sacrificial pattern

What is claimed is:

1. A coil component comprising:
a magnetic element body made of resin containing magnetic particles;
a coil part embedded in the magnetic element body;
a conductor post which is embedded in the magnetic element body, the conductor post having a lower surface connected to the coil part, an upper surface exposed from the magnetic element body, and a side surface covered with the magnetic element body;
a first insulating layer having i) a first part interposed between the side surface of the conductor post and the magnetic element body and ii) a second part interposed between the lower surface of the conductor post and the coil part; and
a second insulating layer interposed between the coil part and the magnetic element body,
wherein the coil part and the conductor post are connected to each other through a via conductor penetrating the second part of the first insulating layer, and
wherein the via conductor has a diameter larger at a part contacting the coil part than that at a part contacting the lower surface of the conductor post.

2. The coil component as claimed in claim 1, wherein the first and second insulating layers are made of the same resin material.

3. The coil component as claimed in claim 2, wherein the first insulating layer has a film thickness larger than that of the second insulating layer.

4. The coil component as claimed in claim 1, wherein the first insulating layer has a film thickness larger than that of the second insulating layer.

5. The coil component as claimed in claim 1,
wherein the conductor post includes a first conductor post connected to one end of the coil part and a second conductor post connected to other end of the coil part,
wherein the magnetic element body has a first surface positioned on one side in a coil axis direction and a second surface positioned on other side in the coil axis direction, and
wherein the first and second conductor posts are exposed from the first and second surfaces of the magnetic element body, respectively.

6. The coil component as claimed in claim 5,
wherein the conductor post further includes a third conductor post connected to the one end of the coil part, and
wherein the third conductor post is exposed from the second surface of the magnetic element body.

7. The coil component as claimed in claim 5, wherein the first insulating layer is interposed between the second conductor post and the magnetic element body without being interposed between the first conductor post and the magnetic element body.

8. The coil component as claimed in claim 7,
wherein the conductor post further includes a third conductor post connected to the one end of the coil part, and
wherein the third conductor post is exposed from the second surface of the magnetic element body.

9. The coil component as claimed in claim 1, wherein the first insulating layer is made of a material having a thermal expansion coefficient of a value between those of the conductor post and the magnetic element body.

10. The coil component as claimed in claim 1, wherein the first insulating layer is made of a different material from the second insulating layer.

11. The coil component as claimed in claim 10, wherein the first insulating layer includes a magnetic material.

12. The coil component as claimed in claim 1, wherein the second part of the first insulating layer is thicker than the second insulating layer.

13. A coil component comprising:

a coil part having a first end surface;

a first conductor post having a first lower surface connected to the first end surface of the coil part, a first upper surface opposite to the first lower surface, and a first side surface located between the first lower surface and the first upper surface;

a magnetic element body embedding therein the coil part and the first conductor post such that the first upper surface of the first conductor post is exposed from the magnetic element body;

a first insulating layer having a first part interposed between the first side surface of the first conductor post and the magnetic element body and a second part interposed between the first lower surface of the first conductor post and the first end surface of the coil part; and a second insulating layer interposed between the coil part and the magnetic element body, wherein the first conductor post is connected to the coil part through a first via conductor penetrating the second part of the first insulating layer.

14. The coil component as claimed in claim 13, wherein the first insulating layer is a continuous film over the first part and the second part.

15. The coil component as claimed in claim 13, wherein the first conductor post further has a first corner part located between the first lower surface and the first side surface, and wherein the first insulating layer further has a third part located between the first part and the second part so as to cover the first corner part of the first conductor post.

16. The coil component as claimed in claim 13, wherein the first via conductor is filled with a part of the coil part.

17. The coil component as claimed in claim 13, further comprising a second conductor post having a second lower surface connected to a second end surface of the coil part, a second upper surface opposite to the second lower surface, and a second side surface located between the second lower surface and the second upper surface, wherein the magnetic element body further embeds therein the second conductor post such that the second upper surface of the second conductor post is exposed from the magnetic element body, wherein the first insulating layer further has a third part interposed between the second side surface of the second conductor post and the magnetic element body and a fourth part interposed between the second lower surface of the second conductor post and the second end surface of the coil part, and wherein the second conductor post is connected to the coil part through a second via conductor penetrating the fourth part of the first insulating layer.

18. The coil component as claimed in claim 13, wherein the first insulating layer is made of a material having a thermal expansion coefficient of a value between those of the conductor post and the magnetic element body.

19. A coil component comprising:

a coil part having an end surface;

a conductor post having a lower surface facing the end surface of the coil part, an upper surface opposite to the lower surface, a side surface connecting the lower surface and the upper surface, and a corner part located between the lower surface and the side surface;

a first insulating layer continuously covering the lower surface, the side surface, and the corner part of the conductor post;

a second insulating layer covering the coil part; and a magnetic element body embedding therein the coil part and the conductor post via the first and second insulating layers such that the upper surface of the conductor post is exposed from the magnetic element body, wherein the conductor post is connected to the coil part through a via conductor penetrating the first insulating layer located between the lower surface of the conductor post and the end surface of the coil part.

20. The coil component as claimed in claim 19, wherein the first insulating layer is made of a material having a thermal expansion coefficient of a value between those of the conductor post and the magnetic element body.

* * * * *